United States Patent
Funseth et al.

(10) Patent No.: US 10,773,271 B2
(45) Date of Patent: *Sep. 15, 2020

(54) TIME VARYING CONTROL OF THE OPERATION OF SPRAY SYSTEMS

(71) Applicant: Deere & Company, Moline, IL (US)

(72) Inventors: Travis G. Funseth, Ankeny, IA (US); Richard A. Humpal, Ankeny, IA (US); Stacy L. Bullock, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,619

(22) Filed: Sep. 3, 2015

(65) Prior Publication Data

US 2015/0375247 A1 Dec. 31, 2015

Related U.S. Application Data

(63) Continuation-in-part of application No. 14/506,057, filed on Oct. 3, 2014, and a continuation-in-part of application No. 14/505,944, filed on Oct. 3, 2014.

(Continued)

(51) Int. Cl.
*B05B 12/04* (2006.01)
*B05B 1/30* (2006.01)
(Continued)

(52) U.S. Cl.
CPC .......... *B05B 12/04* (2013.01); *A01M 7/0089* (2013.01); *B05B 1/083* (2013.01); *B05B 1/169* (2013.01);
(Continued)

(58) Field of Classification Search
CPC ......... B05B 12/04; B05B 12/06; B05B 1/083; B05B 1/1645; B05B 1/169; B05B 1/20;
(Continued)

(56) References Cited

U.S. PATENT DOCUMENTS 3,866,832 A 2/1975 Noguchi
3,967,783 A 7/1976 Halsted et al.
(Continued)

FOREIGN PATENT DOCUMENTS

CN 103096714 A 5/2013
CN 203164717 U 8/2013
(Continued)

OTHER PUBLICATIONS

Combo-Rate [online product brochure]. Wilger Industries Ltd. [retrieved on Sep. 25, 2014]. Retrieved from the Internet: <http://www.heartlandag.com/assets/images/parts/wilger/nozzle/pdf_83.pdf>.

(Continued)

*Primary Examiner* — Alex M Valvis

(57) ABSTRACT

Embodiments include a sprayer system having dynamic pre-sets to control spray nozzles that each individually operates continuously or under a time-modulated or a frequency-modulated electronic signal control to release the liquid droplets. Collectively, adjacent or near neighboring nozzles are also controlled by time-sequencing through different modes of operation or physical configurations on each spray nozzle. The spray nozzles are mounted on a variety of implements including agricultural or industrial spray booms.

18 Claims, 51 Drawing Sheets

Related U.S. Application Data

(60) Provisional application No. 62/050,530, filed on Sep. 15, 2014, provisional application No. 62/015,315, filed on Jun. 20, 2014.

(51) Int. Cl.
  *B05B 12/06* (2006.01)
  *B05B 1/16* (2006.01)
  *B05B 1/08* (2006.01)
  *B05B 1/20* (2006.01)
  *A01M 7/00* (2006.01)

(52) U.S. Cl.
  CPC .............. *B05B 1/1645* (2013.01); *B05B 1/20* (2013.01); *B05B 1/30* (2013.01); *B05B 1/3053* (2013.01); *B05B 12/06* (2013.01)

(58) Field of Classification Search
  CPC ...... B05B 1/30; B05B 1/3053; A01M 7/0089; A01M 7/0096
  USPC ............. 137/599.05–599.07, 599.11–599.14, 137/601.14; 239/124–127
  See application file for complete search history.

(56) References Cited

U.S. PATENT DOCUMENTS

| | | | |
|---|---|---|---|
| 3,999,572 A * | 12/1976 | Mohr | F17D 1/14 137/599.07 |
| 4,004,733 A | 1/1977 | Law | |
| 4,058,260 A | 11/1977 | Lestradet | |
| 4,313,465 A | 2/1982 | Holzm et al. | |
| 4,649,818 A | 3/1987 | Switall et al. | |
| 4,749,126 A | 6/1988 | Kessener et al. | |
| 4,907,516 A | 3/1990 | Rogers | |
| 5,134,961 A | 8/1992 | Giles et al. | |
| 5,267,690 A | 12/1993 | Gazzoni | |
| 5,278,423 A | 1/1994 | Wangler et al. | |
| 5,296,702 A | 3/1994 | Beck et al. | |
| 5,356,077 A | 10/1994 | Shames et al. | |
| 5,441,203 A | 8/1995 | Swan et al. | |
| 5,475,614 A | 12/1995 | Tofte et al. | |
| 5,518,181 A | 5/1996 | Shames et al. | |
| 5,520,333 A * | 5/1996 | Tofte | A01B 79/005 137/599.05 |
| 5,539,624 A | 7/1996 | Dougherty | |
| 5,653,389 A | 8/1997 | Henderson et al. | |
| 5,763,873 A | 7/1998 | Beck et al. | |
| 5,793,035 A | 8/1998 | Beck et al. | |
| 5,873,647 A | 2/1999 | Kurtz et al. | |
| 5,878,960 A | 3/1999 | McInerney, II et al. | |
| 5,938,123 A | 8/1999 | Heitzman | |
| 6,021,960 A | 2/2000 | Kehat | |
| 6,070,539 A * | 6/2000 | Flamme | A01B 79/005 111/177 |
| 6,126,088 A * | 10/2000 | Wilger | B05B 9/06 239/159 |
| 6,193,166 B1 | 2/2001 | Miller et al. | |
| 6,230,091 B1 * | 5/2001 | McQuinn | A01B 79/005 239/159 |
| 6,325,302 B1 | 12/2001 | Guzowski et al. | |
| 6,444,090 B1 | 9/2002 | Wolf et al. | |
| 6,596,996 B1 | 7/2003 | Stone et al. | |
| 6,675,988 B2 | 1/2004 | Cline et al. | |
| 6,877,675 B2 | 4/2005 | Benneweis | |
| 6,918,757 B2 | 7/2005 | Nakamura et al. | |
| 7,066,402 B2 | 6/2006 | Goebel et al. | |
| 7,280,047 B2 | 10/2007 | Giles et al. | |
| 7,502,665 B2 * | 3/2009 | Giles | A01B 79/005 700/241 |
| 7,805,221 B2 * | 9/2010 | Nickerson | A01G 25/16 239/69 |
| 8,109,448 B2 | 2/2012 | Giles | |
| 8,191,795 B2 | 6/2012 | Grimm et al. | |
| 8,219,254 B2 * | 7/2012 | O'Connor | A01G 25/16 137/78.3 |
| 8,523,085 B2 | 9/2013 | Grimm et al. | |
| 8,615,329 B2 * | 12/2013 | O'Connor | A01G 25/16 137/1 |
| 8,636,175 B2 | 1/2014 | Smith | |
| 2001/0000611 A1 | 5/2001 | Cline et al. | |
| 2005/0000277 A1 | 1/2005 | Giles | |
| 2006/0255176 A1 | 11/2006 | Yeiser | |
| 2009/0194604 A1 | 8/2009 | Smith | |
| 2010/0032492 A1 | 2/2010 | Grimm et al. | |
| 2010/0237165 A1 | 9/2010 | Krueger | |
| 2012/0168532 A1 | 7/2012 | Giles | |
| 2012/0228395 A1 | 9/2012 | Needham et al. | |
| 2013/0161419 A1 | 6/2013 | Funseth et al. | |
| 2013/0168473 A1 | 7/2013 | Langkamp | |
| 2013/0284826 A1 | 10/2013 | Funseth et al. | |
| 2013/0284827 A1 | 10/2013 | Humpal et al. | |

FOREIGN PATENT DOCUMENTS

| | | |
|---|---|---|
| DE | 19715136 A1 | 10/1998 |
| DE | 102007008787 A1 | 8/2008 |
| DE | 202007018966 U1 | 12/2009 |
| DE | 202011003270 U1 | 4/2011 |
| EP | 0362241 B1 | 6/1994 |
| EP | 2227949 A1 | 9/2010 |
| EP | 1961300 B1 | 3/2011 |
| EP | 1961299 B1 | 6/2011 |
| EP | 2522432 A1 | 11/2012 |
| EP | 2522433 A1 | 11/2012 |
| GB | 2165469 A | 4/1986 |
| GB | 2337984 A | 8/1999 |
| SU | 1544333 A1 | 2/1990 |
| WO | 1998057539 A1 | 12/1998 |
| WO | 2013109272 A1 | 7/2013 |
| WO | 2014067785 A1 | 5/2014 |

OTHER PUBLICATIONS

Combo-Rate Nozzle Bodies [online product brochure]. Wilger Industries Ltd. [retrieved on Sep. 25, 2014]. Retrieved from the Internet: <http://www.wilger.net/images/downloads/COMBO_RATE_Nozzle_Bodies.pdf>.

Electronic Modules, Electronics Packaging [online]. Interplex Industries, Inc., 2014 [retrieved on Oct. 2, 2014]. Retrieved from the Internet: <http://www.interplex.com/electronic-packaging>.

Grisso, Robert; Alley, Mark; Thomason, Wade; Holshouser, David; Roberson, Gary T. Precision Farming Tools: Variable-Rate Application [online]. College of Agriculture and Life Sciences, Virginia Polytechnic Institute and State University, 2011 [retrieved on Sep. 25, 2014]. Retrieved from the Internet: <http://pubs.ext.vt.edu/442/442-505/442-505_PDF.pdf>.

Hypro Duo React [online]. Pentair Ltd, 2014 [retrieved on Sep. 25, 2014]. Retrieved from the Internet: <http://www.hypropumps.com/resources/images/27793.pdf>.

Insert Molding [online]. Interplex Industries, Inc., 2014 [retrieved on Oct. 2, 2014]. Retrieved from the Internet: <http://www.interplex.com/insert-molding>.

Lebeau, Frédéric; Verstraete, Arnaud; Schiffers, Bruno; Destain, Marie-France. Evaluation of Real Time Spray Drift Using RTDrift Gaussian Advection-Diffusion Model. Communications in Agricultural and Applied Biological Sciences, vol. 74 (1), pp. 11-24. Gembloux Agricultural University, Belgium, 2009.

QJ360 Nozzle Body Series for Dry Boom [online]. TeeJet, 2014 [retrieved on Sep. 25, 2014]. Retrieved from Spraying Equipment Supply on the Internet: <http://www.sprayingequipmentsupply.com/teejet/multiple-nozzle-bodies.html>.

Sprayer Nozzles for Agriculture and Turf Spraying Systems [online]. Greenleaf Technologies, 2014 [retrieved on Sep. 25, 2014]. Retrieved from the Internet: <http://www.greenleaftech.com/>.

Precision Spray Technology: How Modulation Spray Systems Improve Application [online]. Croplife, Dec. 2, 2013 [retrieved on Sep. 21, 2014]. Retrieved from the Internet: <http://www.croplife.com>.

(56) References Cited

OTHER PUBLICATIONS

Chen, Heping; Ning, Xi; Sheng, Weihua; Son, Mumin and Chen, Yifan. CAD-based Automated Robot Trajectory Planning for Spray Painting of Free-form Surfaces. Industrial Robot: An International Journal [online]. vol. 29, No. 5, 2002. pp. 426-433 [retrieved on Oct. 4, 2014]. Retrieved from the Internet: <http://georgetown.academia.edu/YifanChen/Papers>.

Nozzle Control Technology [online]. Goldaccres, May 9, 2013 [retrieved on Aug. 21, 2015]. Retrieved from the Internet :<http://www.goldacres.com.au/pressreleases/Nozzle_control_tech_090513.pdf>.

Needham, D.L.; Holtz, A.J.; Giles, D.K. Actuator System for Individual Nozzle Control of Flow Rate andSpray Droplet Size. American Society of Agricultural and Biological Engineers ISSN 2151-0032, 2012. vol. 55(2), pp. 379-386 [online]. [retrieved on Jul. 24, 2014]. Retrieved from the Internet: <http://elibrary.asabe.org/azdez.asp?AID=41376&t=2>.

European Search Report in foreign counterpart application No. 1518525.4 dated Feb. 12, 2016.

\* cited by examiner

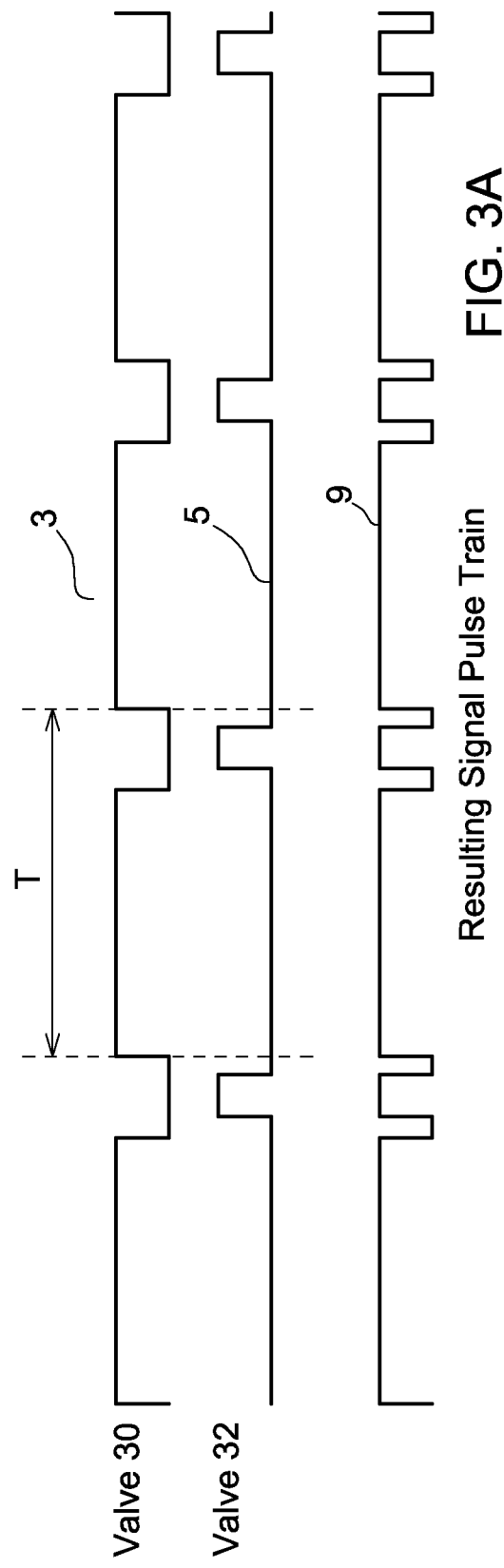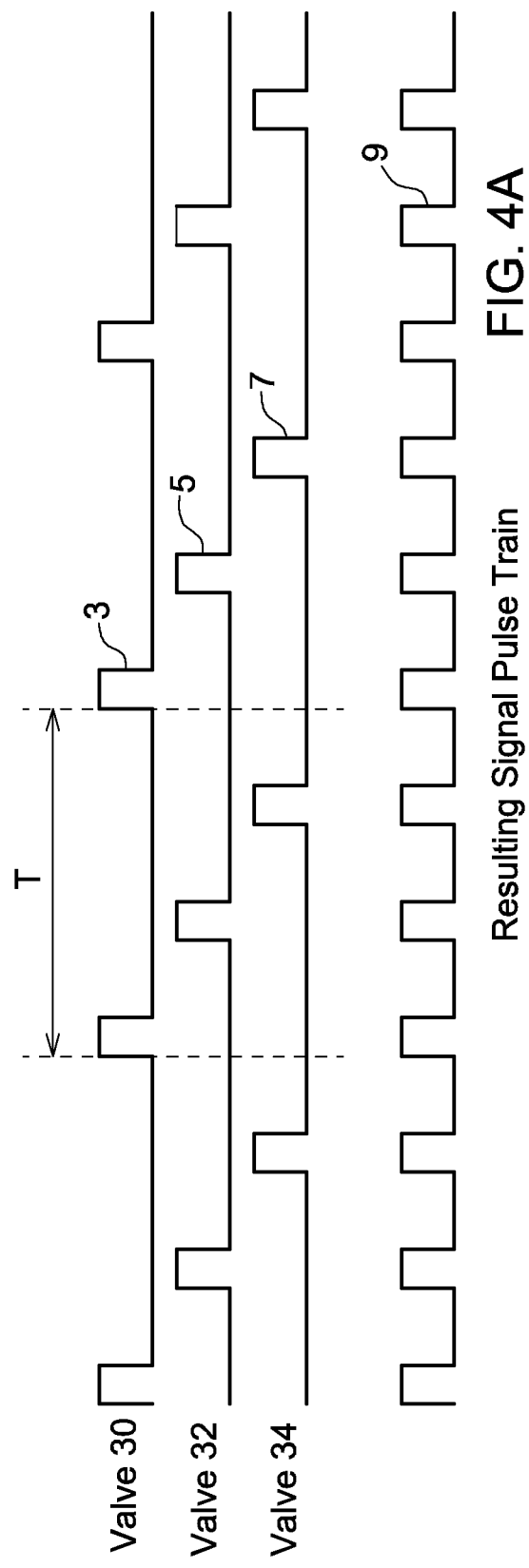

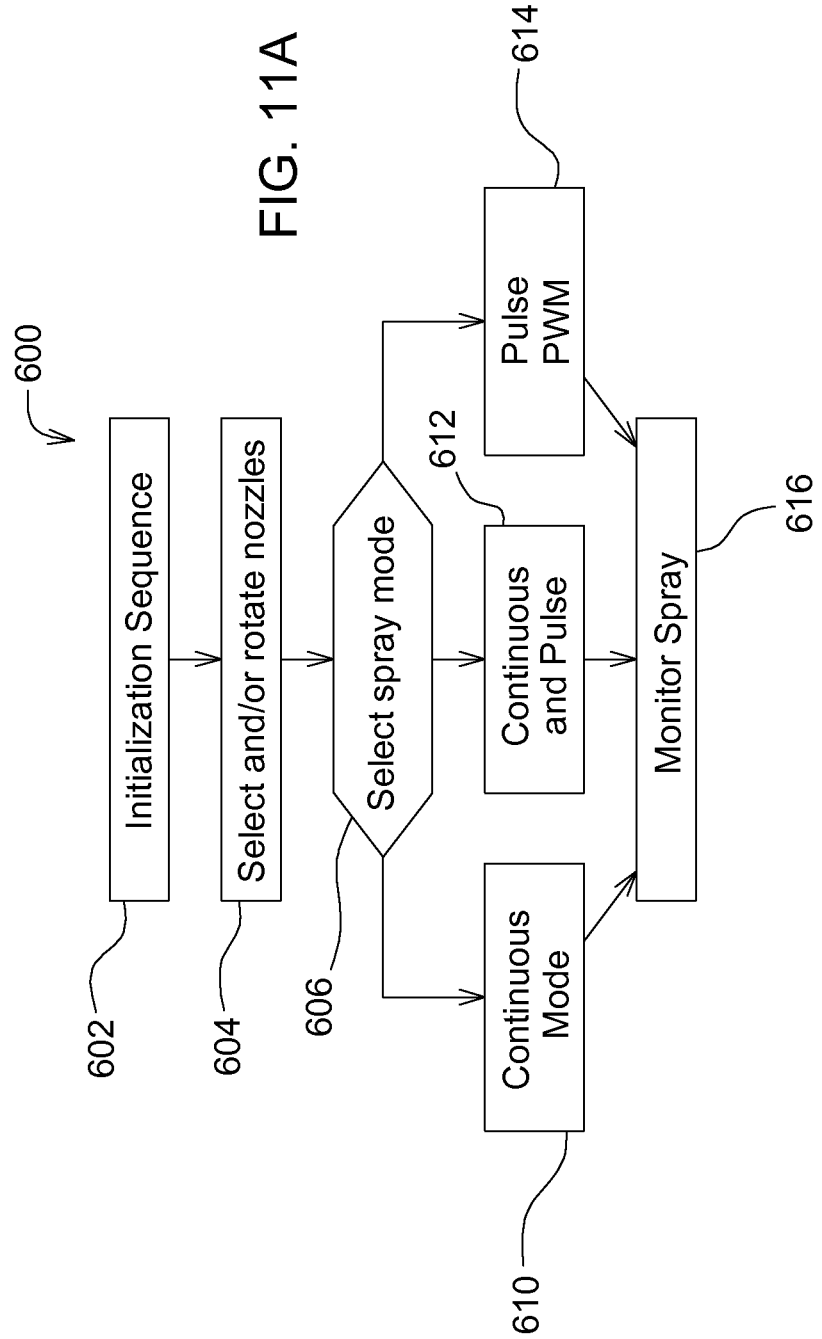

FIG. 12

| 1 | 2 | 3 | 4 | 5 | 6 | 7 | 8 |
|---|---|---|---|---|---|---|---|
| Mode No. | Spray Control Mode | Turret outlet position | No. of control valves operating | Pulsing Phase of valves within a nozzle | Frequency | Duty Cycle | Pulsing phase of nozzle to adjacent nozzle |
| 1 | Pulsed spray | Combined outlet | Multiple | Out or in phase | Same | Same | Out or in phase |
| 2 | Pulsed spray | Combined outlet | Multiple | Out or in phase | Multiple | Multiple | Out or in phase |
| 3 | Pulsed spray | Combined outlet | Multiple | Out or in phase | Same | Multiple | Out or in phase |
| 4 | Pulsed spray | Combined outlet | Multiple | Out or in phase | Multiple | Same | Out or in phase |
| 5 | Pulsed spray | Combined outlet | Multiple | In phase | Same | Same | Out or in phase |
| 6 | Pulsed spray | Combined outlet | Multiple | In phase | Multiple | Multiple | Out or in phase |
| 7 | Pulsed spray | Combined outlet | Multiple | In phase | Same | Multiple | Out or in phase |
| 8 | Pulsed spray | Combined outlet | Multiple | In phase | Multiple | Same | Out or in phase |
| 9 | Pulsed spray | Combined outlet | Single | N/A | N/A | N/A | Out or in phase |
| 10 | Pulsed spray | Individual outlets | Single | N/A | N/A | N/A | Out or in phase |
| 11 | Pulsed spray | Individual outlets | Multiple | Out or in phase | Same | Same | Out or in phase |
| 12 | Pulsed spray | Individual outlets | Multiple | Out or in phase | Multiple | Multiple | Out or in phase |
| 13 | Pulsed spray | Individual outlets | Multiple | Out or in phase | Same | Multiple | Out or in phase |
| 14 | Pulsed spray | Individual outlets | Multiple | Out or in phase | Multiple | Same | Out or in phase |
| 15 | Pulsed spray | Individual outlets | Multiple | In phase | Same | Same | Out or in phase |
| 16 | Pulsed spray | Individual outlets | Multiple | In phase | Multiple | Multiple | Out or in phase |
| 17 | Pulsed spray | Individual outlets | Multiple | In phase | Same | Multiple | Out or in phase |
| 18 | Pulsed spray | Individual outlets | Multiple | In phase | Multiple | Same | Out or in phase |
| 19 | Continuous spray | Individual outlets | Single | N/A | N/A | N/A | Out or in phase |
| 20 | Continuous spray | Individual outlets | Multiple | N/A | N/A | N/A | Out or in phase |
| 21 | Continuous and Pulsed spray | Individual outlets | Multiple | Out or in phase | Same | Same | Out or in phase |
| 22 | Continuous and Pulsed spray | Individual outlets | Multiple | Out or in phase | Multiple | Multiple | Out or in phase |
| 23 | Continuous and Pulsed spray | Individual outlets | Multiple | Out or in phase | Same | Multiple | Out or in phase |
| 24 | Continuous and Pulsed spray | Individual outlets | Multiple | Out or in phase | Multiple | Same | Out or in phase |
| 25 | Continuous and Pulsed spray | Individual outlets | Multiple | In phase | Same | Same | Out or in phase |
| 26 | Continuous and Pulsed spray | Individual outlets | Multiple | In phase | Multiple | Multiple | Out or in phase |
| 27 | Continuous and Pulsed spray | Individual outlets | Multiple | In phase | Same | Multiple | Out or in phase |
| 28 | Continuous and Pulsed spray | Individual outlets | Multiple | In phase | Multiple | Same | Out or in phase |
| 29 | Continuous and Pulsed spray | Individual outlets | Multiple | In phase | Multiple | Same | Out or in phase |

800

| Block | Nozzle 1 | Nozzle 2 | Nozzle 3 | Nozzle 4 | Average Nozzle Size | PSI Range | Flow Rate Low | Flow Rate High |
|---|---|---|---|---|---|---|---|---|
| 1 | 03 | 03 | 03 | 03 | 03 | 40-70 | 0.3 | 0.4 |
| 2 | 04 | 04 | 04 | 04 | 04 | 40-120 | 0.4 | 0.7 |
| 3 | 03 + 04 | 03 + 04 | 03 + 04 | 03 + 04 | 07 | 40-70 | 0.7 | 0.9 |

FIG. 13

Flowchart 1

| Outlet | Nozzle 1 | | Nozzle 2 | | Nozzle 3 | | Nozzle 4 | | Average Nozzle Flow (GPM) | PSI Range | Flow Rate Low | Flow Rate High |
|---|---|---|---|---|---|---|---|---|---|---|---|---|
| | 120A 03 | 120B 04 | 120A 03 | 120B 04 | 120A 03 | 120B 04 | 120A 03 | 120B 04 | | | | |
| Block | PWM Duty Cycle | | | | | | | | | | | |
| 1 | 50% | 0% | 50% | 0% | 50% | 0% | 50% | 0% | 0.15 | 40-70 | 0.15 | 0.18 |
| 2 | 0% | 50% | 0% | 50% | 0% | 50% | 0% | 50% | 0.20 | 40-90 | 0.20 | 0.25 |
| 3 | 100% | 0% | 100% | 0% | 100% | 0% | 100% | 0% | 0.30 | 40-54 | 0.30 | 0.35 |
| 4 | 50% | 50% | 50% | 50% | 50% | 50% | 50% | 50% | 0.35 | 40-54 | 0.35 | 0.40 |
| 5 | 0% | 100% | 0% | 100% | 0% | 100% | 0% | 100% | 0.40 | 40-62 | 0.40 | 0.50 |
| 6 | 100% | 50% | 100% | 50% | 100% | 50% | 100% | 50% | 0.50 | 40-49 | 0.50 | 0.55 |
| 7 | 50% | 100% | 50% | 100% | 50% | 100% | 50% | 100% | 0.55 | 40-65 | 0.55 | 0.70 |
| 8 | 100% | 100% | 100% | 100% | 100% | 100% | 100% | 100% | 0.70 | 40-65 | 0.70 | 0.90 |

Flowchart 2

| | Nozzle 1 | | Nozzle 2 | | Nozzle 3 | | Nozzle 4 | | Average Nozzle Flow (GPM) | PSI Range | Flow Rate Low | Flow Rate High |
|---|---|---|---|---|---|---|---|---|---|---|---|---|
| Outlet | 1 | 2 | 1 | 2 | 1 | 2 | 1 | 2 | | | | |
| | 03 | 04 | 03 | 04 | 03 | 04 | 03 | 04 | | | | |
| | 0.30 | 0.40 | 0.30 | 0.40 | 0.30 | 0.40 | 0.30 | 0.40 | | | | |
| Block | PWM Duty Cycle | | | | | | | | | | | |
| 1 | 50% | 0% | 50% | 0% | 50% | 0% | 50% | 0% | 0.15 | 40-58 | 0.15 | 0.18 |
| 2 | 25% | 25% | 25% | 25% | 25% | 25% | 25% | 25% | 0.18 | 40-49 | 0.18 | 0.20 |
| Freq | 20 Hz | 20 Hz | 20 Hz | 20 Hz | 20 Hz | 20 Hz | 20 Hz | 20 Hz | | | | |
| 3 | 0% | 50% | 0% | 50% | 0% | 50% | 0% | 50% | 0.20 | 40-63 | 0.20 | 0.25 |
| 4 | 50% | 25% | 50% | 25% | 50% | 25% | 50% | 25% | 0.25 | 40-58 | 0.25 | 0.30 |
| Freq | 10 Hz | 20 Hz | 10 Hz | 20 Hz | 10 Hz | 20 Hz | 10 Hz | 20 Hz | | | | |
| 5 | 100% | 0% | 100% | 0% | 100% | 0% | 100% | 0% | 0.30 | 40-54 | 0.30 | 0.35 |
| 6 | 50% | 50% | 50% | 50% | 50% | 50% | 50% | 50% | 0.35 | 40-54 | 0.35 | 0.40 |
| 7 | 0% | 100% | 0% | 100% | 0% | 100% | 0% | 100% | 0.40 | 40-62 | 0.40 | 0.50 |
| 8 | 100% | 50% | 100% | 50% | 100% | 50% | 100% | 50% | 0.50 | 40-49 | 0.50 | 0.55 |
| 9 | 50% | 100% | 50% | 100% | 50% | 100% | 50% | 100% | 0.55 | 40-52 | 0.55 | 0.63 |
| 10 | 75% | 100% | 75% | 100% | 75% | 100% | 75% | 100% | 0.63 | 40-50 | 0.63 | 0.70 |
| 11 | 100% | 100% | 100% | 100% | 100% | 100% | 100% | 100% | 0.70 | 40-40 | 0.70 | 0.90 |

Flowchart 3

| Outlet | Nozzle 1 | | Nozzle 2 | | Nozzle 3 | | Nozzle 4 | | Average Nozzle Flow (GPM) | PSI Range | Flow Rate Low | Flow Rate High |
|---|---|---|---|---|---|---|---|---|---|---|---|---|
| | 1 | 2 | 1 | 2 | 1 | 2 | 1 | 2 | | | | |
| | 03 | 04 | 03 | 04 | 03 | 04 | 03 | 04 | | | | |
| | 0.30 | 0.40 | 0.30 | 0.40 | 0.30 | 0.40 | 0.30 | 0.40 | | | | |
| Block | PWM Duty Cycle | | | | | | | | | | | |
| 1 | 50% | 0% | 50% | 0% | 50% | 0% | 50% | 0% | 0.15 | 40-58 | 0.15 | 0.18 |
| 2 | 50% | 0% | 0% | 50% | 50% | 50% | 0% | 50% | 0.18 | 40-49 | 0.18 | 0.20 |
| 3 | 0% | 50% | 0% | 50% | 0% | 50% | 50% | 50% | 0.20 | 40-63 | 0.20 | 0.25 |
| 4 | 50% | 0% | 100% | 0% | 100% | 0% | 100% | 0% | 0.25 | 40-58 | 0.25 | 0.30 |
| 5 | 100% | 0% | 0% | 100% | 0% | 100% | 0% | 100% | 0.30 | 40-54 | 0.30 | 0.35 |
| 6 | 100% | 0% | 100% | 100% | 0% | 100% | 50% | 100% | 0.35 | 40-54 | 0.35 | 0.40 |
| 7 | 0% | 100% | 0% | 100% | 0% | 100% | 0% | 100% | 0.40 | 40-58 | 0.40 | 0.48 |
| 8 | 0% | 100% | 50% | 100% | 100% | 50% | 50% | 100% | 0.48 | 40-52 | 0.48 | 0.55 |
| 9 | 100% | 50% | 100% | 50% | 100% | 50% | 100% | 50% | 0.50 | 40-49 | 0.50 | 0.55 |
| 10 | 50% | 100% | 50% | 100% | 50% | 100% | 50% | 100% | 0.55 | 40-52 | 0.55 | 0.63 |
| 11 | 100% | 100% | 100% | 100% | 100% | 100% | 50% | 100% | 0.63 | 40-50 | 0.63 | 0.70 |
| 12 | 100% | 100% | 100% | 100% | 100% | 100% | 100% | 100% | 0.70 | 40-40 | 0.70 | 0.90 |

FIG. 16

FIG. 17  Flowchart 4

| Outlet | Nozzle 1 | | Nozzle 2 | | Nozzle 3 | | Nozzle 4 | | Average Nozzle Flow (GPM) | PSI Range | Flow Rate Low | Flow Rate High |
|---|---|---|---|---|---|---|---|---|---|---|---|---|
| | 1 | 2 | 1 | 2 | 1 | 2 | 1 | 2 | | | | |
| | 02 | 10 | 02 | 10 | 02 | 10 | 02 | 10 | | | | |
| Block | | | PWM Duty Cycle | | | | | | | | | |
| 1 | 50% | 0% | 50% | 0% | 50% | 0% | 50% | 0% | | | | |
| 2 | 100% | 0% | 100% | 0% | 100% | 0% | 100% | 0% | | | | |
| 3 | 95% | 5% | 95% | 5% | 95% | 5% | 95% | 5% | 0.10 | 40-70 | 0.15 | 0.18 |
| 4 | 90% | 10% | 90% | 10% | 90% | 10% | 90% | 10% | 0.20 | | | |
| 5 | 85% | 15% | 85% | 15% | 85% | 15% | 85% | 15% | 0.24 | 40-90 | 0.20 | 0.25 |
| 6 | 80% | 20% | 80% | 20% | 80% | 20% | 80% | 20% | 0.28 | 40-54 | 0.30 | 0.35 |
| 7 | 75% | 25% | 75% | 25% | 75% | 25% | 75% | 25% | 0.32 | 40-54 | 0.35 | 0.40 |
| 8 | 70% | 30% | 70% | 30% | 70% | 30% | 70% | 30% | 0.36 | 40-62 | 0.40 | 0.50 |
| 9 | 65% | 35% | 65% | 35% | 65% | 35% | 65% | 35% | 0.40 | 40-49 | 0.50 | 0.55 |
| 10 | 60% | 40% | 60% | 40% | 60% | 40% | 60% | 40% | 0.44 | 40-65 | 0.55 | 0.70 |
| 11 | 55% | 45% | 55% | 45% | 55% | 45% | 55% | 45% | 0.48 | | | |
| 12 | 50% | 50% | 50% | 50% | 50% | 50% | 50% | 50% | 0.52 | | | |
| 13 | 45% | 55% | 45% | 55% | 45% | 55% | 45% | 55% | 0.56 | | | |
| 14 | 40% | 60% | 40% | 60% | 40% | 60% | 40% | 60% | 0.60 | 40-90 | 0.20 | 0.25 |
| 15 | 35% | 65% | 35% | 65% | 35% | 65% | 35% | 65% | 0.64 | 40-54 | 0.30 | 0.35 |
| 16 | 30% | 70% | 30% | 70% | 30% | 70% | 30% | 70% | 0.68 | 40-54 | 0.35 | 0.40 |
| 17 | 25% | 75% | 25% | 75% | 25% | 75% | 25% | 75% | 0.72 | 40-62 | 0.40 | 0.50 |
| 18 | 20% | 80% | 20% | 80% | 20% | 80% | 20% | 80% | 0.76 | 40-49 | 0.50 | 0.55 |
| 19 | 15% | 85% | 15% | 85% | 15% | 85% | 15% | 85% | 0.80 | 40-65 | 0.55 | 0.70 |
| 20 | 10% | 90% | 10% | 90% | 10% | 90% | 10% | 90% | 0.84 | | | |
| 21 | 5% | 95% | 5% | 95% | 5% | 95% | 5% | 95% | 0.88 | | | |
| 22 | 0% | 100% | 0% | 100% | 0% | 100% | 0% | 100% | 0.92 | | | |
| | | | | | | | | | 0.96 | | | |
| | | | | | | | | | 1.00 | 40-70 | 1.0 | 1.3 |

FIG. 18 Flowchart 5

| Outlet | Nozzle 1 | | Nozzle 2 | | Nozzle 3 | | Nozzle 4 | | Average Nozzle Flow (GPM) | PSI Range | Flow Rate Low | Flow Rate High |
|---|---|---|---|---|---|---|---|---|---|---|---|---|
| | 1 | 2 | 1 | 2 | 1 | 2 | 1 | 2 | | | | |
| | 02 | 10 | 02 | 10 | 02 | 10 | 02 | 10 | | | | |
| Block | PWM Duty Cycle | | | | | | | | | | | |
| 1 | 100% | 0% | 100% | 0% | 100% | 0% | 100% | 0% | 0.20 | 40-58 | 0.20 | 0.24 |
| 2 | 100% | 5% | 100% | 5% | 100% | 5% | 100% | 5% | 0.25 | 40-58 | 0.24 | 0.28 |
| 3 | 100% | 10% | 100% | 10% | 100% | 10% | 100% | 10% | 0.30 | 40-54 | 0.28 | 0.32 |
| 4 | 100% | 15% | 100% | 15% | 100% | 15% | 100% | 15% | 0.35 | 40-52 | 0.32 | 0.36 |
| 5 | 100% | 20% | 100% | 20% | 100% | 20% | 100% | 20% | 0.40 | 40-52 | 0.36 | 0.40 |
| 6 | 100% | 25% | 100% | 25% | 100% | 25% | 100% | 25% | 0.45 | 40-48 | 0.40 | 0.44 |
| 7 | 100% | 30% | 100% | 30% | 100% | 30% | 100% | 30% | 0.50 | 40-65 | 0.44 | 0.48 |
| 8 | 100% | 35% | 100% | 35% | 100% | 35% | 100% | 35% | 0.55 | | 0.48 | 0.52 |
| 9 | 100% | 40% | 100% | 40% | 100% | 40% | 100% | 40% | 0.60 | | 0.52 | 0.56 |
| 10 | 100% | 45% | 100% | 45% | 100% | 45% | 100% | 45% | 0.65 | | 0.56 | 0.60 |
| 11 | 100% | 50% | 100% | 50% | 100% | 50% | 100% | 50% | 0.70 | | 0.60 | 0.64 |
| 12 | 100% | 55% | 100% | 55% | 100% | 55% | 100% | 55% | 0.75 | | 0.64 | 0.68 |
| 13 | 100% | 60% | 100% | 60% | 100% | 60% | 100% | 60% | 0.80 | | 0.68 | 0.72 |
| 14 | 100% | 65% | 100% | 65% | 100% | 65% | 100% | 65% | 0.85 | | 0.72 | 0.76 |
| 15 | 100% | 70% | 100% | 70% | 100% | 70% | 100% | 70% | 0.90 | | 0.76 | 0.80 |
| 16 | 100% | 75% | 100% | 75% | 100% | 75% | 100% | 75% | 0.95 | | 0.80 | 0.84 |
| 17 | 100% | 80% | 100% | 80% | 100% | 80% | 100% | 80% | 1.00 | | 0.84 | 0.88 |
| 18 | 100% | 85% | 100% | 85% | 100% | 85% | 100% | 85% | 1.05 | | 0.88 | 0.92 |
| 19 | 100% | 90% | 100% | 90% | 100% | 90% | 100% | 90% | 1.10 | | 0.92 | 0.96 |
| 20 | 100% | 95% | 100% | 95% | 100% | 95% | 100% | 95% | 1.15 | | 0.96 | 1.00 |
| 21 | 100% | 100% | 100% | 100% | 100% | 100% | 100% | 100% | 1.20 | 40-70 | 1.00 | 1.60 |

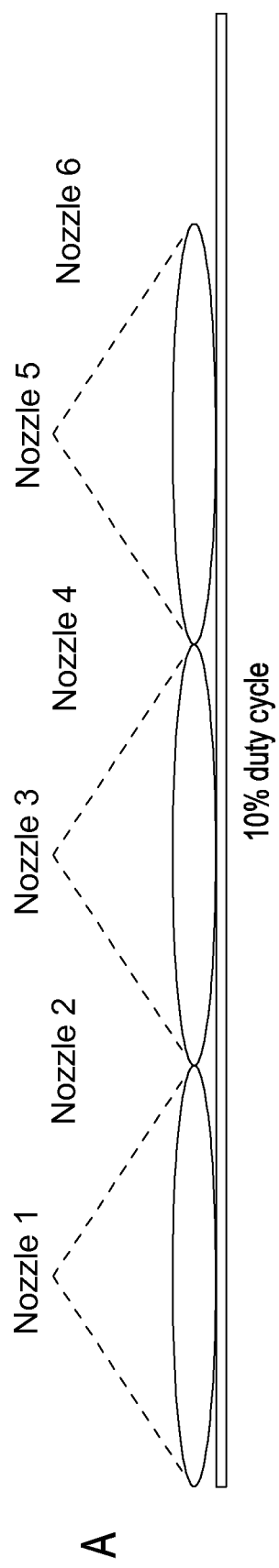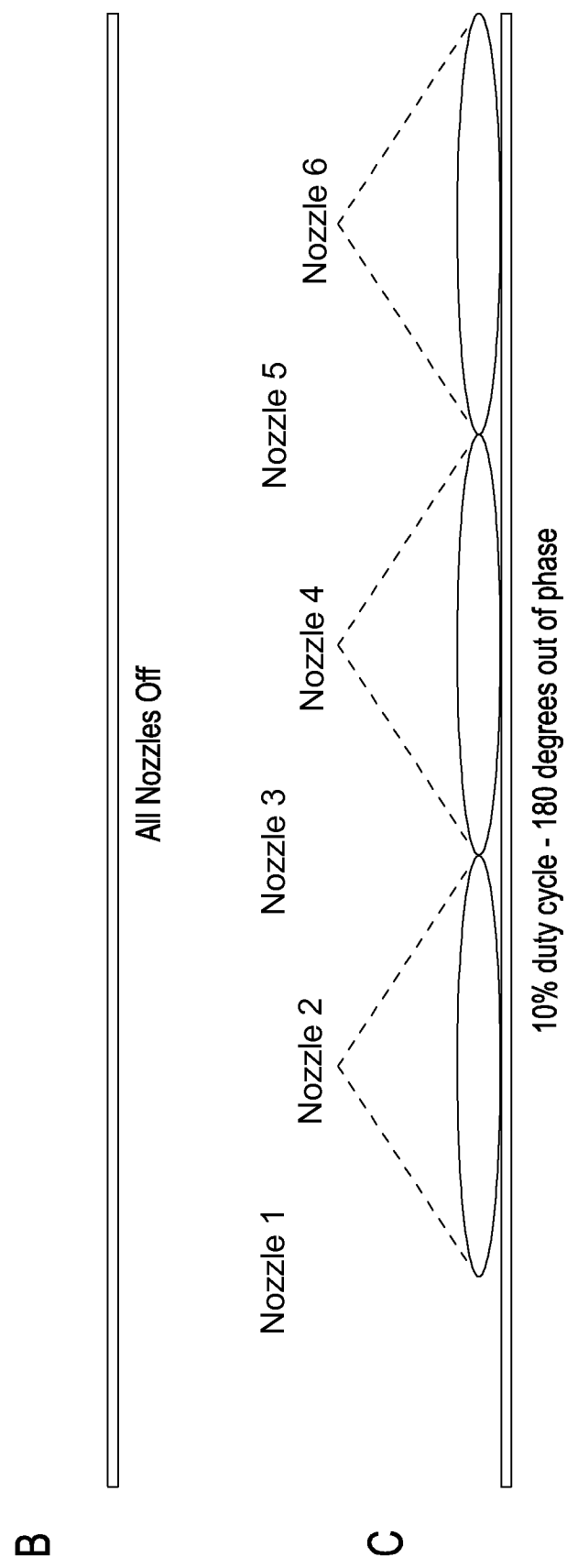
FIG. 23B

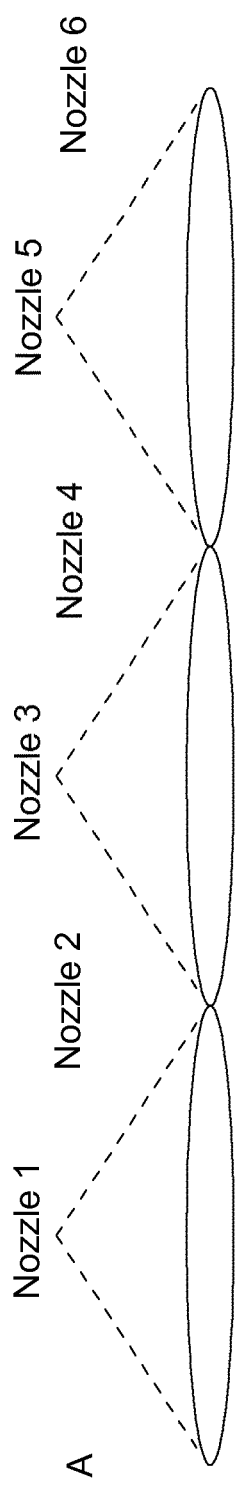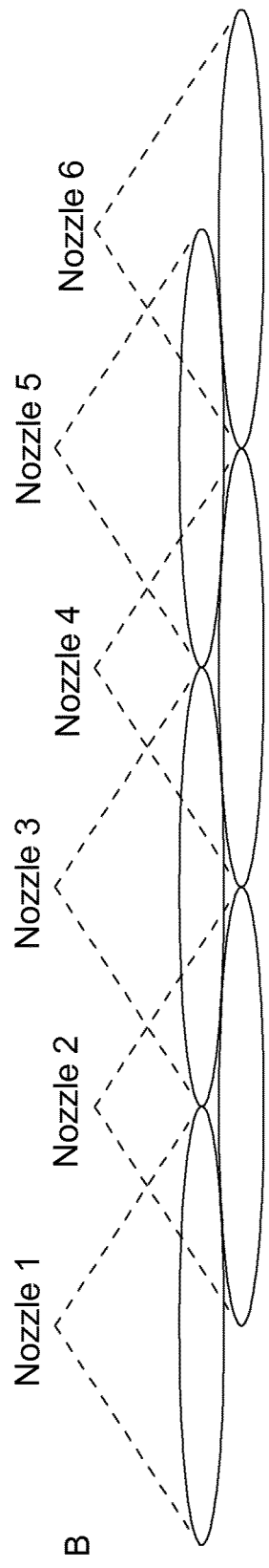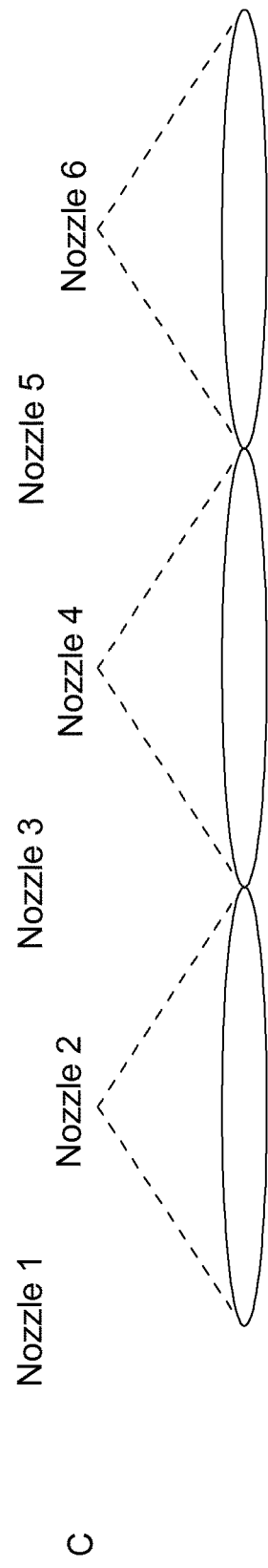
FIG. 25A

| Block | Nozzle 1 | Nozzle 2 | Nozzle 3 | Nozzle 4 | Average Nozzle Size | PSI Range | Flow Rate Low | Flow Rate High |
|---|---|---|---|---|---|---|---|---|
| 1 | 03 | 03 | 03 | 03 | 03 | 40-50 | 0.3 | 0.35 |
| 2 | 03 | 04 | 03 | 04 | 035 | 40-50 | 0.35 | 0.4 |
| 3 | 04 | 04 | 04 | 04 | 04 | 40-60 | 0.4 | 0.5 |
| 4 | 03 | 03 + 04 | 03 | 03 + 04 | 05 | 40-50 | 0.5 | 0.055 |
| 5 | 04 | 03 + 04 | 04 | 03 + 04 | 055 | 40-70 | 0.55 | 0.7 |
| 6 | 03 + 04 | 03 + 04 | 03 + 04 | 03 + 04 | 07 | 40-70 | 0.7 | 0.9 |

FIG. 29

TIME VARYING CONTROL OF THE OPERATION OF SPRAY SYSTEMS

RELATED APPLICATIONS

This patent application is a continuation-in-part of U.S. patent application Ser. No. 14/506,057, filed Oct. 3, 2014, and entitled, HYBRID FLOW NOZZLE AND CONTROL SYSTEM, which claims priority to U.S. Provisional Patent Application Ser. No. 62/015,315 also entitled HYBRID FLOW NOZZLE AND CONTROL SYSTEM, both the contents of which are incorporated herein by reference. This patent application claims priority to U.S. patent application Ser. No. 14/505,944, filed Oct. 3, 2014, and entitled, BROADBAND SPRAY NOZZLE SYSTEMS AND METHODS, the contents of which are incorporated herein by reference. This patent application also claims priority to U.S. Provisional Patent Application Ser. No. 62/050,530, filed Sep. 15, 2014, and entitled, TIME VARYING CONTROL OF THE OPERATION OF SPRAY SYSTEMS, the contents of which are incorporated herein by reference.

FIELD OF THE DISCLOSURE

This disclosure relates generally to the control system of liquid spraying systems.

BACKGROUND OF THE DISCLOSURE

Over twenty-five years ago, a method of using a pulse signal to actuate a valve was introduced to control the flow rate and fluid pressure of liquids through a spray nozzle. Since then, this technique has remained largely the same or unused because it results in spotty spray patterns due to long dead times, which creates problems in an agricultural setting (e.g. crops, plants, trees, vegetables, winery), where sprayers are used to apply nutrients, herbicides, insecticides and water. In manufacturing settings, sprayers are used to apply coatings of paint colors and layers of chemicals, and ink on surfaces (e.g. plastic, paper, semiconductors, metals, and so on).

When pulse signals have been used to control the spray of fluids, the ejection of fluid from conventional single nozzles has been controlled by a single signal pulse stream. The voltage polarity of the signal pulse may be arbitrarily selected so that when the pulse is at a logic-HIGH value, then liquid is dispersed by the nozzle, and when the pulse is at a low value, no liquid is dispersed. The ON state is arbitrarily chosen to refer to when liquid is propelled or ejected, and the OFF state to no liquid. The duration of the ON or OFF pulse can be varied (PWM, pulse width modulated) to generate an average flow rate, to vary the flow rate and to control the droplet size.

In many settings, not just a single but multiple nozzles are used together. Sprayer systems have multiple nozzle bodies or outlets to apply liquids over a large or intricate surface area. Sometimes the activity of more than one hundred nozzles is coordinated, which makes PWM control complex.

SUMMARY OF THE DISCLOSURE

Embodiments include a sprayer system having dynamic pre-sets to control nozzle bodies that each individually operates continuously or under a time-modulated or a frequency-modulated electronic signal control to release the liquid droplets. Example nozzle bodies have parallel fluid outputs and different types of nozzle tips on the fluid outputs. By dynamically switching among the outputs with different nozzle tips, adjusting the electronic signal, and overlapping the spray from adjacent nozzles, the individual nozzle bodies cover a larger dynamic range of performance and can hold the fluid droplet size more steadily under different travel speeds. Collectively, adjacent or near neighboring nozzle bodies are controlled by time-sequencing through different modes of operation or physical configurations on each nozzle body, which again covers a wider range of spray operation. The nozzle bodies are mounted on a variety of implements including agricultural or industrial spray booms. Other operation modes, features and embodiments are disclosed in the detailed description, accompanying drawings and claims.

BRIEF DESCRIPTION OF THE DRAWINGS

The details of one or more implementations are set forth in the accompanying example drawings, the description and claims below.

FIG. 3A depicts an example timing diagram for the operation of the nozzle topology of FIG. 3.

FIG. 4A depicts an example timing diagram for the operation of the nozzle topology of FIG. 4.

FIG. 110 is a flowchart depicting an example simplified method to control the spray nozzles.

FIG. 12 is a table listing example control modes of operation for a single nozzle.

FIG. 13 is a table listing an example method of adjusting the fluid pressure and flow rate.

FIG. 14 is a flowchart in tabular format listing an example method of sequencing through an example set of spray configurations for four adjacent nozzles.

FIG. 15 is a flowchart in tabular format listing an example method of sequencing through another example set of spray configurations for four nozzles.

FIG. 16 is a flowchart in tabular format listing an example method of sequencing through another example set of spray configurations for four nozzles.

FIG. 17 is a flowchart in tabular format listing an example method of sequencing through another example set of spray configurations for four nozzles.

FIG. 18 is a flowchart in tabular format listing an example method of sequencing through another example set of spray configurations for four nozzles, where an air induction and non-air induction nozzle tips are used on the nozzle outlets.

FIG. 23B depicts an example spray output for six adjacent nozzles.

FIG. 25A depicts example spray pattern related to the method that produced the timing diagram of FIG. 25B.

FIG. 29 depicts example spray pattern for four adjacent nozzles based on a method that produced the timing sequence of FIG. 28.

DETAILED DESCRIPTION

Figure 1:
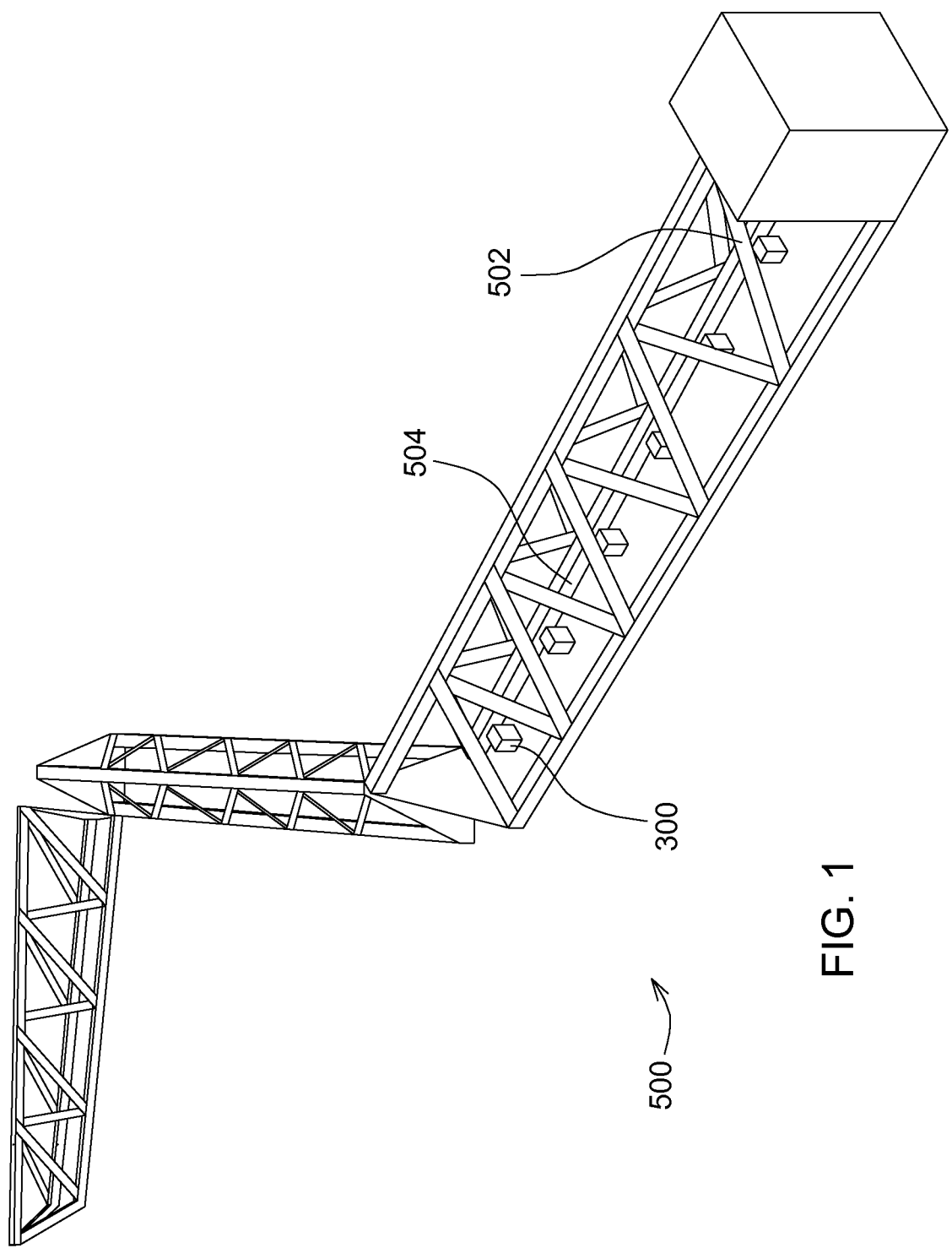
FIG. 1 depicts an example structure or boom having multiple example nozzles.

Disclosed example dynamic pre-set embodiments permit easy control of the spray system having many nozzles (nozzle body plus nozzle tips) to cover a wide range of spray conditions automatically, eject the fluid quickly, but still uniformly, accurately, without requiring an operator to manually change nozzle configurations or spray tips on the nozzles. When conditions change (e.g. the spray surface or terrain changes), the disclosed spray systems having dynamic pre-sets provide better incremental flow rate change resolution than traditional techniques. The pre-sets attempt to maintain certain measured variables within some performance range. For instance, the fluid spray pressure is kept within +/−5% from nominal by revising the PWM signal, the nozzle tip, the flow rate, etc. Accordingly, skips in the spray pattern are reduced and there is more uniform coverage of the target being sprayed.

The example embodiments include electronically wired or wirelessly controlled sprayer systems with dynamic pre-sets that have the ability to coordinate the activity of adjacent or nearby nozzles (housing) in the sprayer system. The dynamic pre-sets also take advantage of features of a new type of nozzle (body and tips). Each nozzle has multiple outlets, multiple inlets (some embodiments), and multiple valves or gates. Even within a single nozzle, more than one pulse width modulated (PWM) signals may be applied or interleaved to control different valves that control fluid flow. The ability to switch among the different features enables a wider dynamic spray range including wider frequency bandwidth, wider range of pressure, or flow rates so that an end-user does not need to stop the vehicle and physically adjust the nozzles or the rest of the spray vehicle. Alternatively, the different features are invoked by the pre-sets to maintain a variable (e.g. fluid pressure) within a narrow range. Pre-sets are created to sequence through different operation states and to make decisions that an operator would not be able to do so because she is located remotely from the nozzles or otherwise unable to adjust them. The pre-sets determine, modulate the duration of the signals, adjust the height of the apparatus, and so on, to control of the spray release from individual nozzles.

In various embodiments, the control is automated after an operator selects a pre-set that makes dynamic decisions that take into account other factors (e.g. speed of nozzle or vehicle travel, location, wind velocity, nozzle distance relative to the spray target and so on). The operator provides voice commands or touch-screen commands entered into a master electronic computer or programmable electrical circuit that governs the sprayer system (e.g. spray boom) and also the operation of a vehicle on which the sprayer system is mounted. In some embodiments, there is sequencing through the physical modes (e.g. different nozzle outlets, different valves, and signal duration modulation) on each nozzle body; or alternatively, sequencing through only modes of frequency operation but keeping the physical configuration (e.g. same outlet) constant.

The example embodiments provide better resolution in the incremental change in flow rate, and maintain nearly constant pressure (to better than 95%) to generate more uniform droplet size. Although this disclosure focuses on macroscopic sprayers used in an outdoor field, small sprayers and nozzles for industrial manufacturing or even micro-electro-mechanical (MEMs) sized sprayers also benefit from the disclosed ideas. For instance, industrial uses include a relative motion between a sprayer and the target object that may be irregular in shape or have sharp edges, thus may desire rapid changes in the pattern or amount of spray released.

FIG. 1 depicts an example spray boom assembly 500 having many nozzles 502 mounted on or clamped to a fluid distribution pipe (e.g. 504) that attaches to the boom assembly 500 that is in turn mounted on a dolly platform, or a vehicle, for example, a tractor or self propelled sprayer or a nutrient applicator towed by a motorized vehicle. The fluid distribution pipe 504 that carries the fluid is mounted externally to a tubular boom or within the hollow of a tubular boom or between the trusses of the boom assembly 500.

Figure 1A:
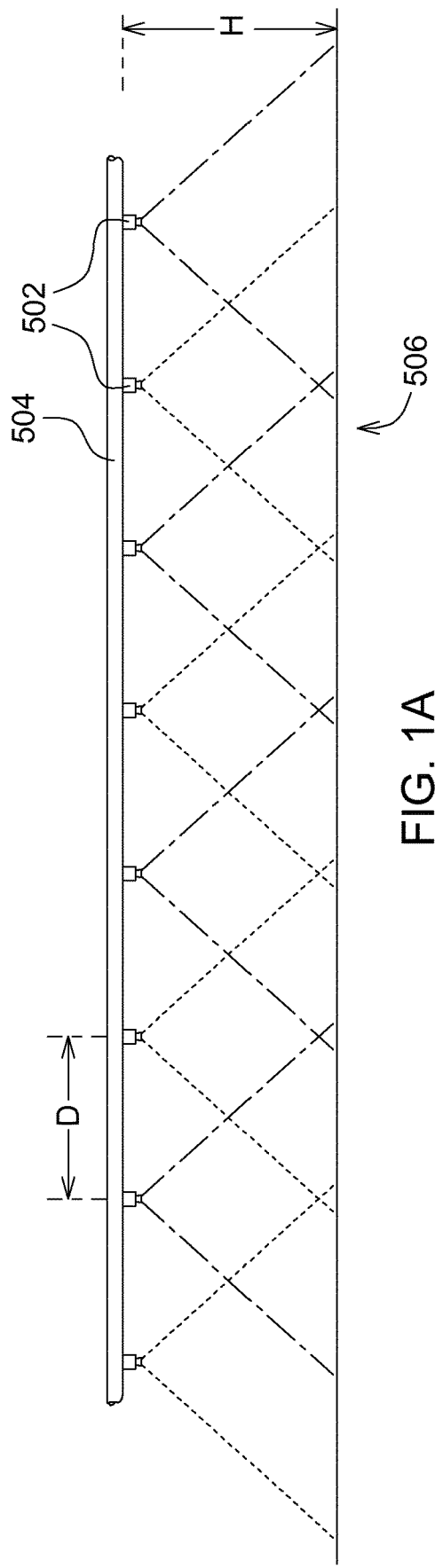
FIG. 1A depicts an example spray pattern where the nozzles are spaced apart a distance and the spray from adjacent and next nearest adjacent nozzle overlaps.

FIG. 1A depicts a front profile view the fluid distribution pipe 504 and the nozzles 502 releasing a fluid. The nozzles 502 are spaced apart a distance D, and the pipe 504 is at a height H from the target 506, such that there is spray overlap between nearest adjacent nozzles 502. There is also a little spray overlap, 2%-5%, between next nearest adjacent nozzles 502 in the example of FIG. 1A. Adjustment of the distance D and height H determines the amount of spray overlap.

Figure 2:
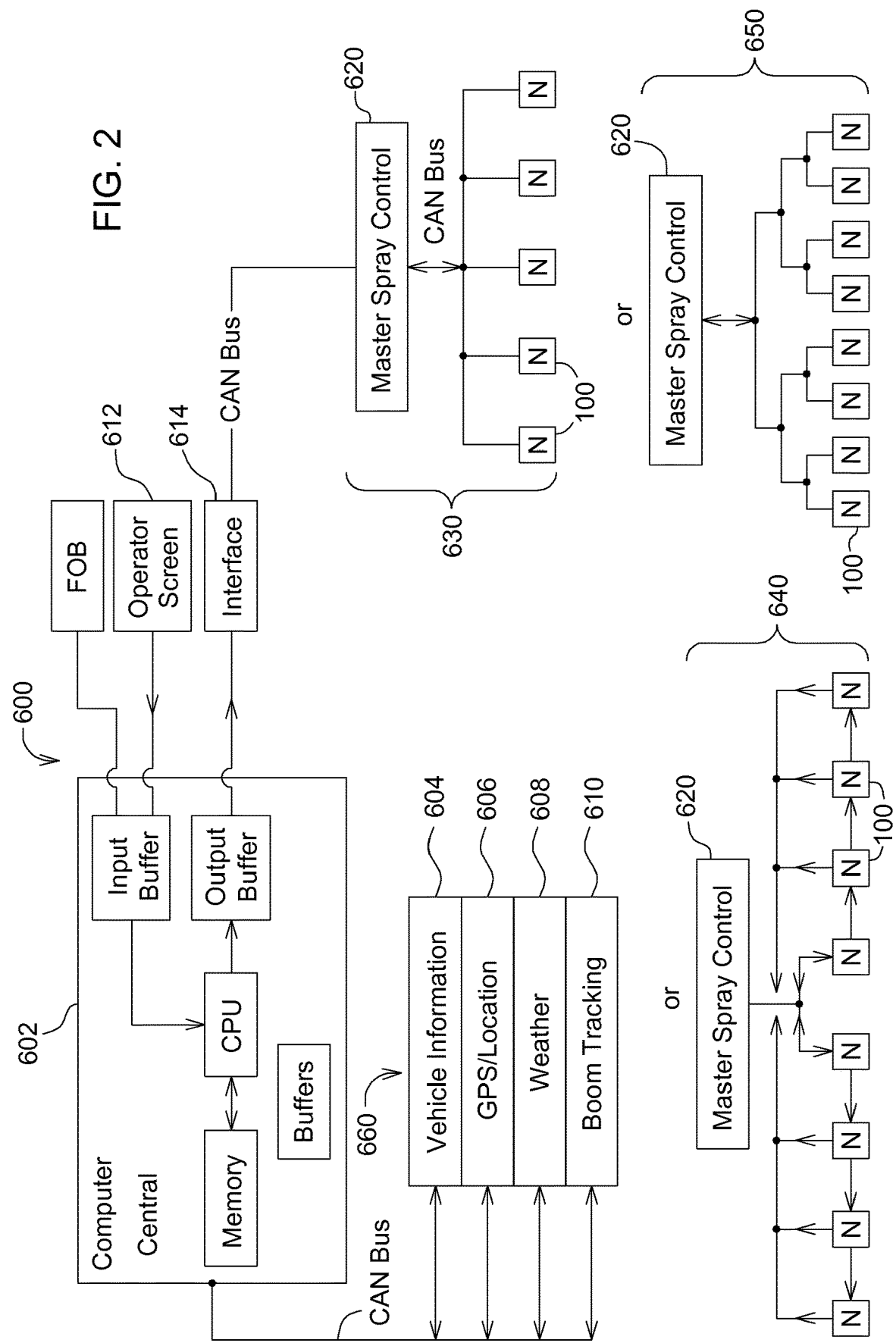
FIG. 2 depicts a schematic of an example circuit governing multiple nozzles.
Figure 3:
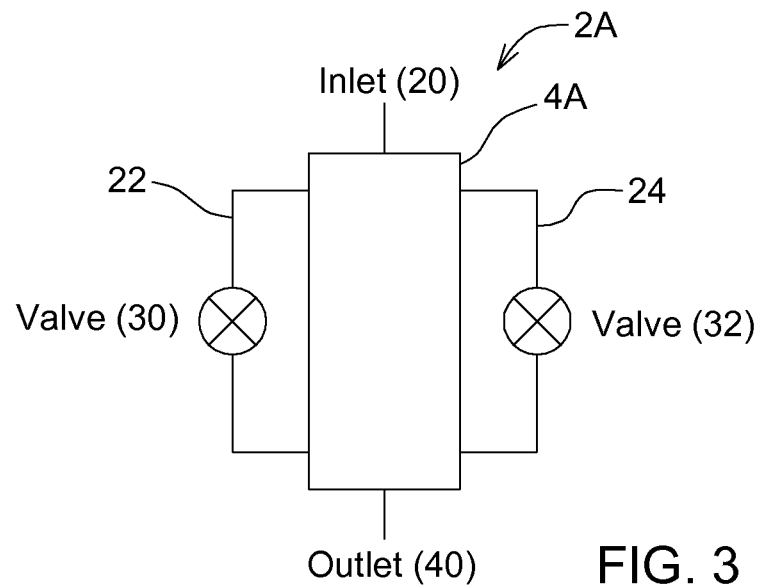
FIG. 3 depicts an example nozzle topology.

FIG. 2 depicts an example machine control 600 system of electronics that uses CAN-bus 660 as an example communication backbone to coordinate the activity of many types of signal inputs and interruptions that may occur. Machine control 600 includes an operator's central computer 602 or server situated at locations on a farm site, a cab of a tractor, or an industrial machine. Machine control 600 as well as any number of interrupters (e.g. central computer 602, operator's touchscreen 612 or remote starter, spray interface 614, vehicle information 604, GPS/locator 606, weather inputs 608, boom tracking 610) can interrupt the CAN-bus 660 and take control, including a master spray controller 620. Usually there is more than one nozzle 100 or 300 in operation so that the master spray controller 620 is used to coordinate the activities of the different nozzles 100 (or 300). The master spray controller 620 includes a microprocessor plus peripherals or a microcontroller (e.g. CPU, memory, etc.) mounted to the spray boom suspension electronics portal (not shown). The master spray controller 620 addresses each nozzle 100 and performs the functions of an interface for each nozzle 100 to the CAN bus, controls collective activity, including a synchronization or timing architecture 630 of spray performance by simultaneously sending a master clock to each nozzle 100, sequences through programmed instructions including pre-sets for the more likely operational scenarios including turn compensation or a spray boom assembly 500 (reducing spray), and coordinates needs including power management. To reduce the amount of wiring, the master clock and other common signals are distributed or fanned out by a trunk-tree-branch method to four or five sections of nozzles 100 or 300 (e.g. 650 on the right hand side of FIG. 2). The branches fan out the signals via CAN-bus to each individual nozzle 100. Alternatively, the signals are fanned out to a branch, and within a branch the signals are passed sequentially from one nozzle to another, regenerated by each nozzle. Another alternative is a completely sequential distribution of common signals including the clock signals to each nozzle 100.

In other example implementations of the sequencing methods, the master spray controller 620 sets a master clock under a timing architecture 640 as depicted in FIG. 2. The signal of the master clock is relayed from one nozzle, regenerated by each nozzle to avoid voltage droop, and then relayed to the next nozzle (see FIG. 2). Each nozzle 100 (or 300) experiences a slight delay in its local clock relative to the clock of the previous nozzle 100. This slight delay prevents a simultaneous electronic glitch when all of the actuators (e.g. solenoids) turn ON or OFF the valves in a nozzle 100. Alternatively, in timing architectures 630 or 650, the master clock is sent simultaneously to the branches of nozzles 100 along independent wire paths and current or voltage glitches are isolated by circuits including a small transformer accompanying the solenoid type actuators. In timing architecture 650, the CAN-bus wiring or local wiring are split in a tree structure with the same length wires so that each nozzle 100 should receive the clock simultaneously. Sequences of instructions (e.g. pre-sets) are automatically or manually (click-by-click to the next set of instructions by a human operator) exercised by the master spray controller 620 that coordinates all of the nozzles 100. Each individual nozzle 100 has a local nozzle controller circuit that, for example, modulates the pulse width duration of signals to open and close the valves on each nozzle 100. For example, the local nozzle controller generates independent pulse signals that control each of the valves, or generates a combination of pulse signals and continuous signals. For special circumstances (e.g. cleaning), a single signal is generated and simultaneously opens and close two or more valves or gates in a single nozzle 100.

Examples of physical spray nozzles 100 and 300 are depicted in FIGS. 8 and 9A. Physical spray nozzles 100 and 300 have nozzle bodies 170 and 370, respectively. In FIGS. 8 and 9A, the nozzle bodies include an inlet and outlets that are connected together by physical structures including a fluid chamber, tubes, valves and a turret, basically everything in FIGS. 8 and 9A except the nozzle tips (e.g. 130A, 130B, 130C) that cap the outlets. The inlets and outlets refer to a surface or a walled structure that defines or surrounds an aperture or opening. This disclosure first presents the operation and physical configuration of an individual nozzle body or holder using idealized drawings. FIGS. 3-7 show example nozzle topologies 2A-2E for an individual nozzle body that includes at least one fluid inlet, valves to control fluid flow, and at least one fluid outlet. The valves are often located within a nozzle body or just on the periphery even though the figures depict them as being outside. The outlet(s) are also part of a nozzle body, or just on the periphery; the outlet permits the release of the fluid. The topologies are simplified drawings to aid an understanding of the path of the fluid flow and the operational mechanism. After much testing and design revisions, certain physical implementations were found to work well, as described below.

FIG. 3 depicts an example nozzle topology 2A having a nozzle body 4A with two gates or valves 30 and 32 on paths 22 and 24, respectively. Nozzle body 4A selectively releases fluid and droplets to outlet 40. Nozzle topology 2A receives a liquid input from inlet 20, at least a portion of which flows to outlet 40 as controlled by opening and closing the valves 30 and 32. A fluid can travel either or both of the paths 22 and 24 as controlled by valves 30 and 32, respectively. Outlet 40 attaches to or may physically be covered by at least a turret body, nozzle tip or nozzle cap. Depending on the end-use purpose, nozzle body 4A may be of different shapes, including a hose, a pipe, a sphere, a single nozzle body with holes, or other geometries. FIG. 3 depicts a topology that may constitute an entire nozzle, or it may constitute only a portion of a single nozzle. The configuration of FIG. 3 is integrated into, as part of nozzle body 4E (e.g. left side of nozzle of FIG. 5) so that two valves open and close to transfer fluids from the inlet 20 to a single outlet 40. Moreover, valves 30 and 32 may be identical in design or different.

FIG. 3A depicts an example operation of nozzle topology 2A. Electric pulse signals 3 and 5 are applied to respective actuators (not shown or may be part of the valves) that open and close valves 30 and 32, respectively. For example, the actuator is a plunger-type actuator including an in-line solenoid valve. Each valve 30 or 32 is opened and closed when an electric current flows through a solenoid (wrapped around a core) that creates an electromagnetic field to propel the core or poppet to move. The motion of the core or poppet pushes or pulls valve 30 or 32 associated with the core or poppet. Alternatively, linear voice coil actuators (e.g. hysteresis free, electromagnetic push-pull actuators), electrical-voltage powered, hydraulic or piston valves are used. Electrical valves include running electric power lines along the length of a spray boom to switch open or close the valve 30 or 32. In this disclosure, the polarity is arbitrarily chosen so that a HIGH value of the signal corresponds to valve open or ON, and a low value of the signal corresponds to valve closed or OFF. In FIG. 1A, during a full period T of operation of nozzle body 4A, pulse signal 3 is ON more than 50% of the duration of period T (over 50% duty cycle), while pulse signal 5 is ON for less than 50% of the duration of period T (less than 50% duty cycle). The duty cycle generally refers to a percentage of time when fluid is released to a target object as compared to a total time of operation. In the example of FIG. 3A, valve 30 is open to let fluid flow for more than 50% of a period T and valve 32 is open to let fluid flow for less than 50% of a period T. The aggregate or resulting signal pulse train depicted in FIG. 3A has a frequency that is two times higher than the frequency of either pulse signal 3 or 5. Fluid droplets are sprayed twice as fast as that of a nozzle body 4A having only one valve operating under a pulse-width modulated signal.

In FIG. 3A, the width of the pulse signals 3 and 5 are fixed; to adjust the flow rate or fluid pressure, the widths are modulated, increased or decreased, depending on the duration and on the polarity (regardless whether open valve corresponds to ON or OFF). Also, for some types of chemicals or paints, a manufacturer specifies the optimal amount of fluid for best coverage. A corresponding fluid flow rate or flow rate range is preselected to achieve the coverage, which often involves modulating the pulse widths to keep within the specified range based on the speed of travel of the nozzle or vehicle to which nozzles are mounted. Further, to create a dithering effect or a more diffuse scattering of the droplets, the duration or frequency of each pulse signal 3 and 5 is varied or modulated rather than be fixed as shown in example FIG. 3A. The volume of fluid transferred or sprayed depends partly on the duty cycle or how long the valves 30 and 32 remain open. The example of FIG. 3A depicts an asymmetric operation and more fluid is released from valve 30 than from valve 32. In this example, pulse signals 3 and 5 are non-overlapping, and they are operating out of phase. If the entire period T is taken to represent 360 degrees, the leading edge of the pulse signals 3 and 5 are in a range of 250-300 degrees apart or out of phase. Signals 3 and 5 are generated independently; otherwise, they come from the same parent signal. For instance, if signal 3 is the parent signal, it is replicated, then shifted to generate signal 5; or the leading edge of pulse signal 3 operates on valve 30, and the trailing edge of signal 3 operates on valve 32 (signal 3 is replicated by inversion to present the proper polarity to valve 32). In other examples of operation, the pulse signals 3 and 5 overlap or are more symmetric for more repetitive release of the liquid droplets due to either valve 30 or 32. In yet other examples, the signals 3 and 5 are a sinusoid or ramp rather than a pulse in order to have a more gradual turn on or turn off of the spray droplets or to apply pressure gradually to the valves to open and close them.

In a paint, nutrient, herbicide or pesticide application embodiment where there may be different types of fluids being sprayed, the asymmetric operation of the valves permits achieving different desired ratio of fluids sprayed. When asymmetric fluid spraying is desired, one example possibility is to create a divider in the inlet 20 of nozzle body 4A. The divider (not shown) separates different types of fluids so that they flow into different chambers within nozzle body 4A and then are propelled out of nozzle body 4A, separately, by the action of the respective valves 30 and 32. In other examples, when both fluids are mixed together or sprayed simultaneously, the pulse signals 3 and 5 overlap for at least a part of the duration of period T.

Figure 4:
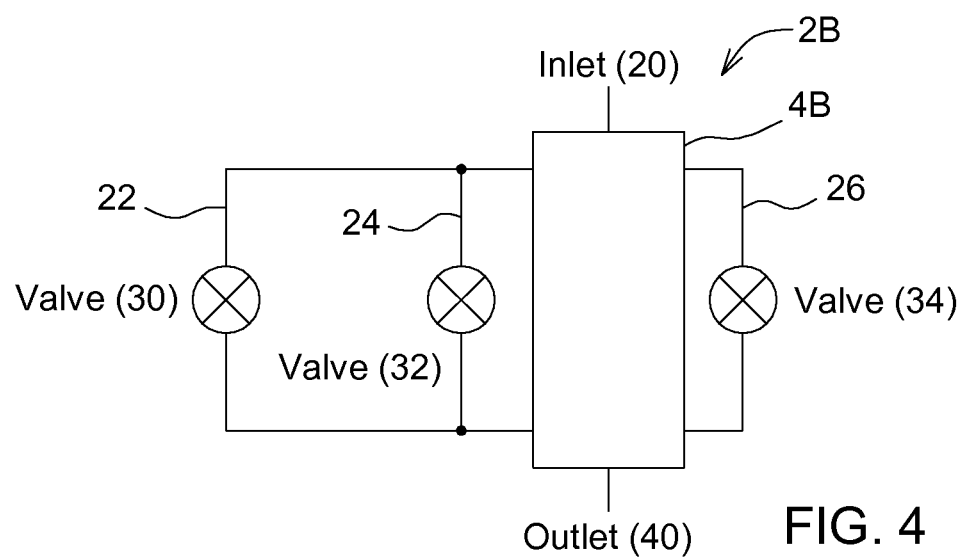
FIG. 4 depicts an example nozzle topology.

FIG. 4 depicts another example nozzle topology 2B having a single outlet. Nozzle topology 2B has a nozzle body 4B with three valves 30, 32 and 34 on paths 22, 24 and 26, respectively, paths that are drawn in parallel in this example. Nozzle body 4B selectively releases fluid and droplets to outlet 40. Nozzle topology 2B receives a liquid input from inlet 20, at least a portion of which flows to outlet 40 as controlled by opening and closing the valves 30, 32 and 34. Outlet 40 attaches to or may be covered by at least a turret body, nozzle tip or nozzle cap. Depending on the end-use purpose, nozzle body 4B includes a hose, a pipe, a sphere, past nozzles with a single nozzle body with holes, or other geometries.

FIG. 4A depicts an example operation of nozzle topology 2B that particularly shows how the frequency of fluid release is increased. Electric pulse signals 3 and 5 and 7 are applied to respective actuators that open and close valves 30 and 32 and 34, respectively. In FIG. 4A, during a full period T of operation, pulse signals 3, 5 and 7 are each ON less than 50% of the duration of period T (less 50% duty cycle); they are ON about 10-20% of the period T and allow fluid to flow through each valve for less than 10-20% of a period T. The ON phase of the pulse signals 3, 5 and 7 are equal in amplitude and duration. The example three pulse signals 3, 5 and 7 are shifted in phase by 100-120 degrees so that the aggregate or resulting signal pulse train depicted in FIG. 4A has a periodic frequency that is three times higher than the periodic frequency of any of the individual pulse signal 3, 5 or 7. Accordingly, fluid droplets are sprayed three times higher frequency than that of a nozzle body 4B having only one valve operating under a pulse signal 3, 5 or 7 alone. To create a dithering effect or diffuse scattering of the droplets, the duration or frequency of one or all of the pulse signals 3, 5 and 7 can be varied (or modulated) rather than be fixed width and fixed frequency as shown in example FIG. 4A. Among other factors, the volume of fluid transferred or sprayed depends on the duty cycle or how long the valves 30 and 32 and 34 remain open. In the example of FIG. 4A, there is symmetric operation and the amount of fluid from the three valves is released uniformly. Since pulse signals 3, 5 and 7 are non-overlapping, the valves are operating out of phase, and if the entire period is taken to represent 360 degrees, the leading edges of the pulse signals 3, 5 and 7 are in a range of 115-125 degrees apart or out of phase from the next one (3 from 5, 5 from 7, 7 from 3). In other examples, the pulse signals 3, 5 and 7 overlap or are asymmetric for more overlapping or diffuse spraying of the liquid droplets, respectively. In yet other examples, the signals 3, 5 and 7 are sinusoidal or ramped rather than a pulse in order to have a more gradual turn on or turn off of the spray droplets.

Figure 7:
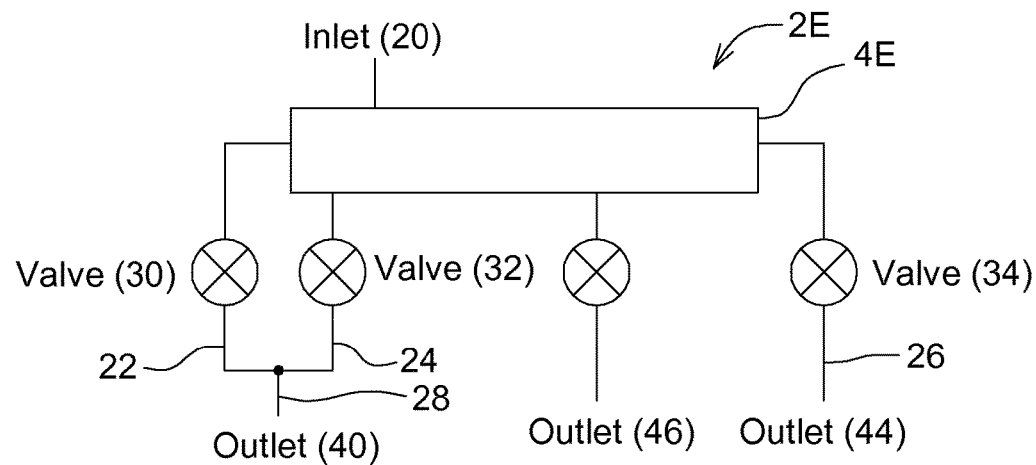
FIG. 7 depicts an example nozzle topology.
Figure 7A:
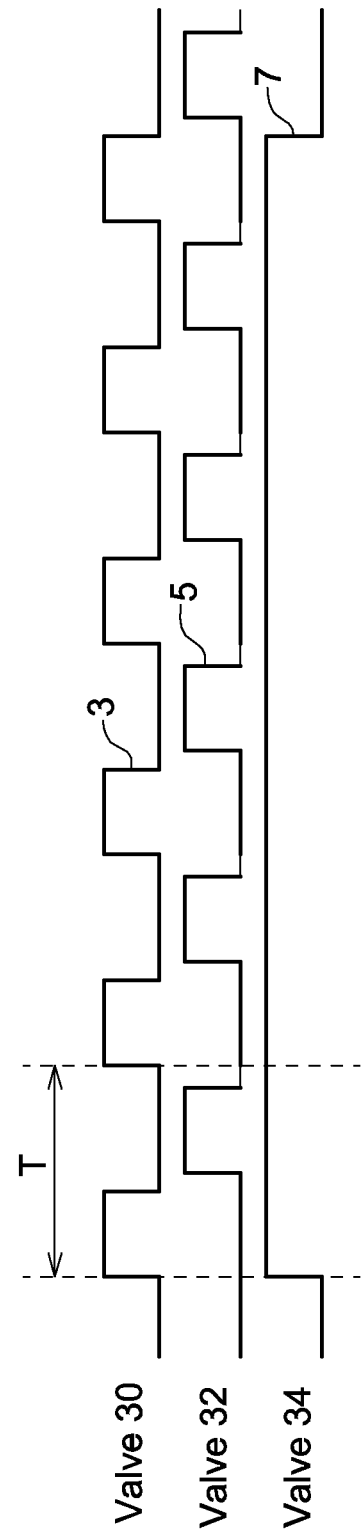
FIG. 7A depicts an example timing diagram to operate nozzle topology of FIG. 5.

In the examples of FIG. 3A or 4A, other possible valve operations include at least some of the signals shown in FIG. 7A. For instance, valves 30 and 32 operate as shown in FIG. 4A, and valve 34 is ON continuously or its frequency of motion is lower or higher than either valves 30 or 32. Moreover, the signals include other forms of periodic or semi-periodic signals including sine waves rather than pulses to create a more gentle turn on or turn off. Such mixture of operation for an individual nozzle body 4B or nozzle topology 2B is described in the aforementioned provisional patent applications when sequencing through multiple nozzle bodies 4B. Continuously refers to a state of being (e.g. an applied voltage, a logic state, valve position) that remains for the duration of an intended action.

Figure 5:
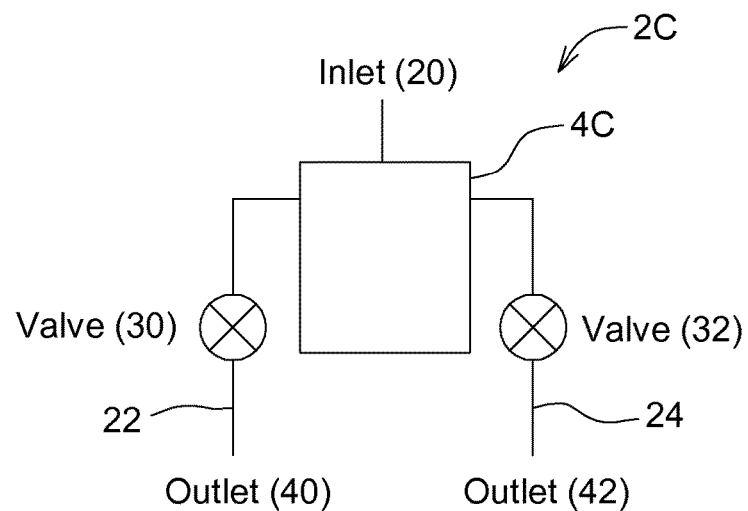
FIG. 5 depicts an example nozzle topology.

FIG. 5 depicts an example nozzle topology 2C having two outlets 40 and 42, at one end of paths 22 and 24, respectively. Nozzle topology 2C has a nozzle body 4C with two valves 30 and 32 on paths 22 and 24, respectively, paths that are drawn in parallel in this example. Valve 30 corresponds to outlet 40 and valve 32 corresponds to outlet 42. Nozzle body 4C selectively releases fluid and droplets to either or both outlets 40 or 42. Nozzle topology 2C receives a liquid input from inlet 20, at least a portion of which flows to either or both outlets 40 and 42 as controlled by opening and closing the valves 30 and 32, respectively. Each outlet 40 or 42 attaches to or may be covered by at least a turret body, nozzle tip or nozzle cap. Depending on the end-use purpose, nozzle body 4C includes a hose, a pipe, a sphere, a conventional single nozzle body with holes, or other geometries.

Figure 5A:
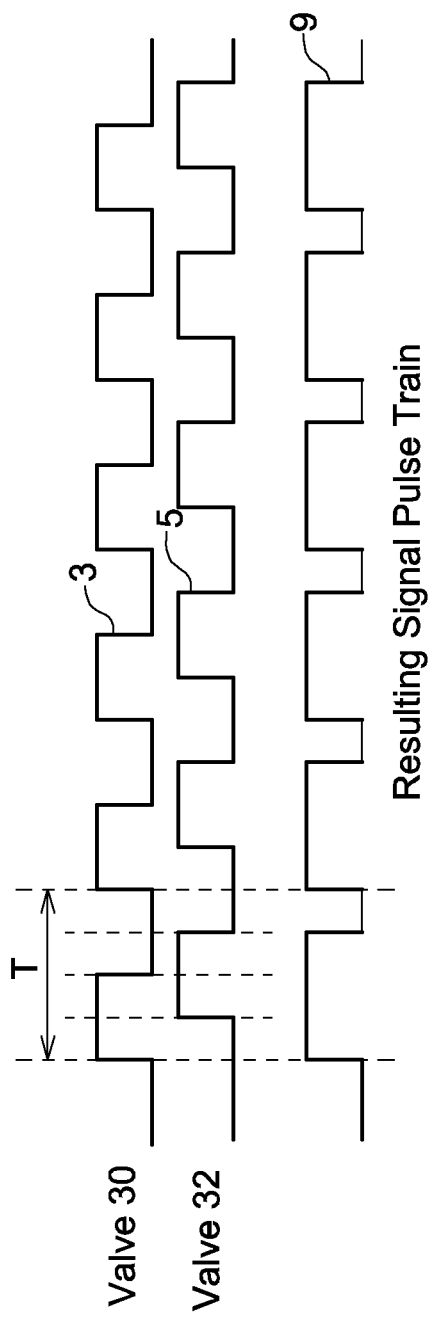
FIG. 5A depicts an example timing diagram for the operation of the nozzle topology of FIG. 5.

FIG. 5A depicts an example operation of nozzle topology 2C. For instance, the operations include electric pulse signals 3 and 5 being applied to respective actuators that open and close valves 30 and 32, respectively, to propel liquid out of outlets 40 and 42, respectively. Pulse signals 3 and 5 overlap partially within period T. During a full period T of operation of nozzle body 4C, pulse signals 3 and 5 are ON 50% of the duration of period T (50% duty cycle). The phases of pulse signals 3 and 5 overlap each other by about 90 degrees. Fluid is transferred at the same rate from inlet 20 to either outlet 40 and 42, and the fluid droplets are released at the same rate out of outlets 40 and 42, although the release from one lags the other. If the same fluid pressure is maintained as for continuous spraying, the overall volume of fluid sprayed under the control of both valves 30 and 32 as depicted in FIG. 3A would be about 25% less than from continuous spraying, but the spray pattern is more tunable and adjustable to suit an operator's needs.

If the outlets 40 and 42 are pointed towards different spray directions, their associated spray release have the same overlap as operating pulse signals 3 and 5 during a period T. The outlets 40 and 42 release spray independently. During the non-overlapping time durations of signals 3 and 5, only one of the outlets 40 or 42 releases droplets. In the example of FIG. 5A, the leading edge of pulse signals 3 and 5 are shifted by a constant phase within each period T. Alternatively, the width of pulse signals 3 and 5 are varied so that they differ in phase, in the duration of the ON mode, or in frequency in order to achieve different spray coverage. In another alternative, if the outlets 40 and 42 are pointed toward the same spray direction, the aggregated pulse signal is indicative of the total amount of fluid released to the target area. The aggregate or resulting signal pulse train depicted in FIG. 5A has a pulse frequency that is the same as the frequency of either pulse signal 3 or 5, but the resulting signal has a pulse width that is wider than either pulse signal 3 or 5, alone, so that fluid is released effectively for a longer duration towards the target spray area. In yet other alternatives, one outlet 40 is spraying continuously, while outlet 42 is operated under a pulsed mode PWM or under a frequency modulated control (FM); or both outlets 40 and 42 are spraying continuously. In a paint, nutrient, herbicide or pesticide application embodiment where there may be different types of fluids being sprayed, an asymmetric operation of the valves 30 and 32 permits achieving different desired ratio of fluids released from respective outlets 40 and 42. When asymmetric fluid spraying is desired, one example approach is to create a divider in the inlet 20 of nozzle body 4C. The divider (not shown) separates different types of fluids so that they flow into different chambers within nozzle body 4C and then are propelled out of nozzle outlets 40 and 42, separately, by the action of the respective valves 30 and 32. In other examples, when both fluids are mixed together or sprayed simultaneously, the pulse signals 3 and 5 overlap for at least a part of the duration of period T.

In addition to adjusting the time duration or frequency of operation of the valves 30 and 32, the location of the outlets on nozzle body 4C affects the spray pattern. For example, outlets 40 and 42 are pointed in different directions to generate a wider or more diffuse spray pattern; or outlets 40 and 42 are located parallel to one other but offset by a small distance (e.g. less four inches); and their spray pattern overlaps and covers a more focused target region. Further, to create a dithering effect or a more diffuse scattering of the droplets, the time duration or frequency of each pulse signal 3 and 5 can be varied (or modulated) rather than be fixed as shown in example FIG. 5A. Another possibility is to dither the pulse signals 3 or 5 by adding a randomly generated signal to the pulse signals 3 or 5 in the time domain.

FIG. 6 depicts an example nozzle topology 2D having three outlets 40, 42 and 44, at one end of paths 22, 24 and 26, respectively. Nozzle topology 2D has a nozzle body 4D with three valves 30, 32 and 34 along paths 22, 24 and 26, respectively, paths that are drawn in parallel in this example. Nozzle body 4D selectively releases fluid and droplets to at least one of the outlets 40, 42 or 44. Nozzle 2D topology receives a liquid input from inlet 20, at least a portion of which flows to at least one of outlets 40, 42 or 44 as controlled by opening and closing the valves 30, 32 or 34, respectively. Each outlet 40, 42 or 44 attaches to or may be covered by at least a turret body, nozzle tip or nozzle cap. Depending on the end-use purpose, nozzle body 4D includes a hose, a pipe, a sphere, a conventional single nozzle body with holes, or other geometries.

The operation of nozzle topology 2D having three independent outlets 40, 42, 44 includes at least all of the operational possibilities described for nozzle topology 2C having two independent outlets 40 and 42. The third outlet 44 is optionally operating continuously or under pulsed mode or a combination of continuous and pulsed mode.

FIG. 7 depicts a mixed-topology of an example nozzle topology 2E having two outlets 40 and 44, at one end of paths 28 and 26, respectively. Nozzle 2E has a nozzle body 4E with three valves 30, 32, and 34 along paths 22, 24 and 26, respectively, paths that are drawn in parallel in this example. In the arrangement of FIG. 7, paths 22 and 24 merge into path 28 before reaching outlet 40 ("combined" outlet 40). Nozzle body 4E optionally has a third outlet 46 (associated with valve 36). Nozzle body 4E releases fluid and droplets to at least one of the three outlets 40, 44 or 46 depending on which valves are open and on the internal configuration of body 4E. Nozzle topology 2E receives a liquid input from inlet 20, at least a portion of which flows to at least one of outlets 40 or 44 or 46 as controlled by opening and closing the valves (30 or 32) or 34 or 36, respectively. The parentheses around "30 and 32" are in reference to fluid at the outlet 40 being dependent on the action of both valves 30 and 32. Each outlet 40 or 44 or 46 attaches to or may be covered by at least a turret body, nozzle tip or nozzle cap. Depending on the end-use purpose, nozzle body 4E includes a hose, a pipe, a sphere, a conventional single nozzle body with holes, or other geometries.

FIG. 7A depicts an example operation of nozzle topology 2E. The combined outlet 40 nozzle body 4E includes electric pulse signals 3 and 5 being applied to respective actuators that open and close valves 30 and 32, respectively, to propel liquid out of outlet 40. In this example, outlet 44 or 46 or both are releasing fluid continuously or nearly continuously according to electric pulse signal 7. Such a nozzle body 4E provides faster pulse mode operation and extra spray coverage, especially if outlets 40 and 44 (or 46) are positioned to point in the same spray target area. Alternatively, if the spray trajectories of the outlets (e.g. 40) follow one another in the direction of travel of the spray vehicle, this provides more complete spray coverage in the path traveled. In another embodiment, both the combined outlet 40 and the individual outlets 44 or 46 are all operating in pulse mode, whether in phase or out of phase. The spray coverage varies depending on the pointing direction of the outlets, the type of tip on the outlets or filters near the nozzle tip or within the nozzle body 4E, or the shape of the orifices, and so on.

Figure 6:
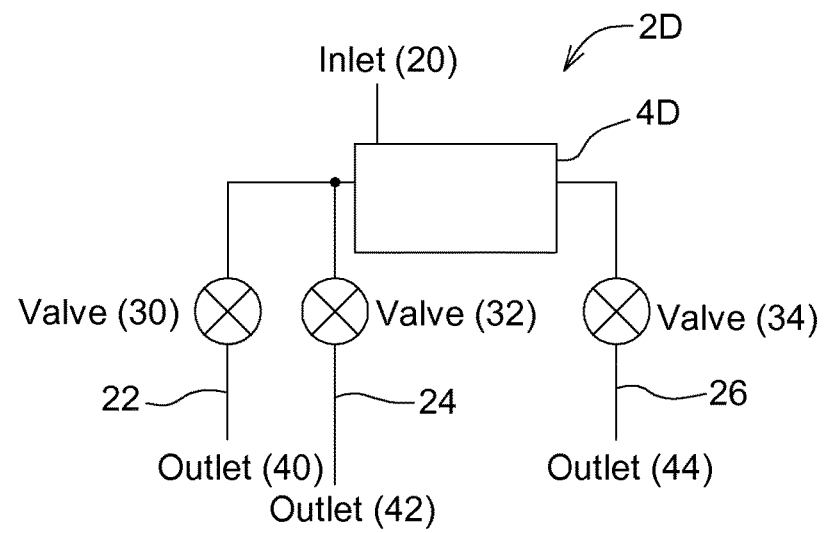
FIG. 6 depicts an example nozzle topology.

Different scenarios determine whether one or additional nozzle outlets together are releasing fluid in FIGS. 5-7. For instance, if the pressure and fluid flow are above a pre-set threshold as measured by a pressure or flowmeter, an additional outlet releases fluid and all the outlets are operating at a more tolerant fluid pressure (where pressure is often dictated by the delivery of a particular amount of chemical specified to supply sufficient nutrients or herbicide or paint coverage). To change pressure or flow rate, the pulse width of the applied electric signals is varied so that more or less liquid is released. Alternatively, the frequency of the pulses is varied. Another scenario where additional nozzle outlets release fluid involves the use of air induction nozzles together with continuous fluid release rather than pulse width modulated signals, so that more than one outlet is in operation to accommodate different types of nozzles. Yet other scenarios include whether the vehicle is making a turn or re-spraying an area for missed spray spots, which would involve different nozzles to be utilized depending on the desired pattern. For instance, on a turn, the fluid release frequency is correspondingly reduced if the vehicle slows down. Alternatively, the spray pattern accounts for the turn down ratio between the nozzle traveling the longest distance on the outer radius and the nozzle traveling the smallest distance on the inner radius. To keep uniform the volume per area covered through this turn, the flow rate out of the outermost nozzle should be higher than the flow rate out of the innermost nozzle.

In the configurations of FIGS. 3-7, only one fluid inlet 20 is shown and the fluid is distributed among the different outlets depending on the valve positions and inner configuration of the nozzle body. In another configuration of the topologies, rather than one fluid inlet 20, there are two or more fluid inlets. For instance, in FIGS. 3-7, inlet 20 channels fluid to outlet 40, while another inlet (not shown) channels fluids to output 44 or 46. Such additional inlets permit, for example, mixing different chemicals, maintaining different or similar fluid pressure, separate control of droplet sizes and so on. In one example, two inlets are positioned offset to each other so that different fluid pipes or conduits feed the two inlets. For example, extra inlets are for spraying different types of plants co-existing in the same field, or for spraying different coatings on a material.

The aforementioned example topologies are implemented in physical nozzles 100 and 300 including the ones shown in the figures in the provisional and previous patent applications that are incorporated in here by reference. One example nozzle 100 is the one depicted in FIG. 8. Nozzle 100 has fluid inlet 106. Fluid travels to the nozzle tube 102 that contains valves to release fluid to the turret 110, which in turn releases fluid to the outlets of the nozzle 100. Turret 110 has at least two outlets 120A and 120B that are individual independent outlets. They are parallel and point in the same direction and are spaced apart by about 2-4 inches. In this instance, the configuration (of outlets 120A and 120B) of example nozzle 100 corresponds to topology 2C shown in FIG. 5.

Figure 8:
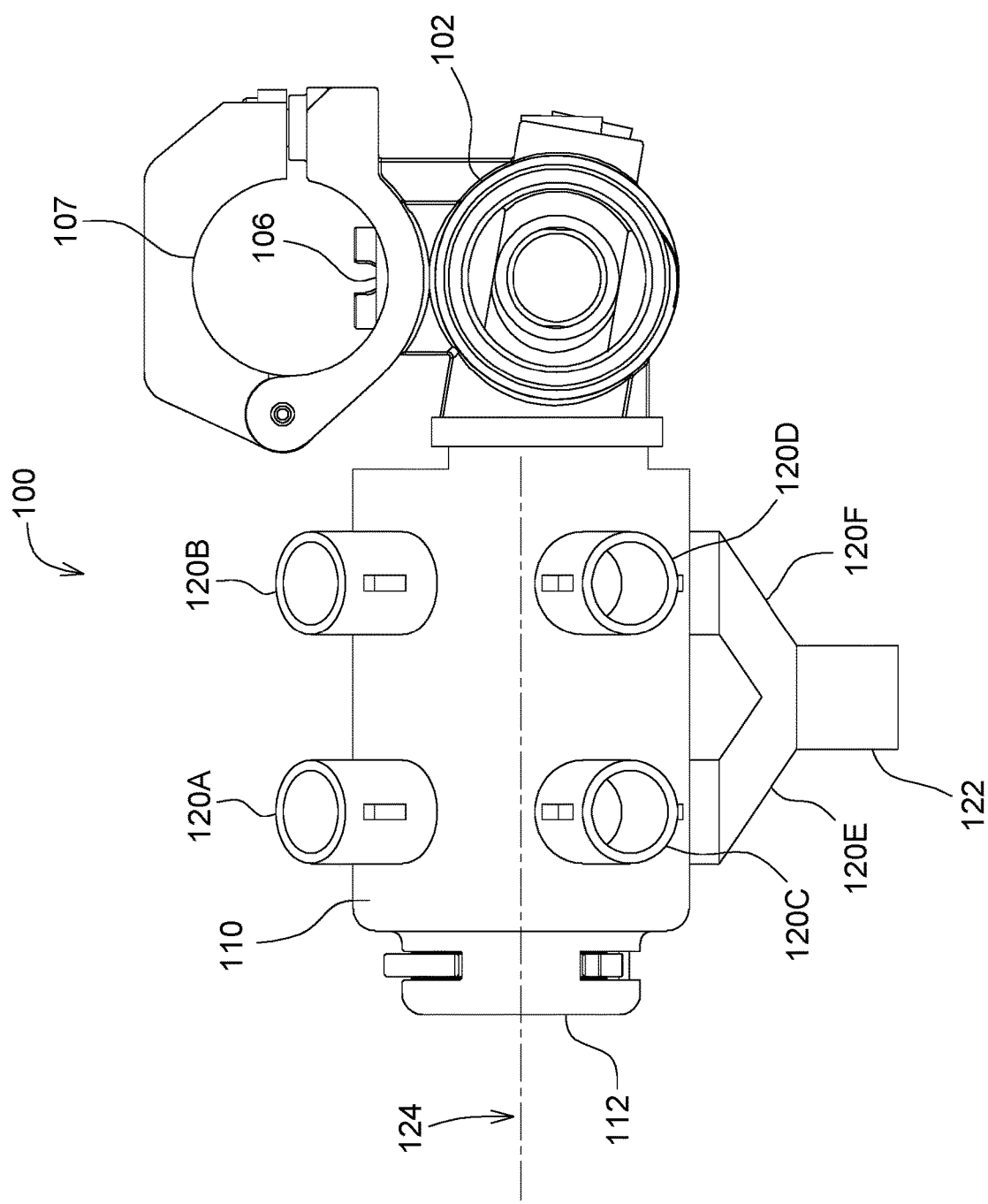
FIG. 8 depicts an example of a nozzle having a nozzle body with three outlets that are covered by nozzle tips.

In FIG. 8, turret 110 actually has multiple types of outputs, individual outlets 120A, 120B, 120C, 120D, 120E, 120F, and also 122. End-point nozzle tips (e.g. 130A, 130B, 130C shown in FIG. 30) are attached to or cap the outlets 120A-120F; the opening pattern of such end nozzle tips determines or affects the spray pattern, flow rate and droplet size. Although drawn as having the same size in FIG. 8, in other embodiments, outlets 120A-120F are different sizes in order to provide a different spray pattern or to source different amounts of spray; alternatively, the outlets have different strainers inside so as to provide different droplet sizes if the strainers have an irregular or particular hole pattern to serve both as a sieve for debris to avoid plug-ups and as a mechanism to shape the droplets. Outlets 120E and 120F joins together into a combined outlet 122. Turret 110 can be rotated to release fluid from the combined outlet 122, which is representative of nozzle topology 2A. In other geometries, turret 110 combines or separates fluid flowing through a large single outlet hole that opens to two passageways. The individual outlets 120A-120F are grouped together in pairs or aligned in a row, with each outlet 120A-120F being perpendicular to a center axis 124 of the cylindrical turret 110. Alternatively, if nozzle 100 is an implementation of nozzle topology 2D or 2E, there are additional individual outlets 120A-120F grouped together. Outlets 120A-120F are grouped together in alternative patterns other than as side-by-side pairs, depending on the end-use application and/or on a desired spray pattern (e.g. location of the crops or other targets). However, when outlets 120A-120F are grouped in pairs, the nozzle 100 configuration readily functions as any one or a combination of the nozzle topologies 2C, 2A, 2B, or 2E if the fluid passage way or ducts inside the turret 110 is correspondingly appropriately configured, as described in U.S. patent application Ser. No. 14/506,057.

Example actuation mechanisms inside nozzle tube 102 include local or remotely controlled solenoid valves that allow either continuous or pulse width modulated (PWM)

spray flow. For continuous flow, at least one of the solenoid valves remains open over time or the PWM pulse controlling the valve is ON all the time. For electro-mechanical modulated (e.g. PWM) fluid flow, valves (e.g. plugs 162A and 162B in patent application Ser. No. 14/506,057) are connected to solenoids having open and close positions corresponding to the motion of a steel or iron piece that moves when an inductive coil surrounding the piece has current flowing in one direction or the opposite direction in the coil. The motion of the steel or iron piece provides a mechanical force to open and close plugs 162A or 162B. A controller circuit that is local to the nozzle or to the spray line or located remotely (e.g. cab of a sprayer or tractor or at a farmhouse) executes algorithms to open and close the plugs 162A and 162B to operate and eject a particular spray pattern. Alternative actuation mechanisms include hydraulically or pneumatically actuated valves. Other confined and cost effective actuation mechanisms have a speed of operation up to 60 Hertz.

Example nozzle 100 has a nozzle tube 102 that receives liquids at inlet 106 at the top of nozzle tube 102. Nozzle 100 is mounted on a fluid distribution pipe (e.g. spray line, 504) that is inserted in the mount ring 107 above the inlet 106. The fluid distribution pipe 504 has holes that mate to an orifice or opening of nozzles 100 (at inlet 106) in order to release fluids into inlet 106. Some embodiments include a section valve between the fluid distribution pipe 504 and the inlet 106; alternatively, inlet 106 itself includes a valve to prevent or allow fluid flow into nozzle 100. Fluid selectively travels from nozzle tube 102 to turret 110 that is connected to an output of nozzle tube 102.

Figure 9A:
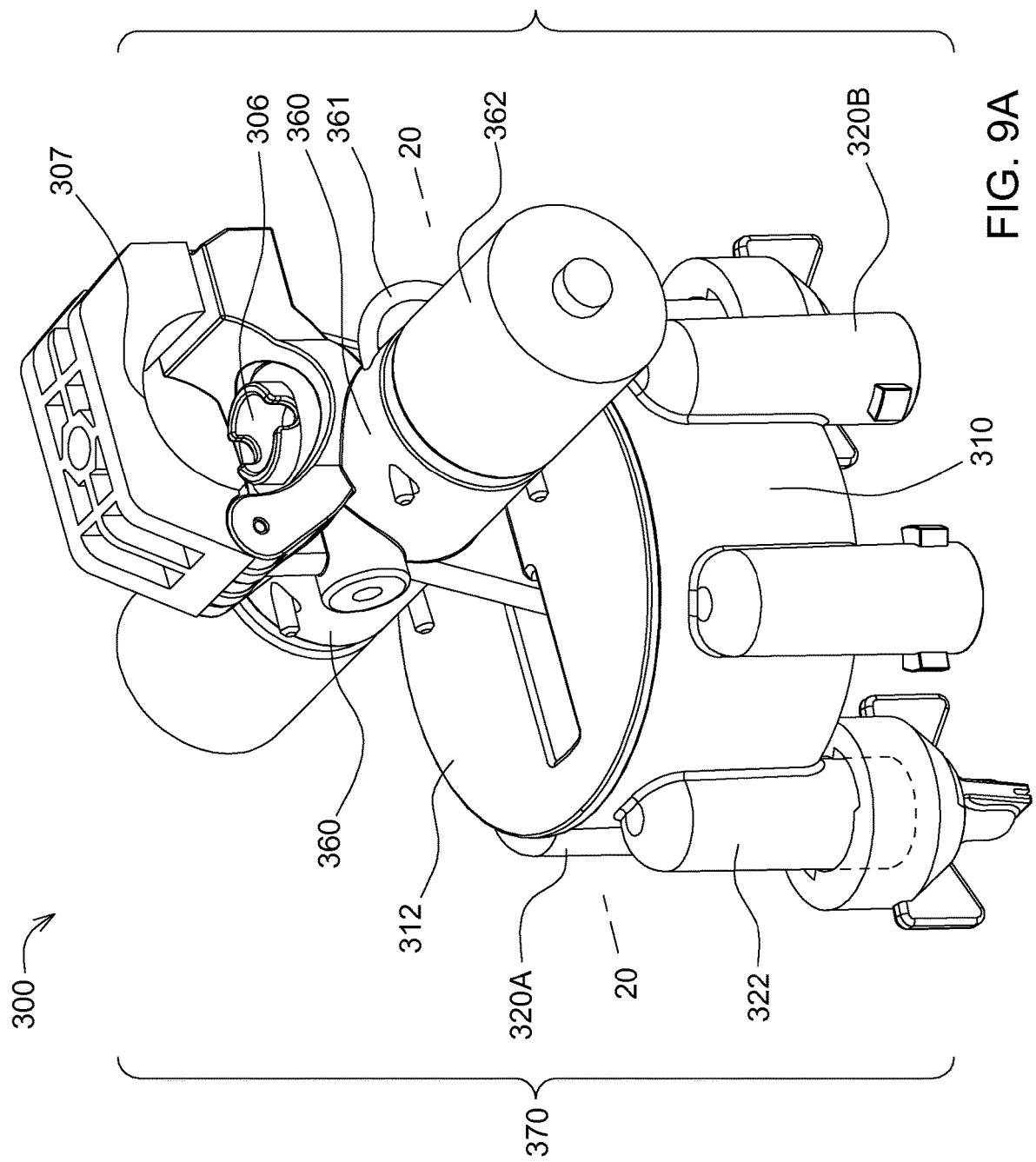
FIG. 9A depicts another example of a nozzle having a nozzle body with six outlets that are covered by nozzle tips.

FIG. 9A depicts another physical nozzle 300 having an inlet 306 coupled to nozzle tubes 360A and 360B (collectively "360"). A rotatable short cylindrical turret 310 is attached to the nozzle tubes 360. Nozzle tube 360 contains plunger type solenoid valves or other valve walls on each end of the tube 360. When the valves open and close, fluid is released from the inlet to turret 310. There are actuators acting on the valves located inside tube 360; example actuators include solenoid valves, electromagnetic spring coil, pneumatic lever, bellows, and so on. Turret 310 is directly attached to the nozzle tube 360; alternatively, turret 310 is attached to a rotatable plate 312 that is electronically controlled. Turret 310 contains electronic circuits to operate sensors, the turret rotation, or an optional LED 380 located at the bottom of turret 310. Turret 310 is manually rotated if there is no plate 312 or automatically rotated if there is plate 312 and a corresponding motor to turn plate 312 (e.g. stepper motor). The selected nozzle outlet(s) 320A, 320B, etc., are positioned to receive fluid from the nozzle tube 360 and spray the fluid onto the target 506.

Figure 9B:
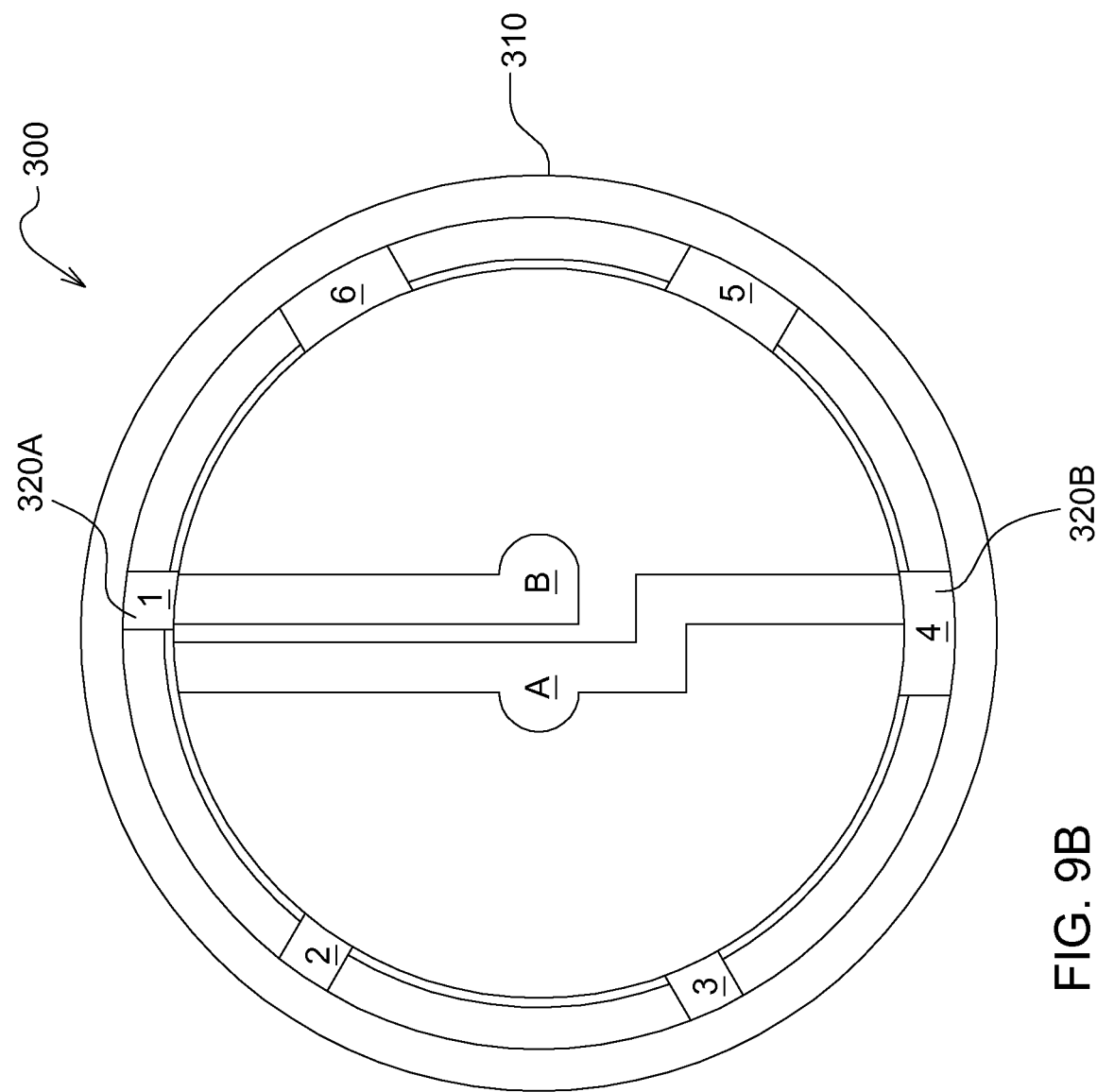
FIG. 9B is an idealized diagram of the fluid flow path inside the nozzle body of FIG. 9A. The flow path is effectively between an inlet and one or more of the six outlets.

FIG. 9B is an idealized diagram of the fluid flow path inside the nozzle 300 of FIG. 9A. The flow path is represented as being between an inlet and one or more of the six outlets, 320A, 320B, . . . 322, at positions 1, 2, . . . 6, respectively. In the example of FIGS. 9A and 9B, there are pairs of outlets positioned such that two outlets are opposite each other; and there happens to be three pairs of outlets. Any of these outlets can be designed and setup as a combined outlet including at position 1, where both channels A and B empty into the outlet at position 1. The outlets or channels A and B are actually associated with valves A and B, respectively, in the nozzle tube 102 or 360. There are also single outlets including at position 4, having only a single input source of fluid from channel A. FIG. 9B depicts an example of the nozzle 300 being rotated to a position where the fluid flows to two outlets simultaneously, at positions 1 and 4. In nozzle embodiments 100 and 300, the internal valves, ducts and fluid pathways are designed such that when there is fluid released from a combined outlet, then no other fluid is released from the other outlets. This is based on the configuration of the valves and flow paths inside the turret 110 or 310, as shown in U.S. patent application Ser. No. 14/506,057. In other embodiments, the flow paths in turret 110 or 310 also have a T-section or there are additional apertures in the internal walls of turret 110 or 310 (see e.g. FIGS. 22 and 26 of patent application Ser. No. 14/506,057), then two or more outlets may both serve as combined outlets, simultaneously.

Figure 10A:
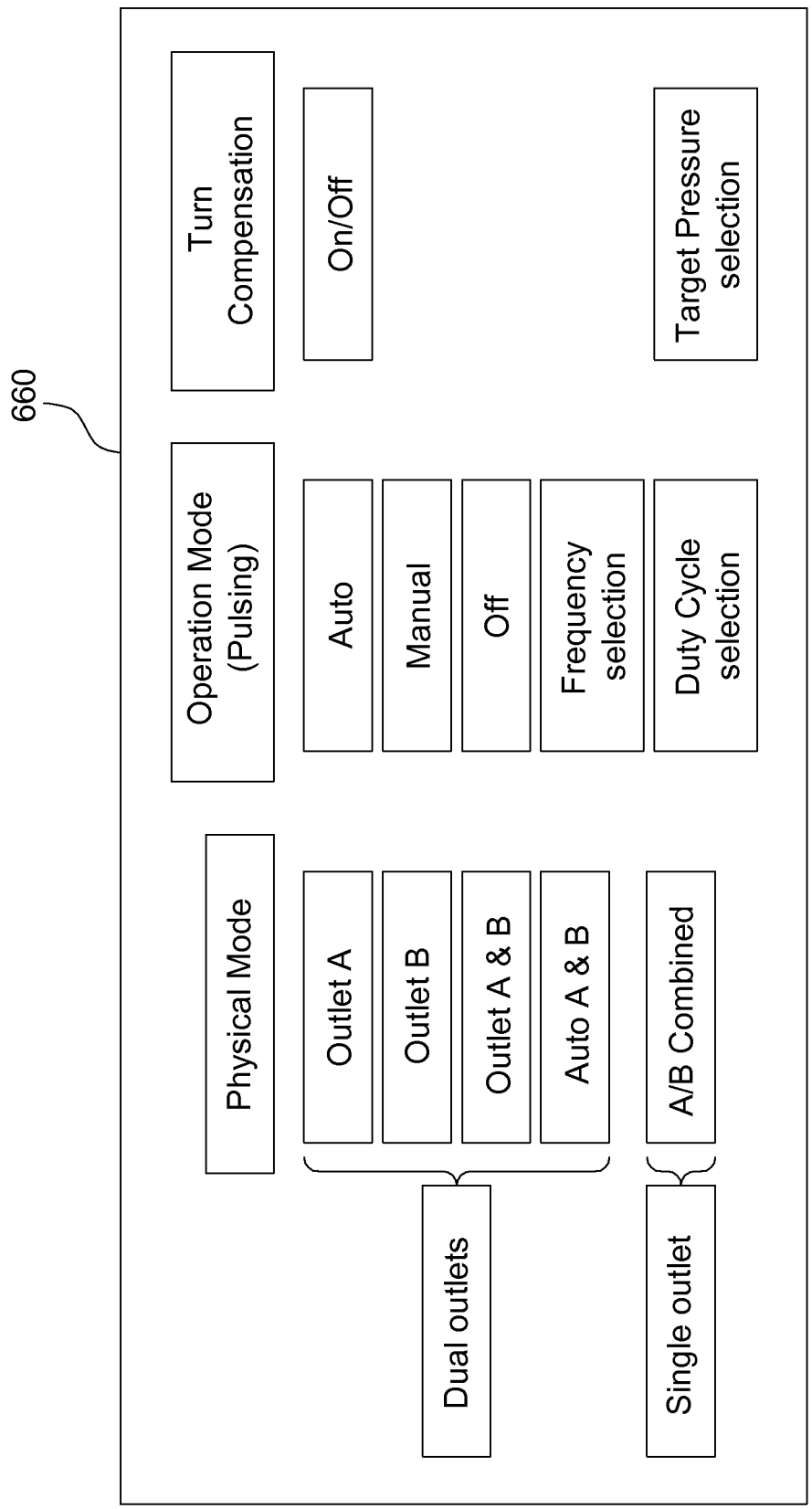
FIG. 10A depicts example touchscreen for nozzle control.
Figure 10B:
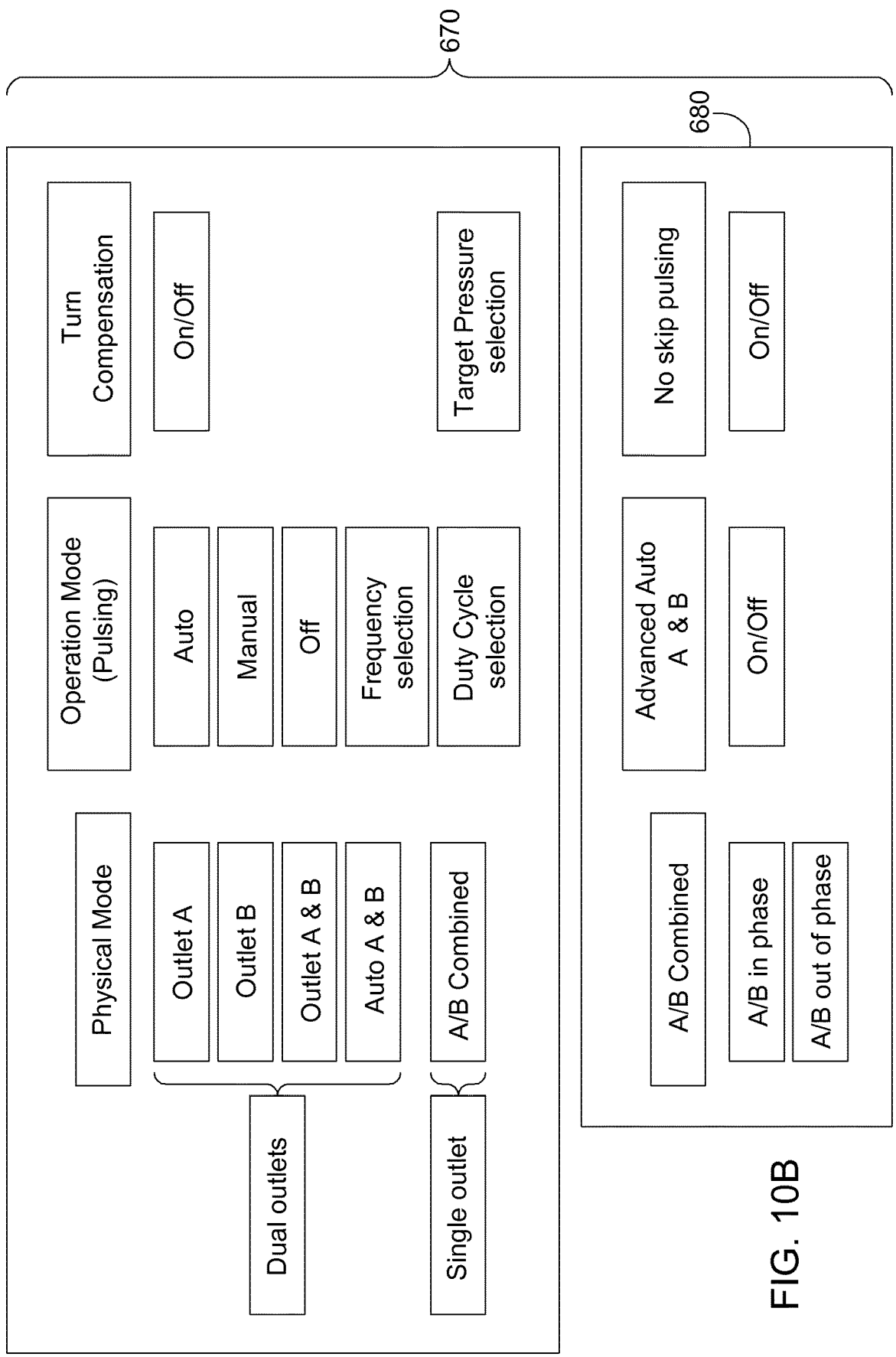
FIG. 10B depicts example touchscreen for nozzle control with extra features.

Instead of the combination mode (i.e. a single outlet that combines fluid from both valves or channels A and B), an operator can also select "single" operation mode, where a first outlet releases fluid only from valve or channel A and a second outlet releases fluid only from valve or channel B. In the example nozzle 300 of FIGS. 9A and 9B, the first and second outlets at positions 1 and 4, respectively, happen to be located opposite from each other on the periphery of turret 310. An operator may choose to have both valves/channels A and B release fluid, or may choose to have only one valve/channel A or B release fluid, which is achieved by setting one corresponding PWM signal ON and the other one OFF. These different modes of operation are selectable from a display in the cab of the vehicle, or at a remote site including a handheld device or at the farm building. Example displays are depicted in FIGS. 10A and 10B. In FIGS. 10A and 10B, the word "outlet" is associated with a concept of channels or valves A and B as depicted in FIG. 9B.

In FIG. 8 or 9A, nozzles 100 or 300 have example local electronic circuits to control the fluid flow. To communicate with the nozzle 100 or 300, electric wires that carry CAN-bus communication signals from a centralized boom or nozzle controller (e.g. in the cab) are connected to the electronic leads or pins in or on nozzles 100 or 300. In some embodiments, nozzle 100 or 300 also contains sensors to detect flow rate, temperature, evidence of plug detection, or other problems. When the sensors detect an over-threshold condition, the circuits operate to stop or revise the release of fluid by adjusting the pulse width of PWM signals to the valves.

Some embodiments include an electronically rotatable turret 110 (or 310) that allows an operator to select one of the nozzle outlets. In one embodiment, there is nozzle selection circuitry that rotates a stepper motor. The motor rotates a disk on which turret 110 is mounted. Based on a remote or local command signal, the disk rotates so that one or more of the nozzle outlets including 120A, 120B or 122 point to the targeted spray location. If the outlets 120A, etc., are capped by different nozzle tips, the operator is thus also able to choose a particular nozzle tip by remote operation or operation from the cab.

Operation

In operation, as shown in FIG. 2, computer circuits control the operation of the system of many nozzles. In one example, the system's master spray controller 620 sends a command to each individual nozzle 100 or 300 or to a first nozzle 100 or 300 that propagates the signals it received. Alternatively, each nozzle 100 or 300 has local circuits to generate signals to operate its actuators and corresponding valve. The valves in the nozzle bodies depicted in FIGS. 3-7 are actuated electronically or hydraulically or electro-hydraulically. Program instructions reside in the circuits or microcontrollers local to a nozzle 100 or 300 or in central controller including in the cab of a self propelled sprayer.

The instructions are not limited to PWM type signals or to valve control only, but the microcontroller also executes the instructions to process data from sensors including the speedometer of the vehicle, wind sensors, and pressure transducers in the fluid pipe distribution, and the microcontroller checks look-up tables to verify if the spray is operating at a desired flow rate or at a desired pressure.

In one embodiment, the target spray pressure or spray rate is a priori calculated based on information including a particular speed of vehicle travel, wind compensation, type of chemical (manufacturing specification as to the dosage per acre) and the information is placed in a look-up table stored in the computer's memory as depicted in FIG. 2. Alternatively, a programmed equation is used to dynamically determine (calculate) the amount of spray to be released using the computer's logic processor circuit; or a lookup table is used jointly with lookup table entries to determine an appropriate amount of spray release. A remote starter interrupts or an operator commands the central computer 602 to proceed, in which case the computer 602 buffers out an electronic signal to interface circuits that generate signals using CAN-bus compatible protocol to the master spray controller 620. Usually there is more than one nozzle 100 or 300 in operation so that the master spray controller 620 is used to coordinate the activities of the different nozzles 100 or 300. The master spray controller 620 is mounted to the spray boom suspension electronics portal (not shown). The master spray controller 620 addresses each nozzle 100 or 300 and performs the functions of an interface for each nozzle 100 or 300 to the CAN bus. The master spray controller 620 also controls or coordinates collective activity including synchronization of spray performance by sending a master clock to each nozzle 100 or 300, providing turn compensation (reducing spray), and coordinating needs including power management. Alternatively, the master spray controller 620 is more decentralized and sends signals to a first nozzle 100 or 300 that in turn sends signals to a next nozzle 100 or 300.

FIG. 10A depicts an example screen page 660 of a touchscreen 612. An operator initiates, interfaces or controls the spray process through interfaces including the computer touchscreen 612, or a handheld device (e.g. cellphone with an application, a key fob (frequency operated remote control)). From screen page 660, the operator selects features including the spray nozzle being ON or OFF and the rate of spray application (e.g. through touch screen or remotely with a key fob). There are different modes of operation including Auto, Outlet A, Outlet B, or Combined (auto or manual). Selecting "Outlet A" or "Outlet B" causes fluid release only out of one outlet. Selecting "Outlet A & B" causes fluid release out of both outlets A and B, but the operator also selects other parameters to set the frequency and duty cycle.

Selecting "Auto A & B" causes fluid release out of both outlets A and B, with the controller 620 automatically adjusting the spray to be released either through outlet A or through outlet B or through both outlets A and B. In the Auto mode, the pre-programmed software instructions in the controller 620 selects which of the two outlets A or B is to be used or both as the speed of travel of the vehicle or the fluid pressure or droplet size varies. In some cases both A and B will be selected. This mode helps control the nozzle pressure by switching nozzle tips (when the outlets A and B are capped by different nozzle tips) as the speed changes to keep the spray fluid pressure closer to the target pressure chosen in the input section. In Auto mode, the nozzle assembly is operated or can be selected to operate in PWM (pulsing) mode and controller 620 automatically adjusts the PWM pulse width, frequency or amplitude to reach a target value or to maintain some target variable constant within 5-10% (e.g. pressure). For example, if the nozzle tips on outlets A and B are different, the dynamic range of spray release would be expanded to cover three spray ranges: the nozzle 100 or 300 releases spray out of outlet A; then when the endpoint range of outlet A is reached, the nozzle 100 or 300 transfers to release spray out of outlet B until the endpoint range of outlet B is reached; then the nozzle 100 or 300 transfers to release spray out of both outlets A and B. In this example, the controller 620 is preprogrammed as to when to switch among the outlets based on maintaining a particular variable (e.g. pressure) within a certain magnitude for a particular speed of travel of the spray vehicle. The nozzle tips may be air induction tips (e.g. for continuous spraying) or tips for PWM operation. The operator can select either continuous flow or pulsed flow in conjunction with "Auto A and B." Further, near adjacent nozzles can extend the range even more, for example, if four or more nozzle tips are all different, tips A and B on a first nozzle body, and tips C and D on the adjacent nozzle body can span the spray effectively to four spray ranges if all four tips are different and selected so that their spray ranges are staggered one after another. If two or even more adjacent nozzle bodies are close enough so that their spray overlaps on the target area, then having even more different tip sizes or different spray types can further extend the range of operation as spray vehicle changes speed. For example, as the vehicle speed changes, the pre-set instructions in the controller switches among the nozzles or from one particular nozzle's outlets (i.e. tip to tip) to release fluid, while maintaining the fluid pressure or keeping some other variable constant. Instead of spray pressure, having multiple different nozzle tips and nozzle bodies to switch among can also extend the range of spray patterns, droplet size, spray direction, and so on.

In the example embodiment of FIG. 10A, the operator can also select whether to run the nozzles 100 or 300 in PWM (pulsing) mode or continuous mode or some combination of the two modes. For PWM mode, the operator can choose the frequency of operation of the valves, the duty cycle of the pulse width, and whether to spray out of one or multiple nozzle tips from each nozzle 100 or 300. Alternatively, the operator can select a target spray pressure that causes the computer to compute or to look up a desired nozzle 100 spray configuration that will achieve the particular spray pressure.

In FIG. 10A, an operator can select "A/B Combined"—which causes the fluid to be released out of only one outlet, but both channels A and B inside the nozzle tube (102 or 360) operate to release fluid to the one outlet (e.g. 320A or 320B or 122), thus "combining" fluid from both channels A and B. This scenario is discussed in U.S. patent application Ser. No. 14/506,057. FIG. 10B depicts an alternative example of the screen page 670 on touchscreen 612 as depicted in FIG. 10B, there are additional example menu 680 including for the operation of a physical embodiment of nozzle topology 2A, where two or more ducts empty into a single outlet (A/B Combined). On screen page 670 of FIG. 10B, the operator can select whether to open and close the two nozzle outlets A and B in phase or out of phase. Additional selections include No-skip-pulsing where the two outlets A and B are operated both on PWM and there is a third outlet C that continuously releases fluid. Another selection includes one valve being operated on PWM and another one remaining open continuously to release fluid from an outlet. In some other embodiments, No-skip-pulsing includes a condition where all the outlets A and B on each nozzle are pulsed in sequential order so that there is always fluid released from each nozzle on the boom (e.g. FIG. 17, Flowchart 4).

Turning now to the collective operation of many individual nozzles 100 (or 300), nozzles 100 are mounted to a fluid distribution pipe 504 that sources fluids to the many nozzles simultaneously. Depending on an operator's spray end-use application, some of the goals include maintaining a constant spray pressure or flow rate during a steady state situation. Alternatively, the flow rate is adjusted so as to maintain a constant pressure (e.g. within 10 PSI) when environmental conditions vary. For instance, when the spray surface or terrain changes and the vehicle/nozzle travels slower or faster. The following embodiments provide sequencing methods for varying spray flow rate by selecting a series of different operation modes (e.g. by performing or processing a sequence) for each nozzle 100 in the collection. Multiple outlets (e.g. 40, 44, and 46) are used on each nozzle 100 along with using the larger dynamic range and higher resolution PWM control. Alternatively, other modulation schemes (e.g. frequency modulation, pulse amplitude modulation) substitute for PWM. For discussion purposes only, it is instructive to use a particular example including fifty to one hundred fifty nozzles 100 mounted on a spray boom 500 towed or mounted on a vehicle in an agricultural setting; the nozzles 100 are, for example, mounted 10 to 15 inches apart so that their spray output overlaps when the spray boom 500 is raised sufficiently high (when the spray edge just begins to overlap). Sequencing and multiple outlets are used in conjunction with the overlapping of adjacent nozzles 100 and pulse width modulation (PWM) to control of the spray release from individual nozzle 100. Variables include the distance between spray nozzles, the boom height, and the type of nozzle tips. These and other nozzle aspects are configured so that adjacent nozzles 100 spray at different rates, which provides finer resolution in the spray modes. The methods also reduce spray pattern skips to provide more uniform coverage and prolong the life of a nozzle 100.

To accommodate the large number of variables and nozzles 100 (or 300), pre-sets are set up during manufacturing of the spray control system or during integration of the sprayer vehicle with the boom. Alternatively, an operator programs the instructions or selects instructions among the pre-sets. The capabilities of the pre-sets are due in part to the capabilities of the individual nozzles 100. Some of the capabilities of each nozzle 100 are described above: interleaving the operation of the valves and combined outputs and individual outputs, all of which increases the range of operation, eases use and reduces a need to change nozzles (e.g. nozzle heads) manually.

Before selecting a pre-set operation, an operator first selects the individual nozzle 100 (or 300) parameters and operating conditions (see e.g. FIG. 11A) including by using an interactive touchscreen (e.g. FIGS. 10A and 10B). Alternatively, various parameters are included during manufacturing default programming, or end-user setup, test or calibration situations—such information is for example stored in flash memory, PROMS or EPROMs embedded in the nozzle local circuits; or such information is stored on the central computer 602 or on cloud servers and downloaded before spray operation.

FIG. 11A depicts a flowchart for an exemplary operation 600 of a hybrid nozzle system. An initialization sequence begins in procedure 602, which includes testing the communication or data collection systems, calibration, sensing external conditions (e.g. wind direction, temperature), and selecting the type of liquid or mixture. Procedure 604 includes selecting the nozzles and nozzle tips that should be operated, setting the amount of overlap among adjacent nozzles or neighboring nozzles (e.g. second adjacent nozzle), rotating and positioning the nozzle (e.g. turret 110 or 310) or spray line 504, and testing the nozzles 100 (or 300) response and test spray pattern. Procedure 606 includes selecting the spray mode for the nozzles that are operational. The spray mode includes any of the configurations listed in Table I. Procedure 610 includes a continuous spray mode; procedure 612 includes both a continuous mode of operation for at least one nozzle or nozzle tip and a pulse mode for another nozzle or nozzle tip. Procedure 614 includes a PWM pulse mode of operation for a nozzle, having either one valve or two or more valves pulsing in or out of phase to allow higher flow rates or faster pulsing rates, respectively. Algorithms for any of the procedures 610, 612 or 614 may be programmed into the sprayer controller; for example, a state machine can check the status of the sprayer procedures. For agricultural sprayers, the state machine can also keep track of other issues including monitoring the terrain, soil and environmental conditions, or position and speed of the vehicle. Finally, in FIG. 11A, procedure 616 includes a method to monitor the spray pattern or quality (i.e. droplet size), involving sensors placed on the rear of or trailing behind the spray vehicle. An expected spray pattern or quality can be pre-loaded on the sprayer controller or computing devices. When the detected spray pattern does not match or deviates too much (e.g. by 5 or 6 sigma) from the expected spray pattern or quality, the sprayer controller adjusts the spray rate by changing the duration of the ON spray time (e.g. revise the ON pulse width). Alternatively, the sprayer controller can also stop, raise, lower, tilt, or rotate the spray line based on detected pressure in the spray line and/or based on a detected spray pattern. By providing pressure and detected spray feedback to the sprayer controller, the vehicle can properly respond. Similarly, in an industrial end use, a spray unit can respond to problems including a clogged nozzle or overspraying.

Figure 11B:
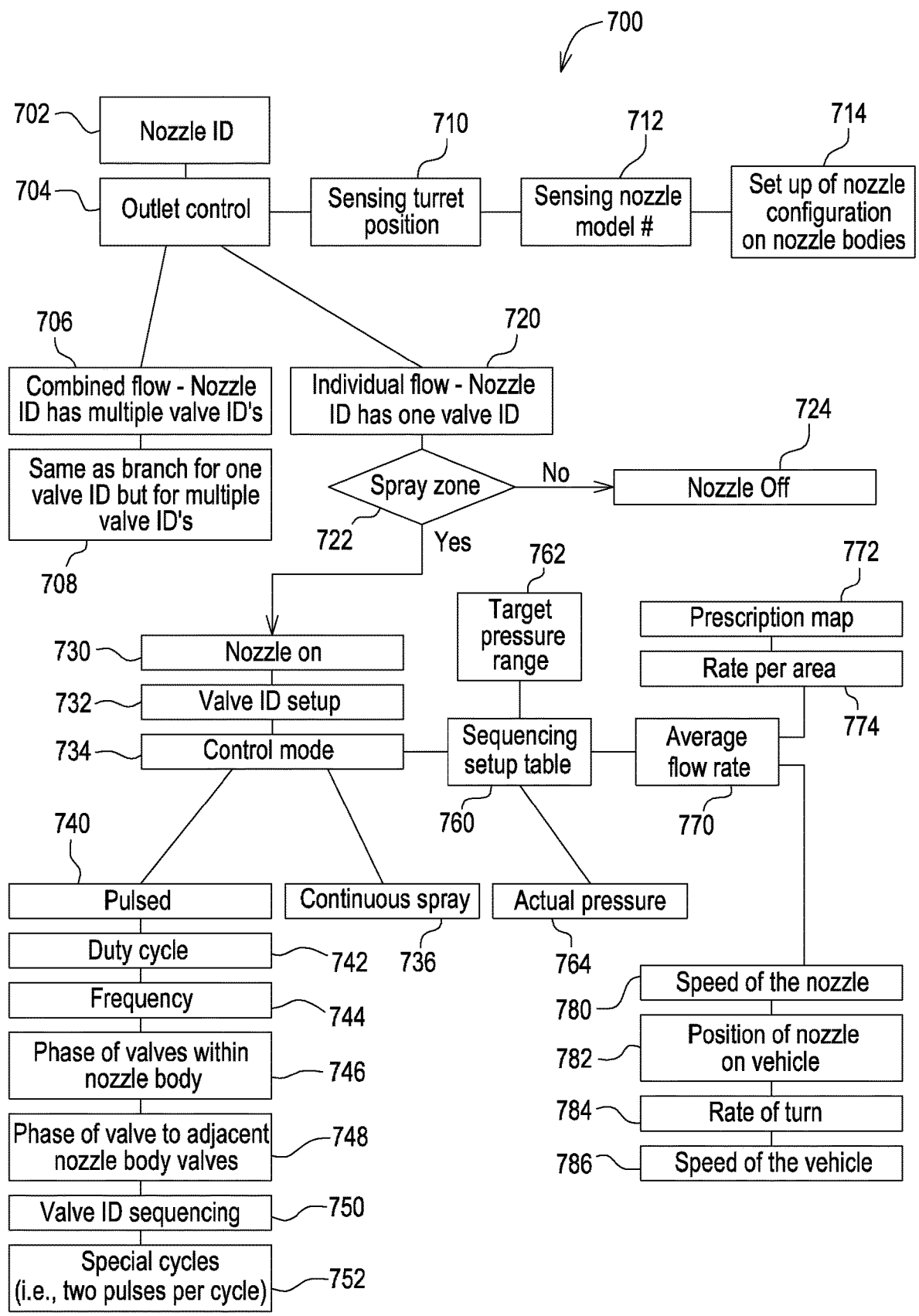
FIG. 11B is a flowchart depicting an example extended method to control the spray nozzles.

The flowchart of FIG. 11B shows an example extended method 700 as to which parameters are set up for each individual spray nozzle 100 (or 300) in an array of nozzles. Several parameters are considered, controlled and/or tracked including the spray control mode (pulsed or continuous), spray nozzle tip or nozzles 100 in use (size, type, fan pattern, etc.), whether the valve control flow is combined into outlets or going to individual outlets including tracking a specific turret position, information about the number of control valves operating and the mode for each valve (i.e. pulsing phase of valves within a nozzle 100, pulsing phase of nozzles 100 to the adjacent nozzles 100, special sequencing of nozzle 100 pulsing orders, the frequency of each valve, the duty cycle of each valve, and if any special cycle arrangements are used including a double pulse per periods). The example method 700 in the flowchart is also exercised to adjust or monitor the nozzles as the environmental or operating conditions change. In block 710, for each nozzle 100, nozzle outlet control is performed by sensing or receiving information on the turret position, receiving the nozzle model number in 712 and setting up the nozzle configuration accordingly in 714. To coordinate the activity of all the nozzles 100, an ID number is assigned in 720 to each nozzle 100 along a spray boom or a platform. Depending on the location of each nozzle 100 along the boom in 722, each particular nozzle 100 is turned on in 730 or off in 724 when a particular region is sprayed. When a nozzle 100 is turned to ON in 730, its operation parameters are set in 732 and

734. In block 734, the control mode information determines the mode of operation of the nozzles 100. The control mode information is entered interactively or pre-set including during the selection of a mode from the table 800 in FIG. 12. The operation mode includes pulsed spraying or continuous spraying. The control mode can also branch to block 760 to process a sequence of instructions after receiving inputs including the target pressure range in 762 and the actual measured pressure in 764. After calculating the desired pressure range, block 770 attempts to set an average fluid flow rate by considering factors including the target pressure in 762, speed of travel of the vehicle in 780, wind speed, terrain, and amount of chemicals prescribed by the fertilizer/herbicide manufacturer in 772, and so on. For pulsed operation starting at block 740, additional parameters include whether to run a nozzle outlet in PWM mode, calculating or looking-up the duty cycle in 742 and pulse frequency in 744. In addition, each single nozzle 100 operation is also determined or selected by parameters including the phase shift between pulses to open and close the valves within a single nozzle 100 (block 746). Likewise, the collective operation is also determined or set by conditions including the phase shift between the valve operation mode for adjacent nozzles 100 (block 748). Special sequences for spraying are selected or set by programming inputs on a console in block 752. For example, to increase the spray frequency, two pulses per valve are interleaved with pulses of other valves during a fundamental period T.

In some embodiments, automation of some of the operational parameters of a nozzle 100 or 300 is possible through, for example, sensing the position of the turret (that is rotated into position either manually or automatically). RFID or other sensing methods are used to sense the nozzle 100 spray tip brand, model number, and other information that are useful for setup. Pulling data about the spray nozzle tips and configurations is also available from a cloud server, wireless transfer, wire transfer, data cards, hand-held devices, or programmed in the equipment itself. User setups could come from "Apps" that are configured for a favorite sequence or use modes. In addition there are Help pages that pull data for advice on use or agronomic recommendations for use in an agricultural or forestry setting.

Figure 11C:
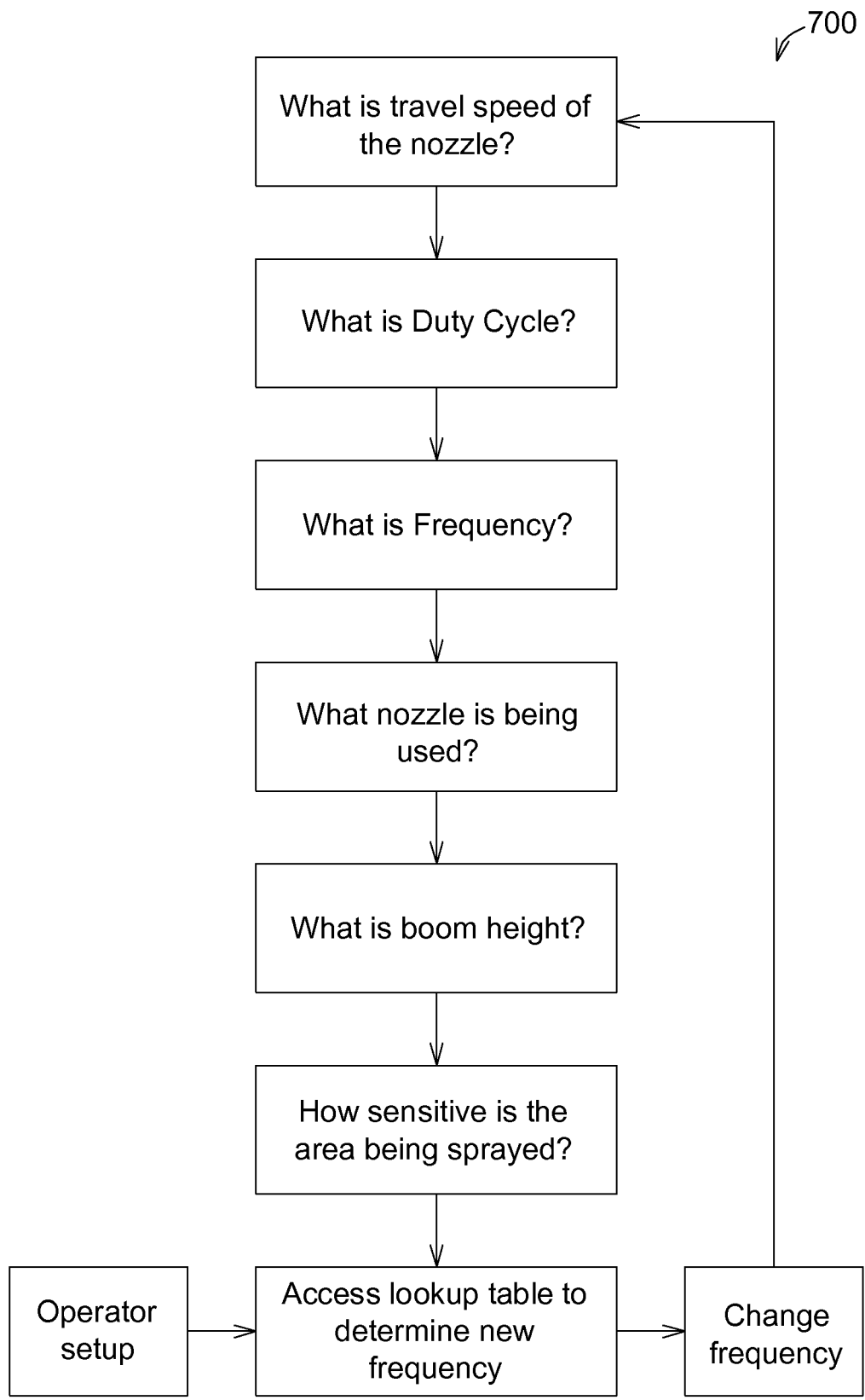
FIG. 11A is a flowchart depicting an example overview method to control the spray nozzles.

Another example of method 700 to configure parameters is depicted in the flowchart of FIG. 110. This example method 700 is shorter than the procedure shown in FIG. 11B. The example of FIG. 11C is a pre-programmed setup that includes changing the duty cycle of a pulse or the pulse frequency based on the real-time parameters. The parameters may include nozzle travel speed, duty cycle percentage and boom height, but are not limited to these. These variables are compared to entries in a lookup table to determine a new frequency or a new pulse width with which to modulate the signal. Automated information gathering and applying method 700 to the electronic configuration (e.g. FIG. 2) allow dynamic pulse spraying to occur, including increased faster operation when it is desired.

In addition to pre-sets for a collection of nozzles 100 (or 300), some embodiments include pre-sets for individual nozzles 100 listed in the form of a table on a computer touchscreen or handheld device. For instance, FIG. 12 depicts a Table 800 providing example modes of spraying operation and choices of options related to individual nozzles 100 (columns 2-7) and to adjacent nozzles 100 (last column, 8). Each "Mode Number" refers to a state of operation. In this example, the "Spray Control Mode" is either PWM or continuous control of the nozzles 100. The "Turret Outlet Position" refers to whether the outlets are combined (e.g. outlet 40 in FIG. 7 where the fluid input to the outlet 40 is from two sources of fluid paths 22 and 24) or are a single outlet (e.g. 44 in FIG. 7). The "Number of Control Valves" refers to examples including depicted in FIG. 7, where it is possible to have either one valve or both valves source fluid to a turret body part of the nozzle body (e.g. 2E). If two or more valves are in operation, they can be open/closed either continuously or pulsed. When the valves are pulsed (PWM) controlled, the pulses applied to each valve are either out of phase, in phase, or overlapping. The columns "Frequency" and "Duty Cycle" refer to the frequency and duty cycle, respectively, of the pulses applied to each valve. The word "same" in the entries refers to the same value being applied to each valve; and the word "multiple" refers to a variety of values being applied to each valve. The last column describes the behavior of nozzles 100 or 300 that are located adjacent to each other on a fluid distribution pipe (e.g. 504).

In different embodiments, a nozzle (e.g. 2A-2E) has two or more valves operating together to control the flow from one inlet 20 to an output. A controller device is programmed to switch among different selected circuit modes including procedure 1) combined outlet—combining the flow from two valves 30 and 32 into one outlet 40 directed to one spray nozzle output; procedure 2) individual outlets—each valve 30 or 32 corresponds to a dedicated nozzle outlet 40 or 42, respectively; and procedure 3) combinations of procedures 1 and 2 when three or more valves exist (e.g. FIG. 7).

In some embodiments, the listed modes in Table 800 are programmed into a computing device for controlling the nozzles 100 (or 300); for instance, an end-user then selects a mode through a look-up table, a screen GUI, an APP on a wireless device, and so on. Alternatively a mode is automatically invoked based on sensed conditions (e.g. weather, wind direction, speed and direction of travel). In some embodiments, the listed modes from Table 800 are also combined with the operation of selected nozzles. For example, after an end-user selects a mode of operation from the Table 800, adjacent nozzles are also operated 180 degrees out of phase, which allows two non-adjacent nozzles on either side of one of the pair of adjacent nozzles to overlap (e.g. ABABABA . . . , the spray from the A nozzles overlap), thus providing coverage when the adjacent nozzle is OFF.

Returning to Table 800, example Modes 1-18 are operated under a PWM spray scheme and Modes 19-20 under a continuous spray scheme, alone, or in combination with a PWM scheme.

Example Mode 1 uses two or more valves (e.g. 30, 32) to create an intermittent pulsed spray through one combined outlet 40. In this mode, adjacent nozzles spray out of phase from each other by some degree of separation (e.g. 180 degrees out of phase for two nozzles or 120 degrees for three nozzles; however it is also possible that the phase separation is not equally spaced apart). In Mode 1, the pulse frequency and the duty cycle (spray on %) are the same for the two or more valves 30 and 32. Variations of Mode 1, include operating the valves 30 and 32 at different frequencies and/or at different duty cycles as shown in Table 800 for Modes 2 through 4. Yet another variation of Mode 1 includes putting the valve in phase so they at the same time as shown in Mode 5. And yet another variation includes changing frequency and duty cycle while keeping the start, end, or some midpoint of the pulse in phase with each other while operating as shown in Modes 6 through 8.

Example Modes 9 and 10 include spraying using only one of the multiple valves for pulsing. For instance, this is achieved by spraying through a combined outlet as in Mode 9 or through individual outlets as in Mode 10.

Example Modes 11 through 18 are similar to Modes 1 through 8 except that the valves are spraying through individual outlets. In an embodiment with three or more valves, one way to release spray fluid is through a combined outlet and also an individual outlet, at the same time (e.g. valve 1 and 2 allow spraying through a combined outlet while valve 3 sprays through an individual outlet). For example, Modes 13 and 17 involve exercising both individual outlets, where each outlet 40 and 42 is associated with its own fluid release valve 30 and 32, respectively, in a physical configuration including nozzle 2C (FIG. 5). Valves 30 and 32 may be pulsed in phase or out of phase, but they are actuated with the same frequency or pulse width duration. The pulse width is automatically or manually varied with vehicle frequency, desired pressure, flow rate, and so on.

In example Modes 19 and 20, the nozzles spray continuously (i.e. not pulsed spray). In Mode 19 this spray is only sprayed through one individual outlet using one valve. For instance, the individual outlet is a stand-alone outlet or one of the multiple individual outlets. In Mode 20, two or more of the multiple outlets are spraying continuously via multiple valves.

In example Modes 21 through 29, there is at least one outlet spraying continuously while at least one outlet is pulsing. This can be beneficial to provide good coverage from the continuous spray nozzle while using the pulsing nozzle as a way of providing additional flow and adjusting the overall flow. Mode 21 includes one outlet with a continuous spray and one outlet with a pulsed spray. Modes 22 through 29 assumes that at least one valve and outlet are used for the continuous spray and pulsed spray modes with at least one of the modes using two or more valves and outlets. When two or more valves and outlets are used in the pulsed spray mode, the pulsing phase, pulse frequency, and duty cycles can either be the same or different as shown in Modes 22 through 29.

The entries of Table 800 exemplify some of the capabilities of individual nozzles 100 (or 300) that can also be applied in a collective (multi-nozzle) operation. Many of the embodiments include nozzles 100 with multiple outlets (e.g. 40 and 42 in FIG. 5) capped with different nozzle 100 spray tips, each tip having the same or different orifice sizes and patterns, but yield the same spray quality (i.e. droplet size body's or targets). The master spray controller 620 or nozzle 100 controller circuit sequences through a set of individual nozzle 100 outlets and spray tips, or through combinations of the nozzle 100 outlets and spray tips, to combine nozzles 100 that best fit the conditions (including the amount of chemicals that would provide sufficient coverage for the speed at which the nozzle/vehicle is travelling). This allows the ability to change the spray rate or pattern as the speed of the vehicle changes or as the speed of the nozzle 100 changes in a turn (i.e. one end of the boom travels faster than the other end of the boom when the sprayer is turning and thus may desire a higher flow rate to compensate for the higher speed). For larger spray areas or where the area has many possible conditions (e.g. terrain varies much, or the vehicle or platform dolly carrying the nozzles makes many turns), a larger range of spray options and modes are made available so that an operator can fine-tune the spraying for his field or target.

In various embodiments, the duty cycle is varied dynamically according to flow or prescription needs and in order to maintain a constant pressure or pressure within a range. Also two outlets on the same nozzle body can be operated at different frequencies. Adjacent nozzle bodies can also operate at different frequencies.

FIGS. 13-29 depict examples of dynamic pre-sets that include different methods, actions or instructions to change the PWM or continuous signals that drive the actuators to control the fluid flow. Depending on how fast the spray vehicle is accelerating or other factors including how much the terrain gradient changes on a variable prescription map, the controller may step through many pre-programmed instructions to switch the signals to the actuators in order to maintain a pre-defined variable including nozzle fluid pressure. For example, when the spray speed changes from 5 to 15 mph in three seconds, the controller would sequence through perhaps five to eight instructions within the three to ten second time period in order to keep the sensed or measured fluid pressure within a desired range (e.g. within +/−10%). Once the spray vehicle is in a steady-state mode or speed, the controller would tend to remain under the same one or two instructions, possibly switching only every few seconds or minutes. Different factors may be a priori programmed to trigger switching to a different instruction, for example speed changes, rate changes from a prescription map, or pressure changes dictated by the operator. The pre-defined variables or conditions that are being maintained within a defined range include fluid pressure within a nozzle 100 or 300, fluid pressure at a section valve along the fluid distribution pipe, spray droplet size, spray drift, flow rate, and so on. If the fluid release from a single nozzle tip is unable to keep the variable constant or within a desired range, the controller may move to another option including having the fluid released from another nozzle tip or from two nozzle tips simultaneously, or the PWM pulse width is adjusted, and so on.

Further, dynamic pre-sets include automated methods of sequencing through various procedures. The pre-sets would transition sequentially, from instruction to instruction or block to block, 1 to 2 to 3 to 4, and so on. In some embodiments, based on dynamic information from sensors (e.g. travel speed, target surface conditions, fluid pressure, height), certain instructions in the pre-sets are eliminated dynamically as calculated or by comparison with a look-up table. The instructions that are eliminated are based, for example, on keeping the fluid pressure within a fixed range (e.g. within 20 psi) or keeping the flow rate within a fixed range. In various embodiments the dynamic pre-sets are part of block 734 ("Control Mode") in method 700 of FIG. 11B. Alternatively, the dynamic pre-sets are part of condensed method 700 of FIG. 11A, where an operator performs the setup procedure by entering information or selecting a pre-set including by using her console screen 612 (FIG. 2).

Starting with a simple embodiment, FIG. 13 depicts an example operation 806 having three instructions and nozzle topology 2C having two independent outputs, each controlled by its own valve. In actual operation, the three instructions can be readily exercised automatically by a computer processor. Alternatively, an end-user can probably also manually perform or switch among only a few instructions including three instructions when the user detects some need to exercise a change (e.g. when the spray vehicle turns). For illustration purposes, the configuration has four nozzles 100 that are spaced 15 inches or 20 inches apart and positioned at a height such that the spray outputs overlaps. In block 1, each of the four adjacent nozzles 100 spray out of its 03 tips; in block 2, each of the four nozzles 100 spray out of its 04 tips; in block 3, each of the four nozzles 100 spray out of both its 03 and 04 tips. Operation 806 of FIG. 13 displays the resulting pressure and flow rates as the flow rate increases through each block to revise the droplet size. An operator may implement operation 806 for purposes including turn compensation, where the outer end of the boom travels faster and should receive a higher fluid flow rate than the inner end of the boom. By adjusting the pressure, the flow rate is correspondingly adjusted, but the change in flow rate depends on which transitions are selected among the different blocks (e.g. blocks 1 to 2 as opposed to blocks 2 to 3). In this particular example and particular fluid pipe, the transition goes first from block 1 to 2; the 03 nozzle 100 in block 1 climbs to 70 psi before switching to block 2. The transition from block 1 to 2 moves from spraying out of the 03 spray tip to the 04 spray tip and represents a 33% increase in flow rate. However, the transition from block 2 to block 3 moving from the 04 to the (03+04) nozzle 100 is an increase of 75% in flow rate when the 04 tip in block 2 increases to 120 psi before switching to block 3. Such manual operation with only a few instructions or blocks may be too coarse for smooth transition in pressure and flow rate (33% versus 75% increase in one jump) and yet still not fully achieve a desired increase in flow rate during a vehicle turn, vehicle speed change, or other major environmental change. The pressure also went above 120 psi in block 2, which may cause the fluid droplet size profile to change. To have more advanced procedures with finer resolution during transitions, the concept of dynamic pre-sets is introduced.

The following are examples of more complex pre-set sequences for spray operation, including the situation where the height of the spray boom is adjusted or the distance between nozzles is adjusted so that the spray cones overlap by, for example, 10-20 percent of the total fluid released in each cone. Some sequences include blocks that use both multiple nozzle 100 (or 300) outlets along with pulsing nozzles 100 at 50% duty cycle or continuous spraying at 100%. Other blocks use individual outlets and multiple control valves to source fluid to the outlets in nozzle 100. A pre-set can also be performed in conjunction with any multiple outlet nozzle 100 arrangement.

An example pre-set Flowchart 1 is shown in FIG. 14 involving four adjacent nozzles 100 (or 400), each being a multi-outlet nozzle having at least two outlets including depicted in FIG. 3 (or FIG. 5, outlets 40 and 44, for example). Each of the four nozzles 100 (or 300) is outfitted with a 03 (0.3 gallon per minute) nozzle tip at outlet 1 and 04 (0.4 gallon per minute) nozzle tip at outlet 2. Flowchart 1 is for demonstration purposes, and not limited to only four adjacent nozzles or nozzle tip rating. Flowchart 1 includes a method listed in a tabular format, as are the other methods or pre-sets. Flowchart 1 demonstrates a progression of increasing flow rates due to a desired flow rate change at the nozzles 100 to accommodate situations such a change in speed of the sprayer vehicle or a boom turning or variable rate application from a prescription map, and so on. The example setup uses the blocks to increase flow rate, but the values in the setup can also be modified to decrease the flow rate, or continually adjust the rate up or down depending on the real-time conditions.

Figure 14A:
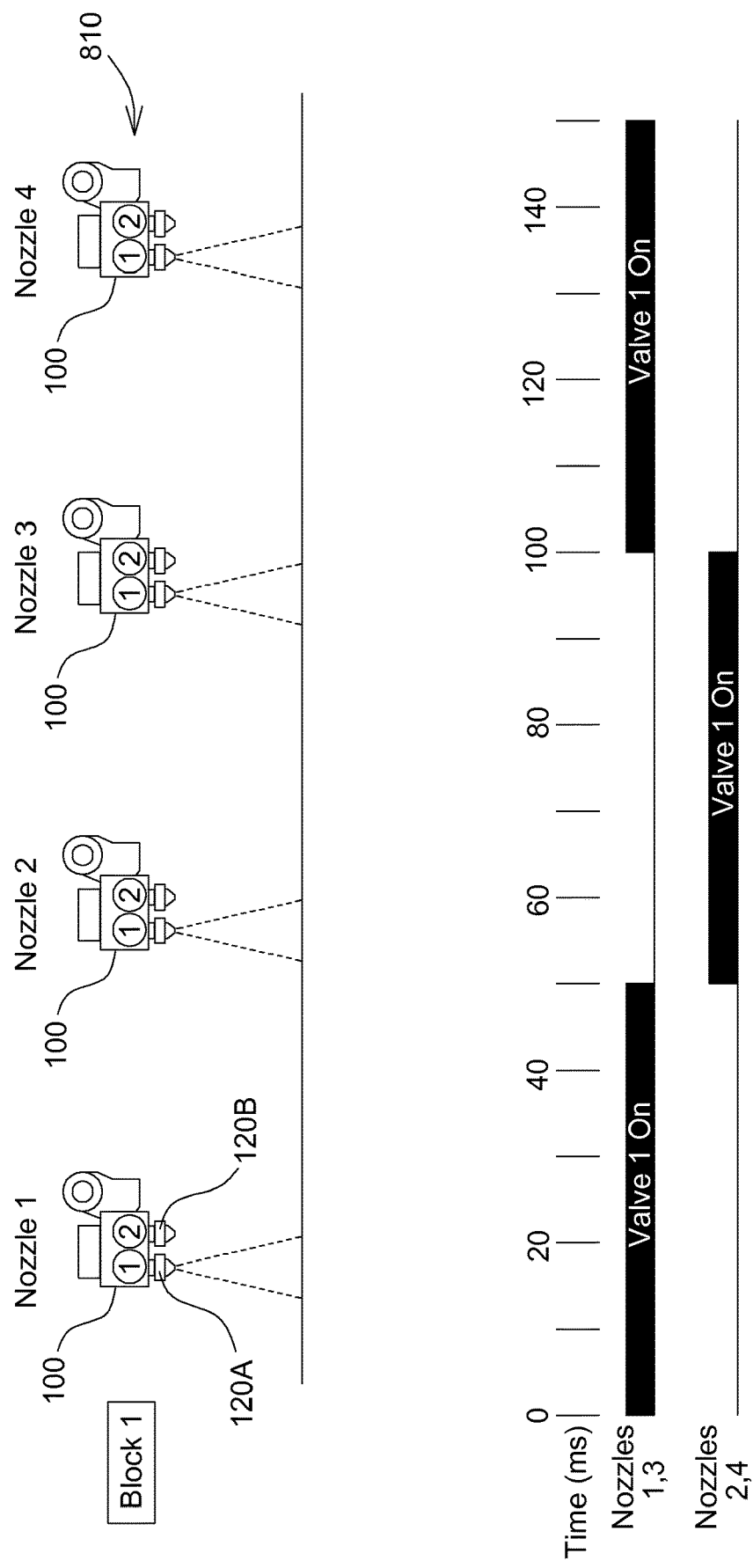
FIG. 14A depicts example nozzle fluid release and timing control of the nozzles corresponding to the first block in the method of FIG. 14.

FIGS. 14A-14H depict individual blocks listed in Flowchart 1. In FIG. 14A, in block 1, the 03 nozzle tips are pulsing at 50% duty cycle, nozzles bodies 1 and 3 being 180 degrees out of phase with nozzle bodies 2 and 4, respectively (i.e. nearest adjacent neighbors are 180 degrees out of phase). As shown in the accompanying timing diagram in FIG. 14A, there is one of the overlapping nozzle bodies spraying in the 100 ms cycle. For each nozzle body, valve 1 is ON 50% and OFF 50% of the time and releases fluid to outlet 1 of each nozzle body. The fluid output is between 0.15 to 0.18 gallons per minute and the pressure range is between 40 to 70 psi.

Figure 14B:
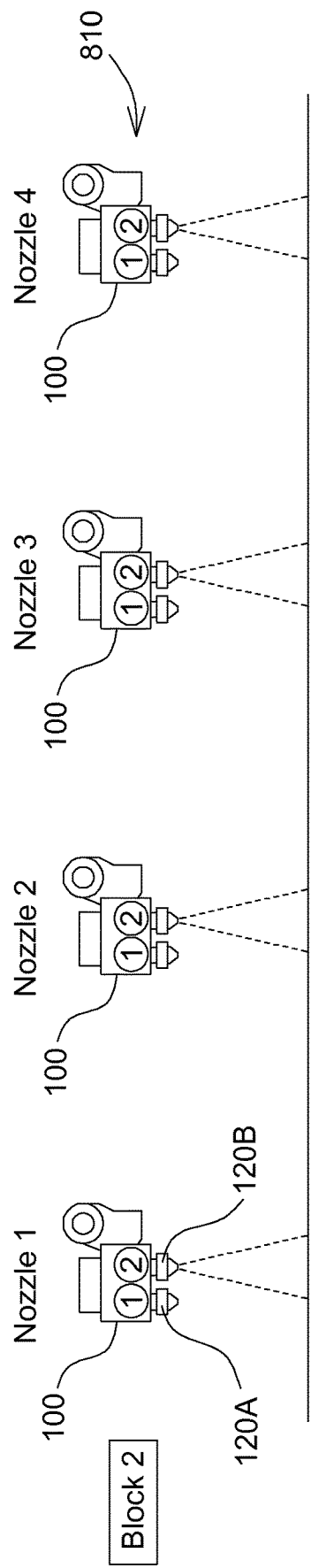
FIG. 14B depicts example nozzle fluid release and timing control of the nozzles corresponding to the second block in the method of FIG. 14.

In FIG. 14B, in block 2 of Flowchart 1, the 04 nozzle tips are pulsing at 50% duty cycle with nozzles bodies 1 and 3 being 180 degrees out of phase with nozzles bodies 2 and 4, respectively. Like in block 1, there is one of the overlapping nozzles bodies spraying in the 100 ms cycle. The output is between 0.20 to 0.25 gallons per minute and the pressure range is 40 to 90 psi.

Figure 14C:
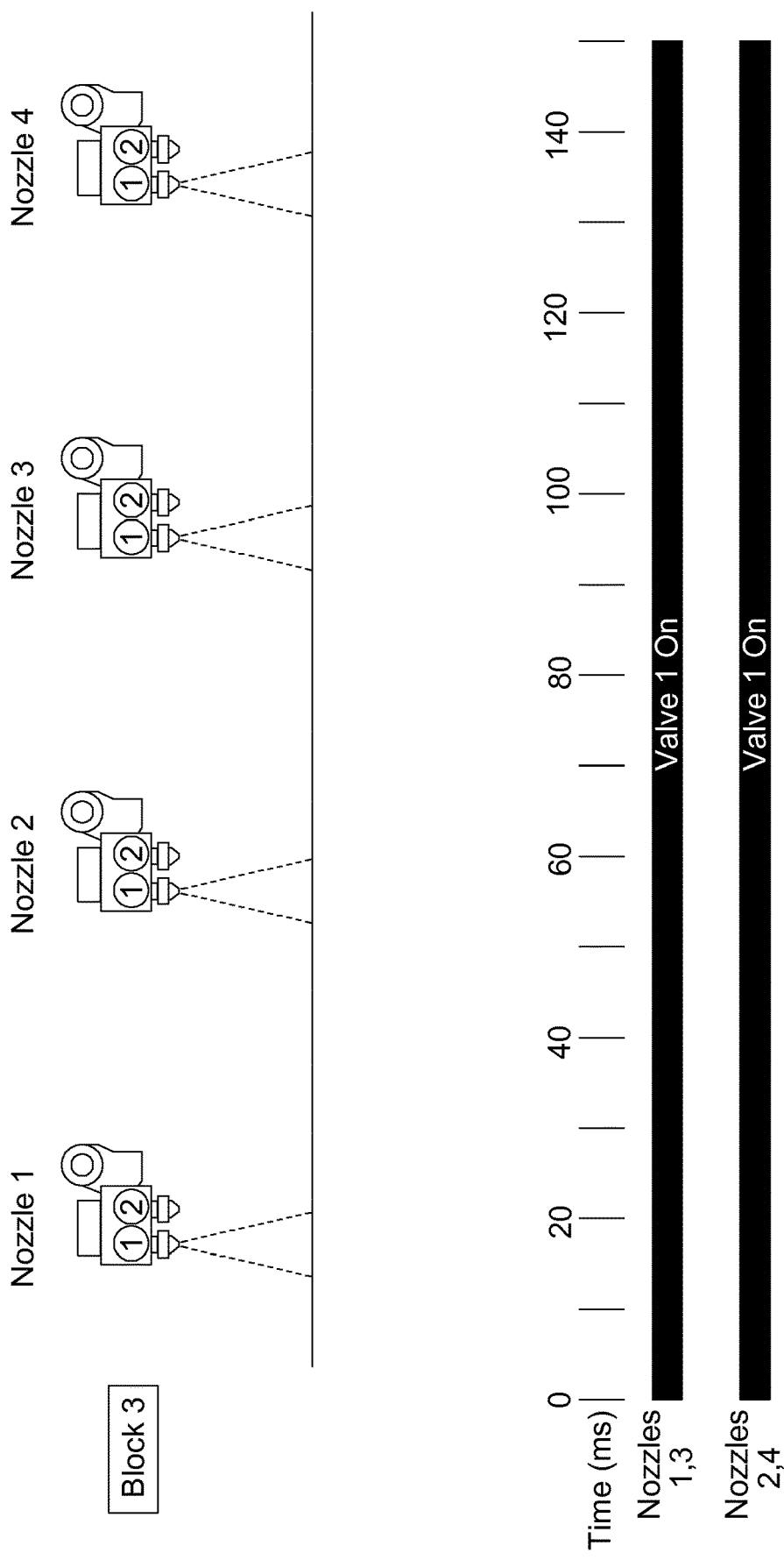
FIG. 14C depicts example nozzle fluid release and timing control of the nozzles corresponding to the third block in the method of FIG. 14.

In FIG. 14C, in block 3 of Flowchart 1, the outlets 1 (03 nozzles tips) are spraying continuously at 100% duty cycle. The timing diagram in FIG. 14C shows how all four nozzles bodies spray continuously. The output is between 0.30 to 0.35 gallons per minute and the pressure range is 40 to 54 psi.

Figure 14D:
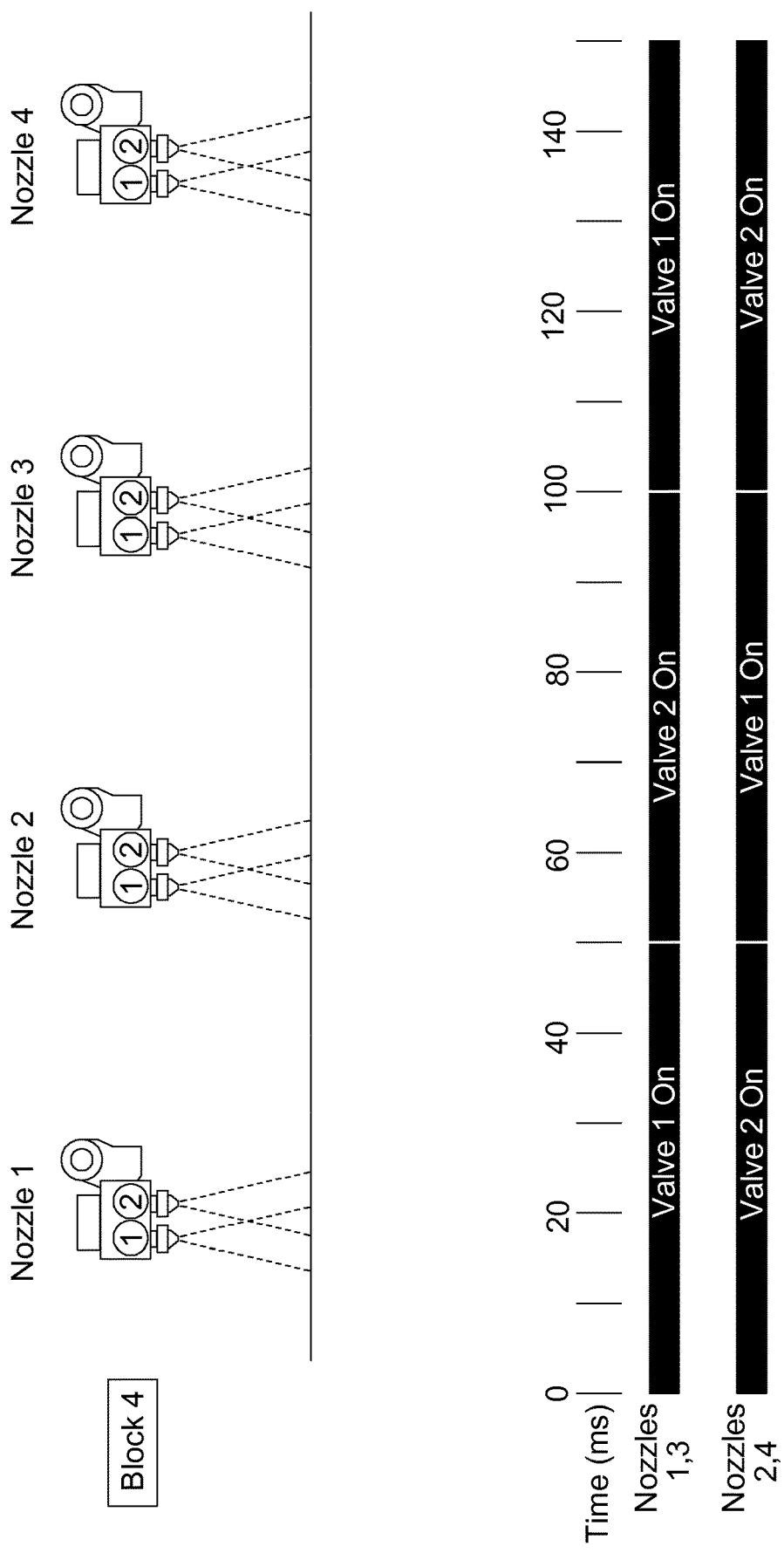
FIG. 14D depicts example nozzle fluid release and timing control of the nozzles corresponding to the fourth block in the method of FIG. 14.

In FIG. 14D in block 4 of Flowchart 1, the 03 and 04 nozzles tips are each spraying at 50% duty cycle. There are several ways to exercise the pre-set sequence for the nozzles 100 in this configuration. One way is to have the nearest adjacent nozzles bodies pulse in phase nozzle bodies 1 (and 3) using valve 1 and nozzle bodies 2 (and 4) using valve 2 (i.e. valves 1 and 2 of adjacent nozzle bodies are in phase). Nozzles bodies 1 (and 3) using valve 2 and nozzles bodies 2 (and 4) using valve 1 are out of phase. The timing graph in FIG. 14D shows there is overlapping coverage. The output is between 0.35 to 0.40 gallons per minute and the pressure range is 40 to 54 psi.

Figure 14E:
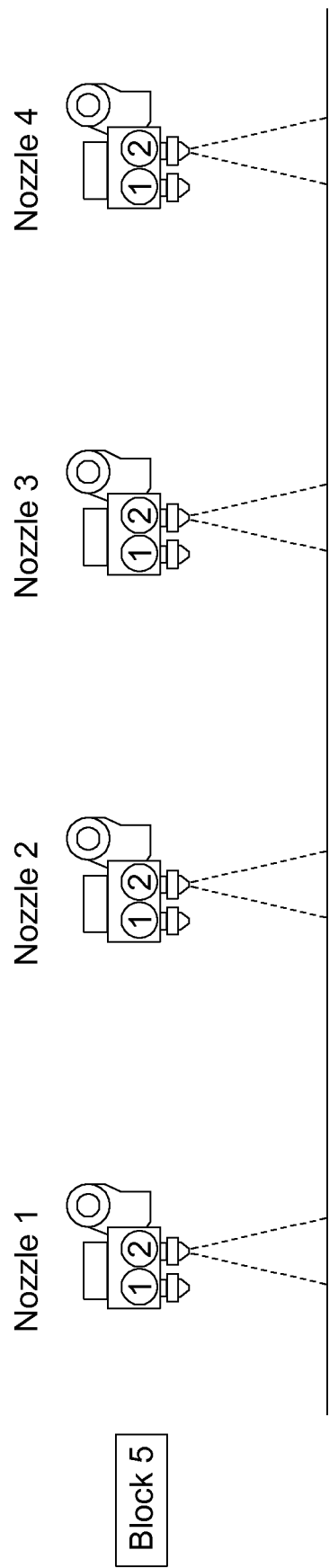
FIG. 14E depicts example nozzle fluid release and timing control of the nozzles corresponding to the fifth block in the method of FIG. 14.

In FIG. 14E, in block 5 of Flowchart 1, the 04 nozzles tips are spraying continuously at 100% duty cycle. Like the timing diagram for block 3, all four nozzles bodies spray continuously. The output is between 0.40 to 0.50 gallons per minute and the pressure range is 40 to 62 psi.

Figure 14F:
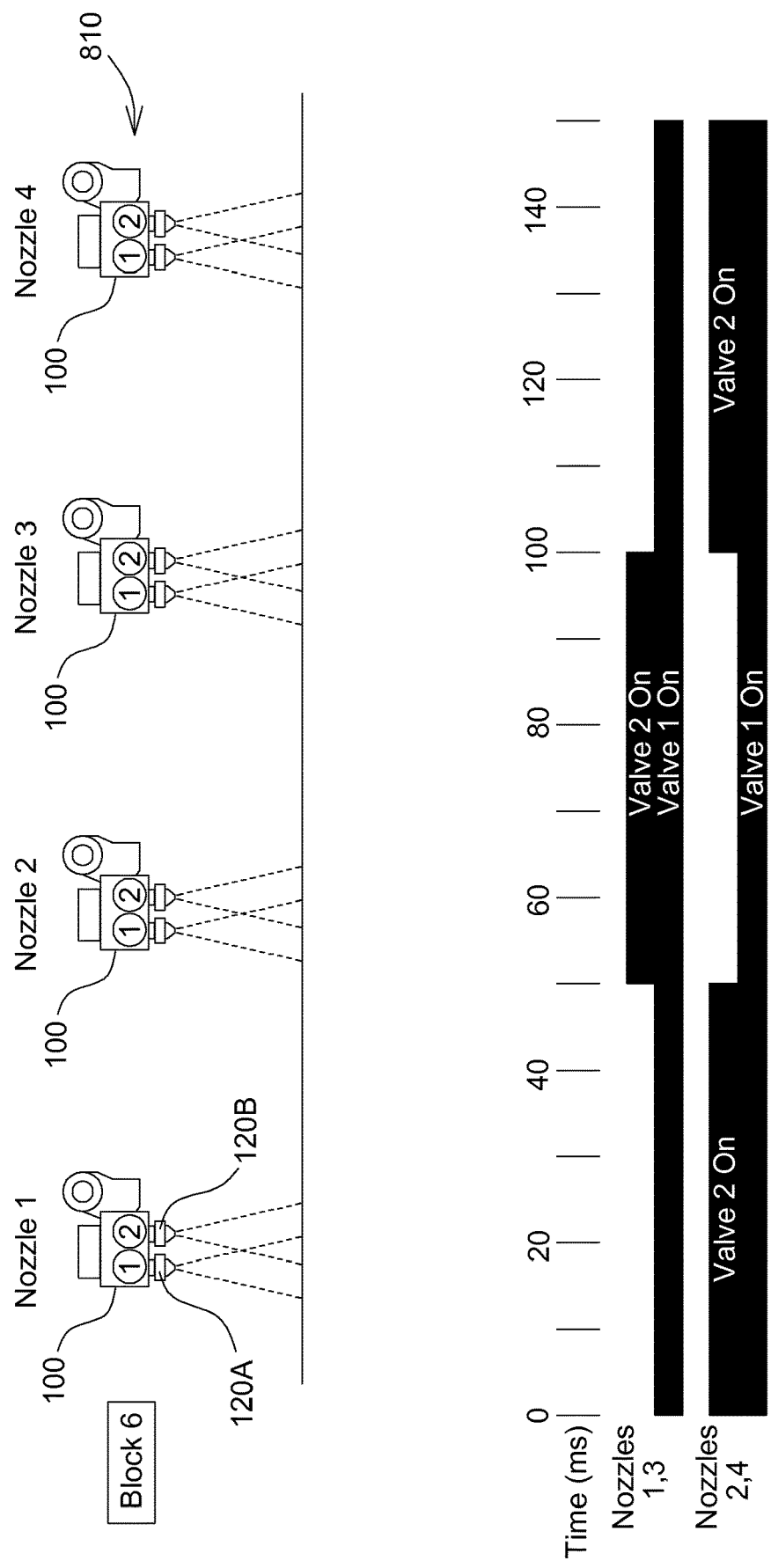
FIG. 14F depicts example nozzle fluid release and timing control of the nozzles corresponding to the sixth block in the method of FIG. 14.

In FIG. 14F, block 6 of Flowchart 1, the 03 nozzles tips are spraying continuously at 100% duty cycle while the 04 nozzle tips spray at 50% duty cycle. The timing graph shows the 03 nozzles tips spray continuously while the 04 nozzles tips are pulsing out of phase, but still provide uniform coverage due to the adjacent nozzle bodies spray cone being overlapping. The output is between 0.50 to 0.55 gallons per minute and the pressure range is 40 to 49 psi.

Figure 14G:
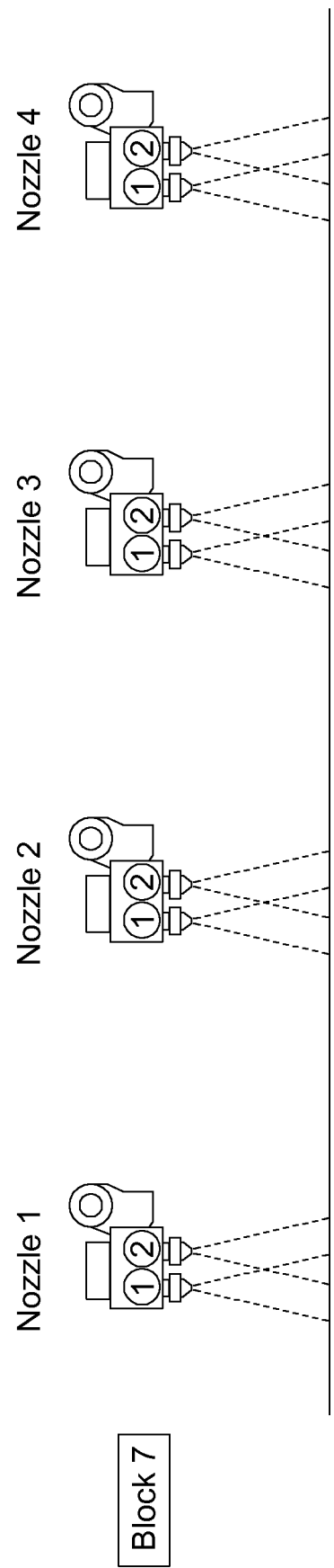
FIG. 14G depicts example nozzle fluid release and timing control of the nozzles corresponding to the seventh block in the method of FIG. 14.

In FIG. 14G block 7 of Flowchart 1, the 04 nozzles tips are spraying continuously at 100% duty cycle while the 03 nozzle tips spray at 50% duty cycle. Similar to the timing diagram in block 6, but reversing the order or opening the valves, the 04 nozzles tips spray continuously while the 03 nozzle tips are pulsing out of phase, but still provide uniform coverage due to overlapping spray cones. The output is between 0.55 to 0.70 gallons per minute and the pressure range is 40 to 65 psi.

Figure 14H:
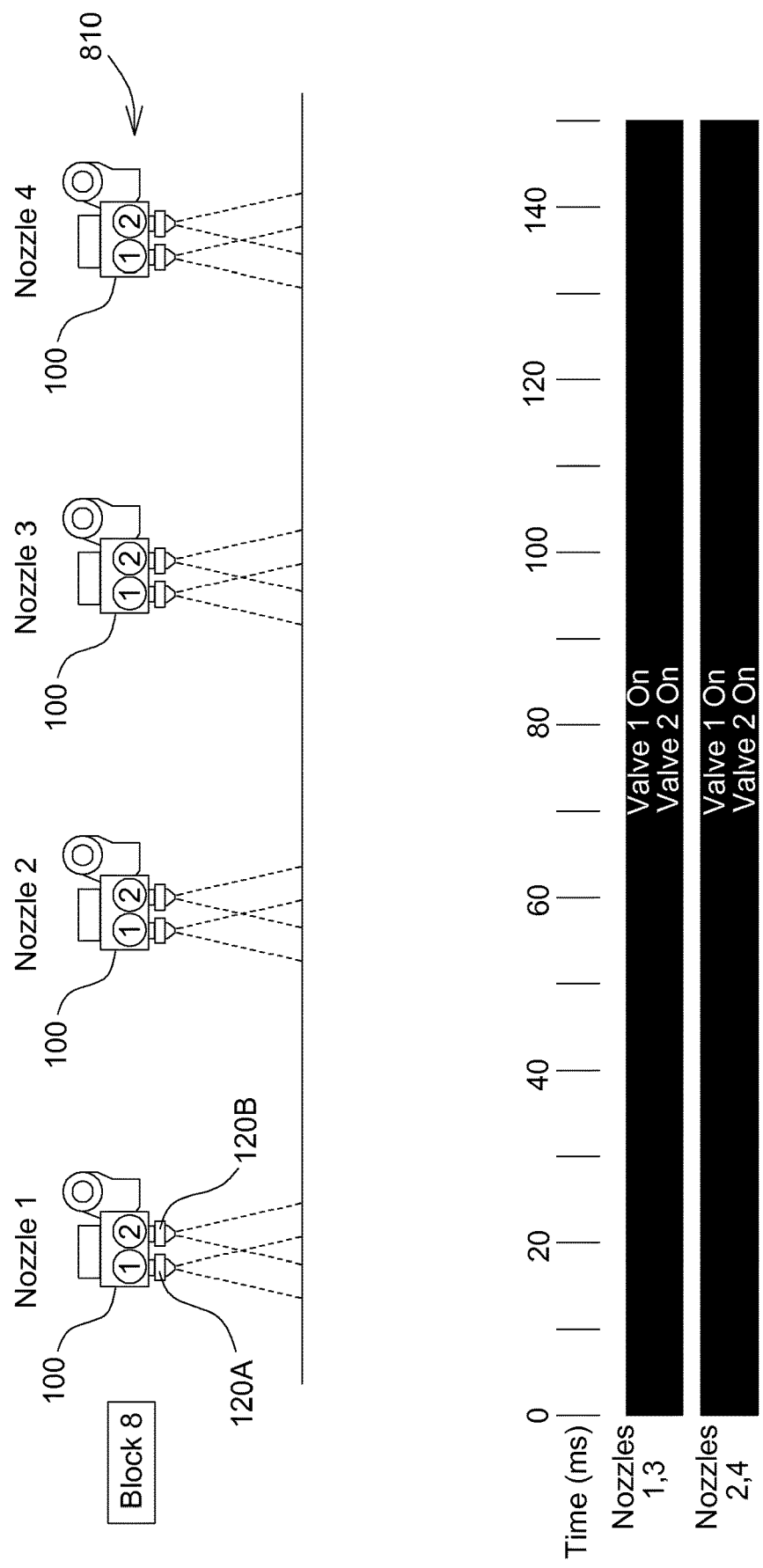
FIG. 14H depicts example nozzle fluid release and timing control of the nozzles corresponding to the eighth block in the method of FIG. 14.

In FIG. 14H block 8 of Flowchart 1, all of the 03 and 04 nozzles tips are spraying continuously at 100% duty cycle. The output is between 0.7 to 0.90 gallons per minute and the pressure range is 40 to 65 psi and the system can go still higher beyond this.

In the example blocks of Flowchart 1, the turn down ratio is six (turn down relates to the range of flow rates over which the nozzles can operate, or the ratio between the adjustable minimum spray capacity and the maximum spray capacity). In every block, the pressure is maintained between 40 to 70 psi with the exception of block 2. There are alternative embodiments to block 2. The turn down ratio of six should allow a vehicle speed change by a factor of six times, so that a vehicle could operate in the field from 4 to 25 miles per hour without a significant change to the droplet size profile. The turn down ratio of six is sufficiently close to a turn down ratio of five that is often used for a 120 foot boom with a 30 degree turn radius. Among the blocks of Flowchart 1, there are no nozzles bodies all being off. Should the nozzle bodies be physically near enough to create a double overlap of spray cones beyond the adjacent nozzle body, there is at least a minimum single overlap of the spray cones of the nozzle bodies. Throughout, the flow rate applied at any given time was substantially the same (e.g. to within 95 percent) or transitioning smoothly with small changes in magnitude to within five percent. "Substantially the same" refers to within design, manufacturing, test and measurement tolerances or at least within 95 percent the same.

In a situation where a constant flow rate as a function of time is desirable, it may not always be achievable due to external forces. One example solution is to use other values for the duty cycle and not only 100% or 50% as shown in Flowchart 1. Other duty cycles are used to fill in gaps or at the low ends of the flow range. Block 2 in Flowchart 1 presented a situation where the pressure range went past 70 psi and was instead 40 to 90 psi, which may cause a different flow rate during operation.

There are alternative embodiments that preserve a pressure range of, say, 40 to 70 psi. For example, the physical nozzle body setup can be a single outlet rather than two or more outlets. Two valves within each nozzle are pulsed or actuated to combine fluid to flow into a single outlet. The PWM signals controlling the two respective valves are modulated by relative pulse width durations so that they each also account for the different size of the nozzle tips 03 and 04 (e.g. by extending the duration of the ON state for one of the valves).

Figure 15A:
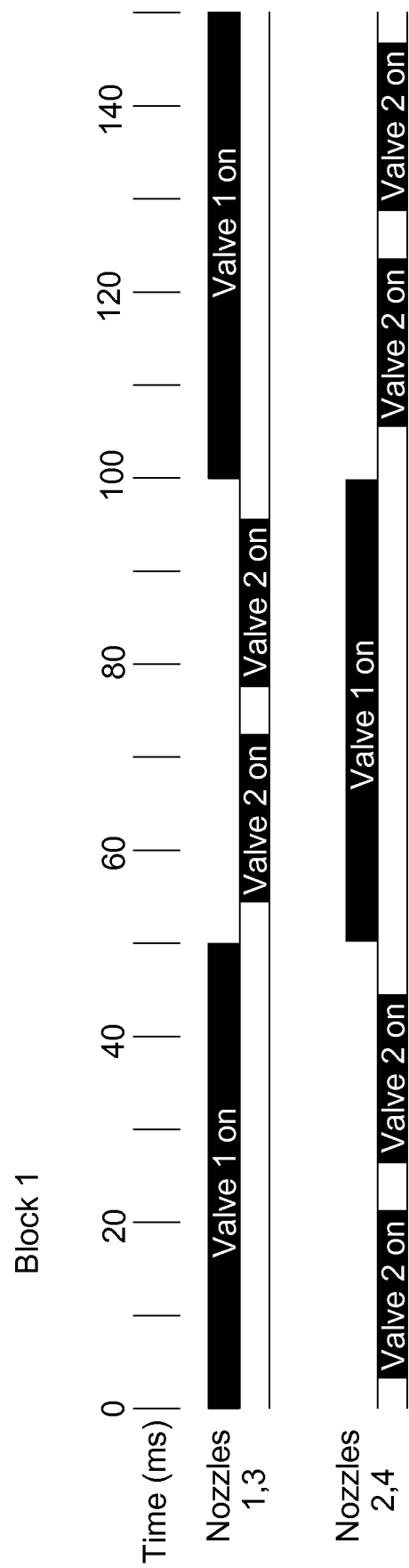
FIG. 15A depicts example timing control of the nozzles corresponding to the first block in the method of FIG. 15.

FIG. 15 contains Flowchart 2 that depicts another example method of sequencing through the spray configurations to maintain the fluid pressure between 40 and 70 psi. Block 4 in Flowchart 2 is added between blocks 2 and 3 in the previous example (Flowchart 1) to generate an extra block of resolution. There are a number of example ways to implement block 4. The first is by having 03 nozzle tip spray at 50% duty cycle while the 04 nozzle tip sprays at 25% duty cycle and at double the frequency. For demonstration purposes, the 03 tip is set at 10 Hz and the 04 tip set at 20 Hz. And the duty cycle has two pulses per nozzle body before alternating to the other nozzle body. The timing graph in FIG. 15A shows one such configuration where this is done. One aspect of two pulses per nozzle body before alternating to another body is that it provides a reasonably uniform spray output, which may also be enhanced by the thickness of the spray droplets, or altered by wind, turbulence, and boom height conditions. The output is between 0.25 to 0.30 gallons per minute and the pressure range is 40 to 63 psi and 40 to 58 psi in Flowchart 2 as compared to a pressure range of 40 to 90 psi in Flowchart 1. Alternatively, finer resolution is performed by distributing alternate 04 nozzle tip spraying at 25% duty cycle among nozzles bodies (i.e. rather than two pulses) at a frequency including 10 Hz.

Figure 15B:
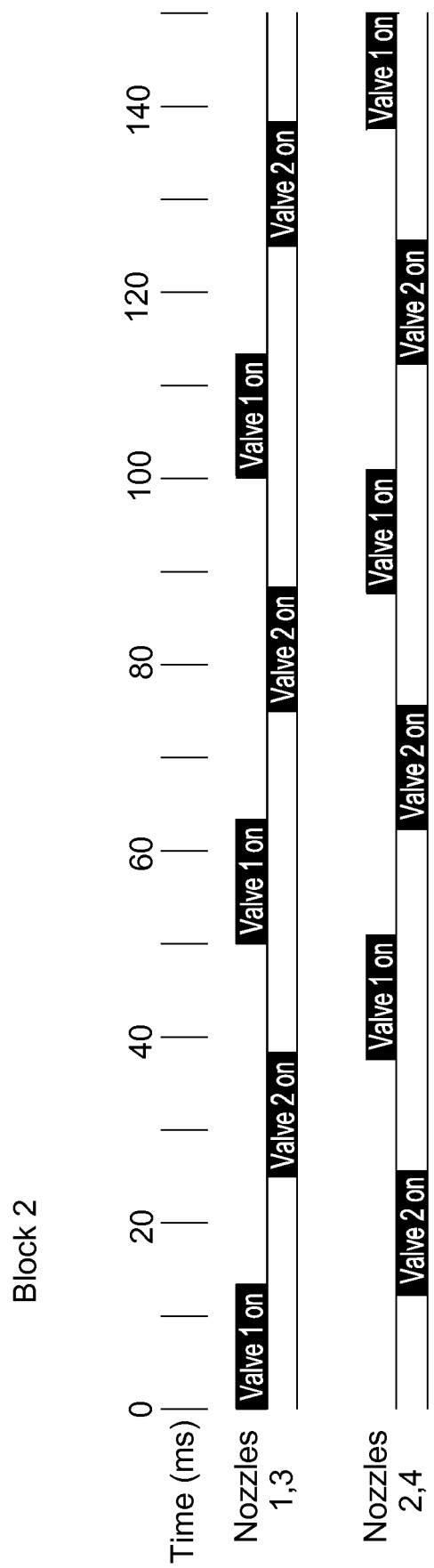
FIG. 15B depicts example timing control of the nozzles corresponding to the second block in the method of FIG. 15.

In FIG. 15B, block 2 of Flowchart 2 performs pulsing at 25% duty cycle and double the frequency (in this example 20 Hz) using a sequence where at least one nozzle body is spraying with single overlap among two nearest adjacent nozzles. The sequence shown in the time graph 85 below is nozzle body 1 & 3 valve 1, nozzle body 2 & 4 valve 2, nozzle body 1 & 3 valve 2, and nozzle body 2 & 4 valve 1. The increased frequency (double) is used to provide more uniform coverage between the adjacent nozzle bodies, but can also instead be performed at the base frequency or some other frequency. The output is between 0.18 to 0.20 gallons per minute and the pressure range is 40 to 58 psi and 40 to 49 psi for the two blocks that replace the one block which had a pressure range of 40 to 70 psi.

Figure 15C:
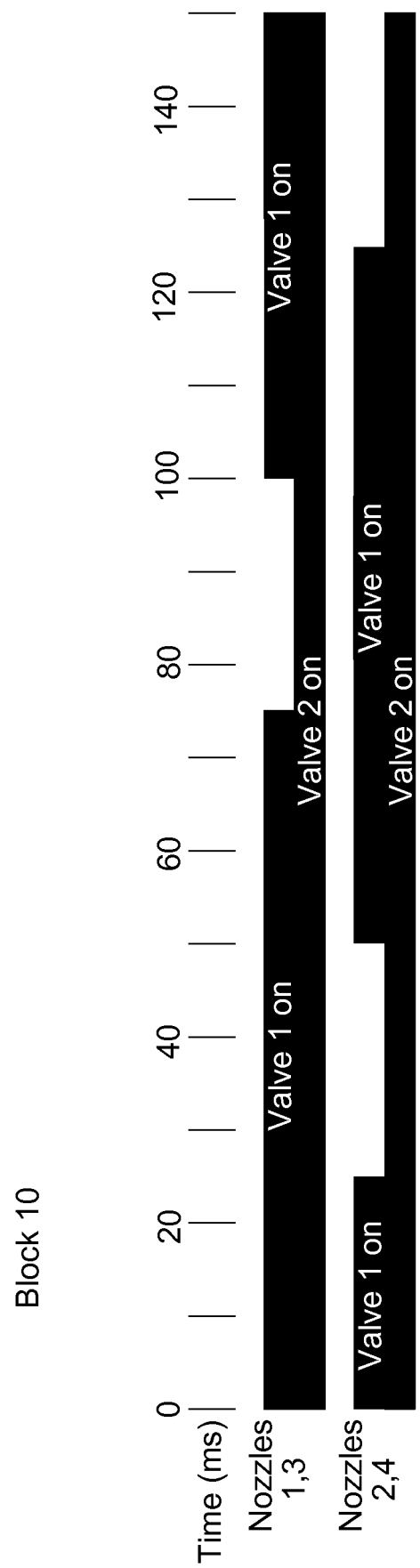
FIG. 15C depicts example timing control of the nozzles corresponding to the tenth block in the method of FIG. 15.

In FIG. 15C, block 10 of Flowchart 2 shows an example of another setup that still provides coverage throughout the cycle. In this case the 04 nozzle tip is spraying continuously while the 03 nozzle tip sprays at 75% duty cycle. In the timing graph of FIG. 15C, the flow rate is not the same through the cycle period, but there is still spray coverage and the amount of flow rate variation is less than what would occur with only one valve releasing fluid per outlet for each nozzle body.

Figure 16A:
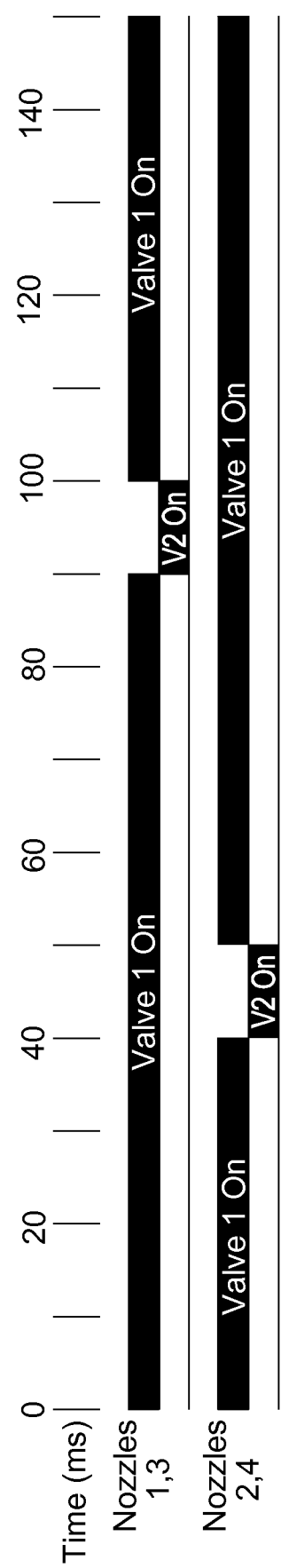
FIG. 16A depicts example timing control of one of the nozzles to reset a flow situation where adjacent nozzle bodies are far apart in flow rate.

FIG. 16 contains Flowchart 3 that depicts another example method of how to set up the 03 and 04 spray tip configuration on each nozzle body using a twelve action sequence. The Flowchart 3 setup includes two nozzle bodies that are farther apart in flow rate than in the previous examples. For instance, an end-user has 02 and 10 nozzle tips that he places on the nozzle bodies, where 02 refers to 0.2 gallon per minute flow (at 40 psi) and 10 refers to 1.0 gallon per minute flow (at 40 psi). In this example, the nozzle body flow rates between the two outlets have a difference in the nominal flow by a factor of 5 times. In this example, one goal is to keep the sum of the pulse duration time on among the multiple valves on a nozzle body equal to the total period T of the cycle. The electronic circuit sends independent signals to each valve, but resets all the signals at the stroke of the next period T. For instance, in the case of the 02 and 10 nozzles tips on two outlets, the 02 nozzle body (valve 1) is set at 90% at 10 Hz (i.e. 90 ms of the 100 ms cycle), and the 10 nozzle body (valve 2) is set at 10% of the 10 Hz to make up the remaining 10 ms of the 10 ms cycle. The timing diagram in FIG. 16A depicts how this example looks on an oscilloscope. Nozzle bodies 1 and 3 have valve 1 (02 nozzle tip) that is ON for 90 ms and valve 2 (10 nozzle body) is ON for 10 ms. The valves on nozzles bodies 2 and 4 are out of phase by 180 degrees with respect to the corresponding valves on nozzle bodies 1 and 3 in the example timing graph in FIG. 16A.

The mode of operation in Flowchart 3 theoretically allows an infinite number of instructions so long as the ON time duration among the multiple valves sums to the total period time T. For practical purposes, the modes may be set up in 1% increments, or for the purpose of simplifying the discussion, Flowchart 4 in FIG. 17 depicts an example where there is an increment of 5% in going from procedure block 2 to block 22.

In block 2 of Flowchart 4, when the 02 nozzle tip is set at 100% duty cycle the 10 nozzle tip is 0%, providing a 0.20 gallon per minute flow. In block 3, the 02 nozzle tip changes to 95% and the 10 nozzle tip changes to 5% yielding 0.24 gallon per minute of flow. In block 4, the 02 nozzle tip changes to 90% and the 10 nozzle tip changes to 10% providing 0.28 gallons per minute of flow, and so on.

Figure 17A:
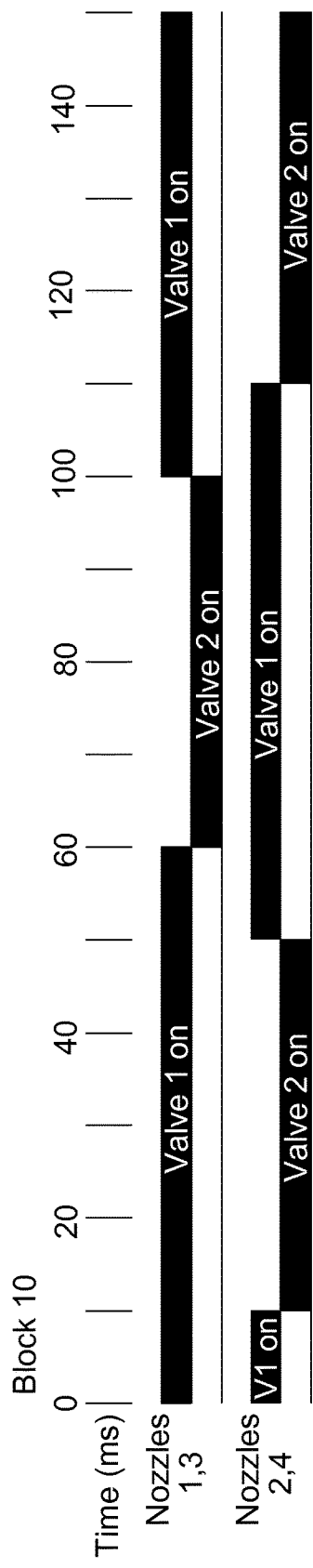
FIG. 17A depicts example timing control of the nozzles corresponding to block 10 in the method of FIG. 17.
Figure 17B:
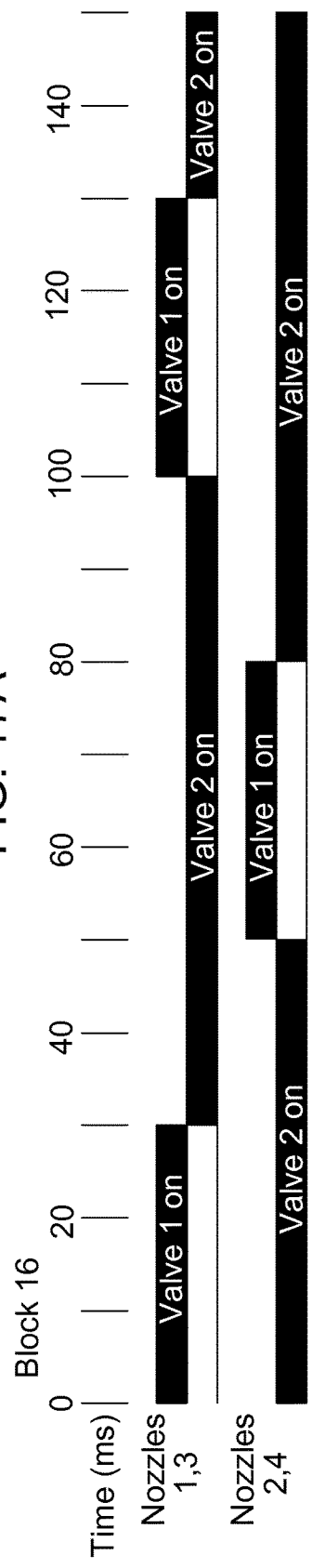
FIG. 17B depicts example timing control of the nozzles corresponding to block 16 in the method of FIG. 17.
Figure 17C:
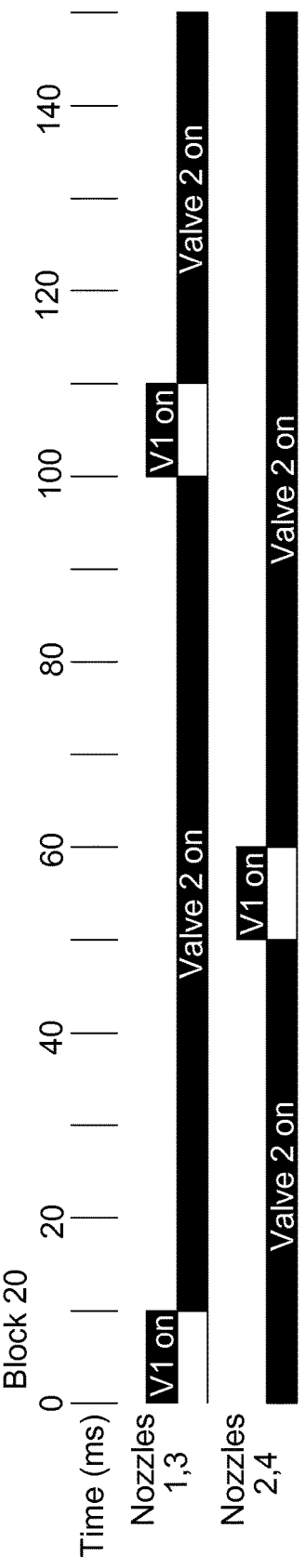
FIG. 17C depicts example timing control of the nozzles corresponding to block 20 in the method of FIG. 17.

FIGS. 17A, 17B and 17C are three timing graphs depicting how the flow continues to increase. FIG. 17A (block 10) depicts the 02 nozzle tip (valve 1) at 60% duty cycle and the 10 nozzle tip (valve 2) at 40% duty cycle. FIG. 17B (block 16) depicts the 02 nozzle tip (valve 1) at 30% duty cycle and the 10 nozzle tip (valve 2) at 70% duty cycle. FIG. 17C (block 20) depicts the 02 nozzle tip (valve 1) at 10% duty cycle and the 10 nozzle tip (valve 2) at 90% duty cycle.

The example spray application of Flowchart 4 includes a small change in the spray rate as the vehicle travels, whereas the examples of Flowcharts 1-3 attempt to keep the spray rate the same throughout the whole cycle. The example of Flowchart 4 includes a turn down ratio of ten. By selecting spray tips, using both outlets on a nozzle body and adjusting the boom height, a balance between the turn down ratio and an improved spray coverage is achieved. Regardless, these solutions provide at least some spray coverage during vehicle travel. Agronomists, farmers, or industrial end users can optimize which of the methods to select for the types or size of spray tips that they mount on each spray nozzle 100.

For air induction nozzles tips, the spray tip is generally set up to spray continuously, but may also operate under PWM control depending on the physical size of the spray tip. For instance, a larger nozzle body may tolerate fine droplets sizes. Alternatively, a non-air-induction tip is also set up to spray either continuously or under PWM control (or some other form of modulated signal control).

Figure 18A:
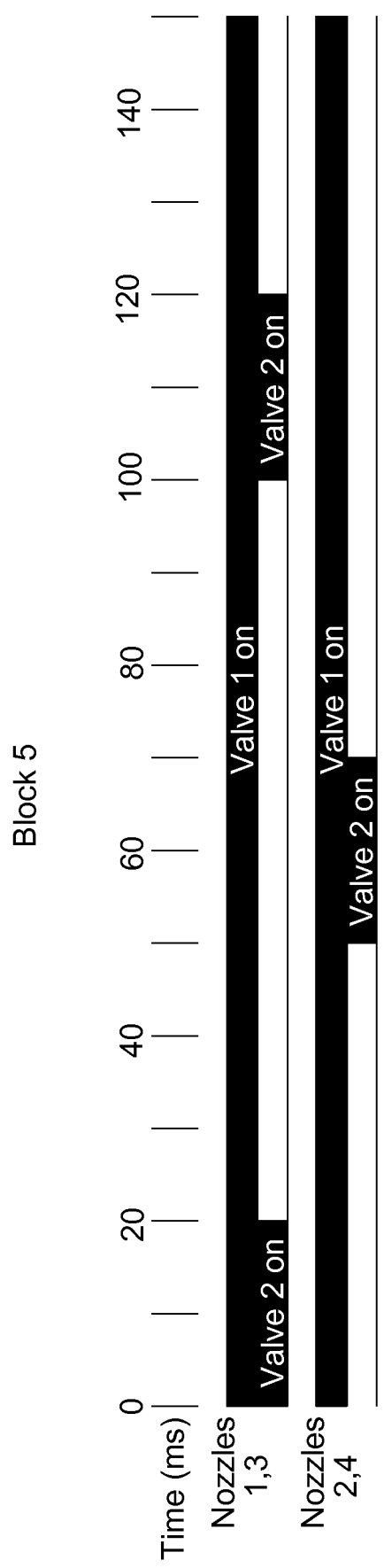
FIG. 18A depicts example timing control of the nozzles corresponding to block 5 in the method of FIG. 18.

FIG. 18 contains example Flowchart 5 method includes a setup with outlet 1 having a 02 nozzle tip with or without air induction that has continuous flow, while outlet 2 has a non-air induction 10 nozzle tip that is pulsed under PWM control. In Flowchart 5, each procedure block has 100% duty cycle (continuous flow) assigned to outlet 1 (02 nozzle tip, nozzle bodies 1 and 3). In the meantime, as the flow is increase at each block, outlet 2 (10 nozzle tip, nozzle bodies 2 and 4) is incrementally increase at 5% duty cycle. Flowchart 5 depicts how the flow rate is increased from 0.20 to 1.60 gallon per minute which is a turn down ratio of eight. FIG. 18 A depicts a timing graph for block 5 of Flowchart 5.

The example system and methods (e.g. pre-sets Flowcharts 1-5) as described above have multiple blocks (each of which have several instructions) to achieve spray precision. In some embodiments, the system can be setup for only one of the many scenarios described above. Alternatively, the system can have just a hand-full of settings to choose from. Another alternative, the system is customizable to many or all of the settings described above. And, the system uses automation (including sensors and computer decisions) to determine the settings.

The aforementioned examples have a constant number of procedures or instructions but in a fast moving vehicle or where the environmental conditions change rapidly, some of the blocks are eliminated automatically based on how rapidly a parameter is changing or how time-consuming a particular block can be executed, and so on. For example, if the pressure or flow rate is changing rapidly, an intermediary procedure can be eliminated from the list of instructions. As another example, if the vehicle is accelerating or the terrain gradient changes rapidly or the vehicle is making a turn, some of the intermediate procedures in a long list of instructions would be excluded. A spray vehicle speeding accelerating from 5 to 15 mph in 3 seconds would sequence through 5 to 8 instructions over a period 3 seconds, which limits the number of blocks (or instructions) that can be processed. Once the sprayer is at a steady-state speed on an even surface, it would likely continue to operate in one or two of the blocks, switching to a next block only every few seconds or minutes. When a condition changes sufficiently, this triggers the central computers and Spray Controller electronics to move to execute the next procedure or instruction. Condition changes include speed changes, rate changes from a prescription map, or pressure changes dictated by the operator. For turn compensation some sections of the boom would have a different spray flow rate. Nozzles on the inner wing sections spray less (lower flow rate) and the breakaway sections spray more (higher flow rate).

Depending on the complexity of the end-use application of the sprayer system, the example methods may be for only one of the many scenarios described above depending on whether the spraying is conducted indoors (no wind, smooth gliding on a dolly platform) or outdoors (e.g. on a rugged terrain, many turns and in high wind). The system may be pre-programmed with a hand-full of settings to choose from. Alternatively, the system is customizable to many or all of the settings described above, or the settings are downloaded from a central farm site or cloud server on an as-desired basis. Or, the system has automation to determine the most appropriate settings based on the environmental conditions detected by sensors that are in communications with the master operations computer.

During manufacturing or subsequent programming, the calibration or setup of nozzle control sequences is configured through interfaces including the central console or display screens (e.g. FIG. 10A). To simplify spray set up for a novice end-user, the control system establishes pre-set sequences to choose from as well as recommended pre-sets to use for a given collection and number of nozzles 100. Alternatively, the control is also user configured in the case where an operator wants to do something very specific, including deleting a particular instruction or block from any of the methods (pre-sets), or by combining methods.

Additional embodiments include selecting different nozzle tips including when the spray cones from adjacent nozzle bodies overlap. One nozzle body has one type of spray tip and an adjacent nozzle body has another type of spray tip so that there are alternating different types of nozzle bodies. This is a configuration that may simplify manufacturing and mounting of nozzle tips, where an operator would then buy two types of nozzle bodies. Adjacent nozzle bodies can also have different shape of nozzle tips and not just a variation on the flow size. For instance, the arrangement of nozzles alternates between fertilizer nozzles and spray nozzles, or between hollow cone tips, solid cone tips, fan spray tips and so on. The varied arrangement permits spraying of different chemicals or different spray patterns including banding fluids or spraying into particular locations between the rows.

Although the foregoing procedures are described in the context of an individual nozzle topology 2C depicted in FIG. 5, another implementation is the nozzle topology of FIG. 3 or 7 (where outlet 40 is used together with one or both of the outlets 44 and 46). There is combined fluid flow from two or more valves into one outlet 40, which uses two or more valves between the inlet and the outlet and pulsing the valves open out of phase with each other (i.e. 180 degrees for two valves, 120 degrees for 3 valves, etc.) in order to produce a higher overall frequency fluid flow at the outlet 40.

Figure 19:
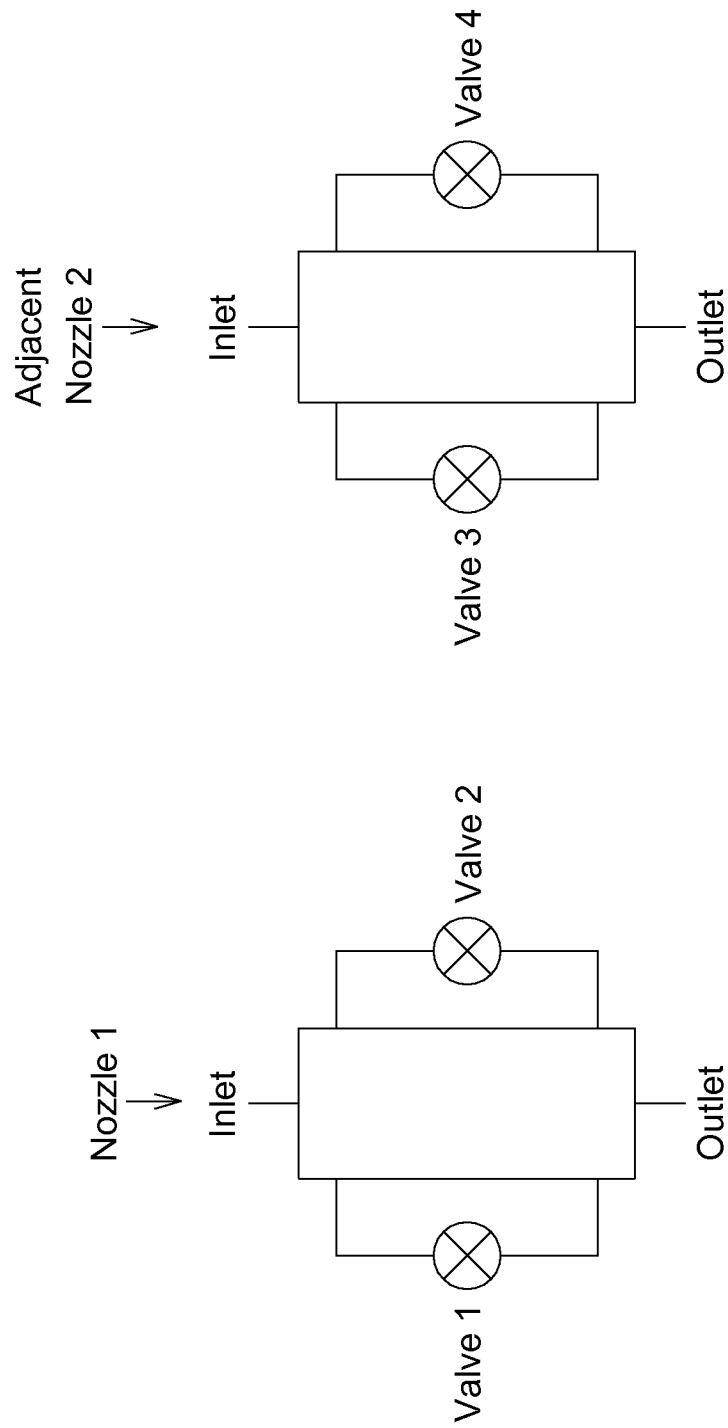
FIG. 19 depicts an example of two adjacent nozzle bodies that can be extended to four, six, etc.
Figure 20:
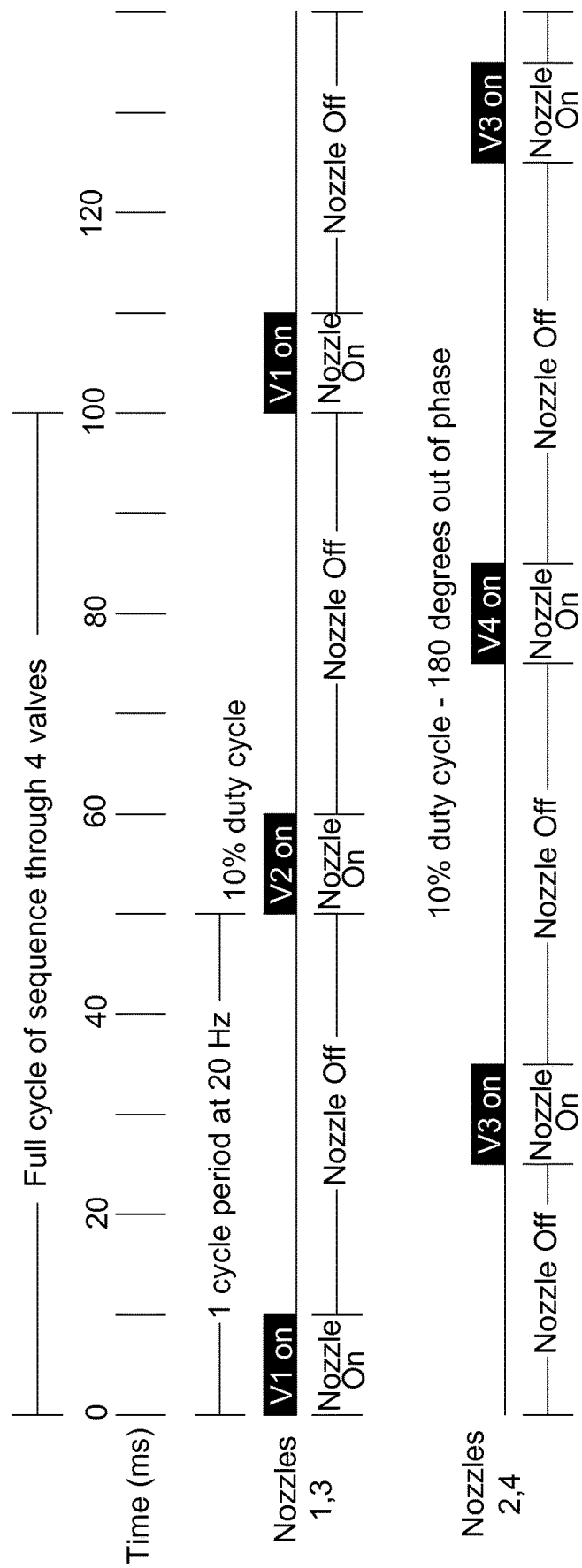
FIG. 20 depicts an example timing diagram for four or six adjacent nozzles.

Yet another alternative is to use the topology of FIG. 19 depicting adjacent nozzle bodies 1 and 2, etc., that together, have the ability to achieve higher frequencies and also span a larger range of frequencies and modulations by switching among different nozzle tips, different nozzle bodies and other settings. In the example arrangement of FIG. 19, the adjacent nozzles 1 and 2 are pulsed 180 degrees out of phase. Or adjacent nozzles 1, 3, and 5, etc., are pulsed 180 degrees out of phase relative to nozzles 2, 4, 6, etc. As shown in FIG. 2C the pulsing sequence is valve 1 on nozzle body 1 followed by valve 3 on the adjacent nozzle body 2, followed by valve 2 on nozzle body 1, followed by valve 4 on nozzle body 2. Within the nozzle bodies, valve 1 and valve 2 are 180 degrees out of phase with each other thus producing the combined effect of a higher frequency at the outlet of each nozzle.

Figure 21:
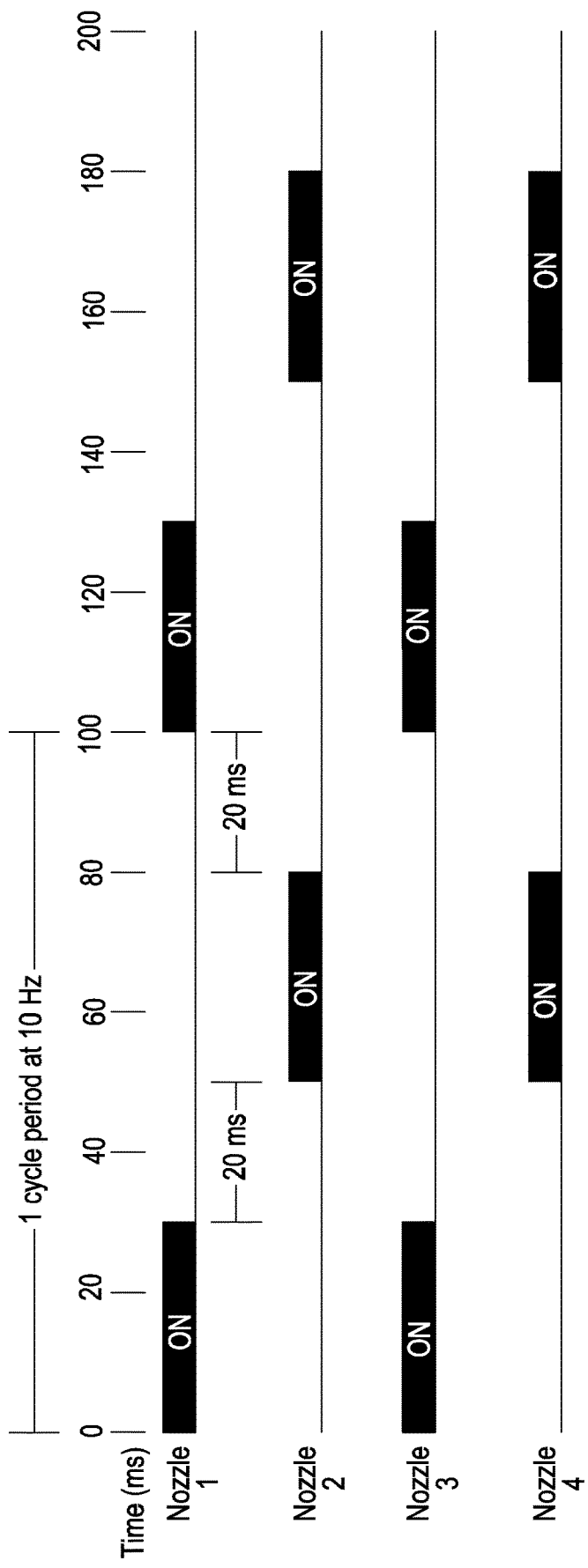
FIG. 21 depicts an example timing diagram for four adjacent nozzles.

The severity of spray skipping or dead time where no fluid is released to the target area (e.g. time gap between pulses), is reduced by executing and switching to another instruction in the sequence and using different parameters. For example, the pulse width is increased. In the time graph in FIG. 21 shows four nozzle bodies being actuated at 30% duty cycle at 10 Hz, where nozzles 1 and 3 are out of phase by 180 degrees with nozzles 2 and 4 and the result is 20 ms gaps. By sequencing the spray events in a new arrangement, the period of OFF time is reduced to below 10 ms at a time. In this sequence the nozzle body valve circuits can open/close either one of the valves, along with using one or more outlets. In this example, by increasing the pulse duration, it is possible to reduce the dead time gap that occurs between pulses where the sprayer is travelling and none of the nozzles bodies are ON. Alternatively, the spraying (e.g. double pulsing) is coordinated with the travel speed so that there is substantially no skipped spraying.

Figure 22:
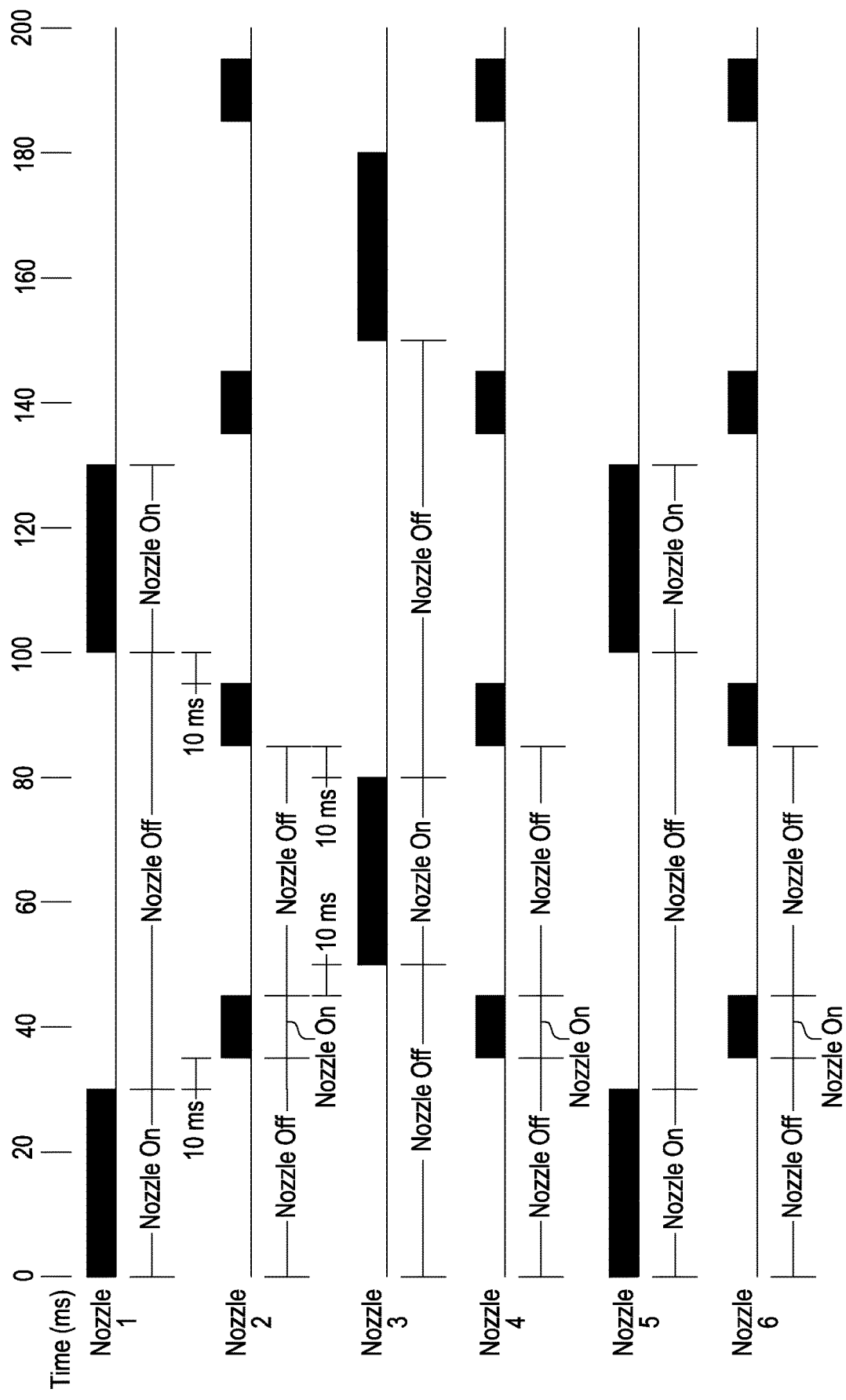
FIG. 22 depicts an example timing diagram for six adjacent nozzles.
Figure 27:
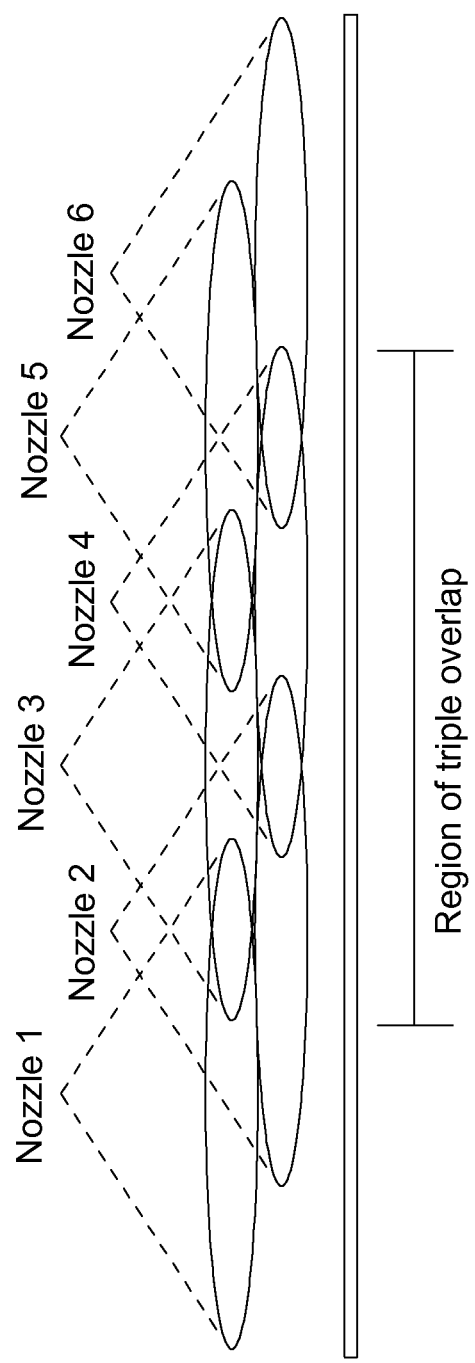
FIG. 27 depicts an example spray output pattern for six adjacent nozzles.

FIG. 22 is a timing diagram for an example method to control three pairs of adjacent nozzle bodies (six altogether) whose output spray overlaps (triple overlap, e.g. FIG. 27). In this figure, nozzle bodies 2, 4, and 6 are pulsing at 20 Hz with all three nozzle bodies in time with each other. Nozzle bodies 1, 3, and 5 are pulsing at 10 Hz in time with each other and nozzle bodies 1 and 3 are pulsing at 10 Hz and 180 degrees out of phase with nozzle bodies 1 and 5. Nozzle bodies 1, 3, 5 are all out of phase with nozzle bodies 2, 4, and 6. In this arrangement, the time between spray events is reduced from 20 ms to 10 ms. The 10 ms spray OFF time is also attainable by pulsing all of the nozzle bodies at 20 Hz and every other one 180 degrees out of phase. One advantage of the scenario depicted in FIG. 22 is that by using a combination of sequencing and triple overlap, it is possible to achieve the same result and keep half the nozzle bodies pulsing only at 10 Hz, which may increase the life of the valve components. In one alternative, the signals are periodically swapped so that the 10 Hz nozzle bodies would become 20 Hz nozzle bodies and vice versa, thus keeping an even amount of wear among all of the nozzle bodies on a boom.

Turning now to further example implementations with fluid spray cones including to help an operator perform the collective control of the nozzles 100, the pulse frequency of a pulsing nozzle 100 changes automatically to optimize the spray output according to the real-time sprayer parameters including vehicle speed, flow rate, and duty cycle percentage.

Figure 23A:
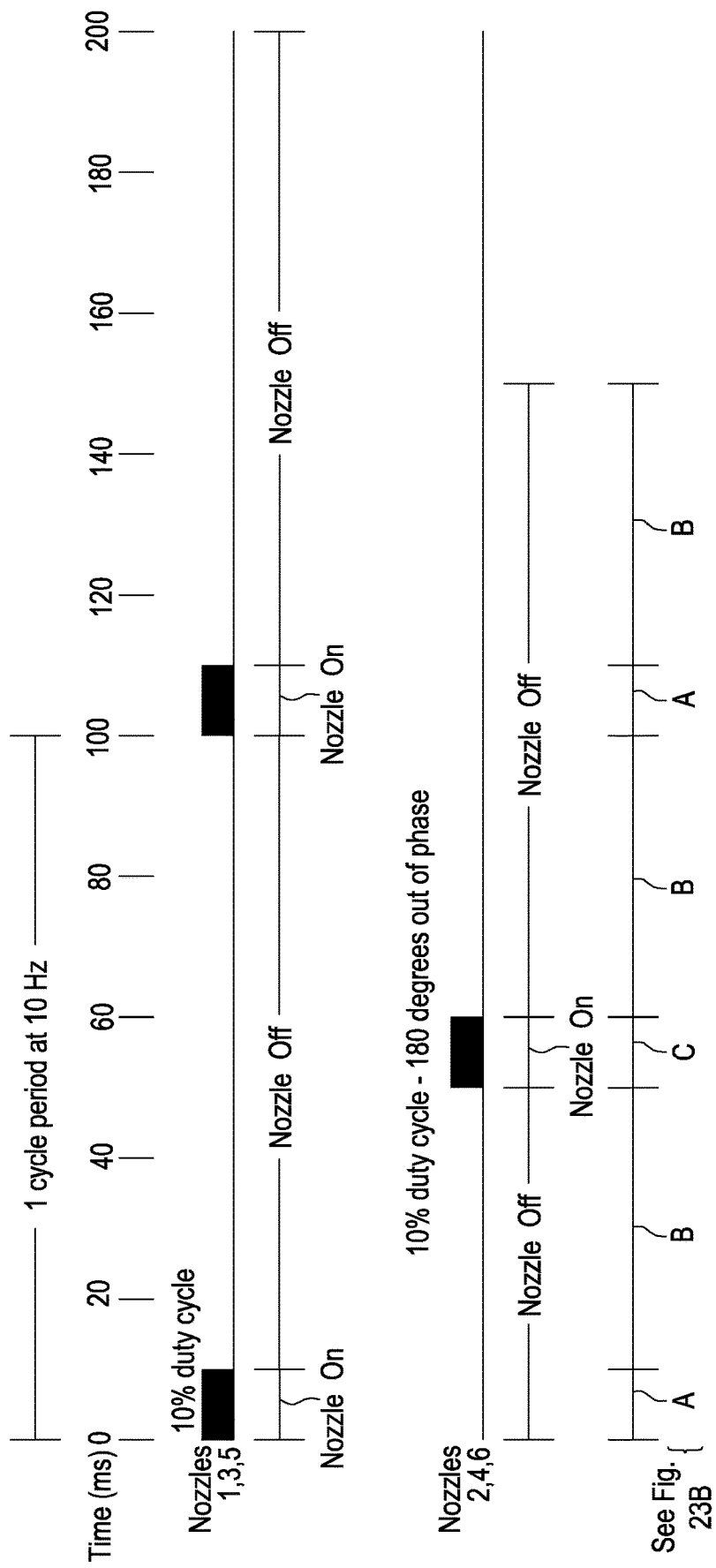
FIG. 23A depicts an example timing diagram for six adjacent nozzles.
Figure 24A:
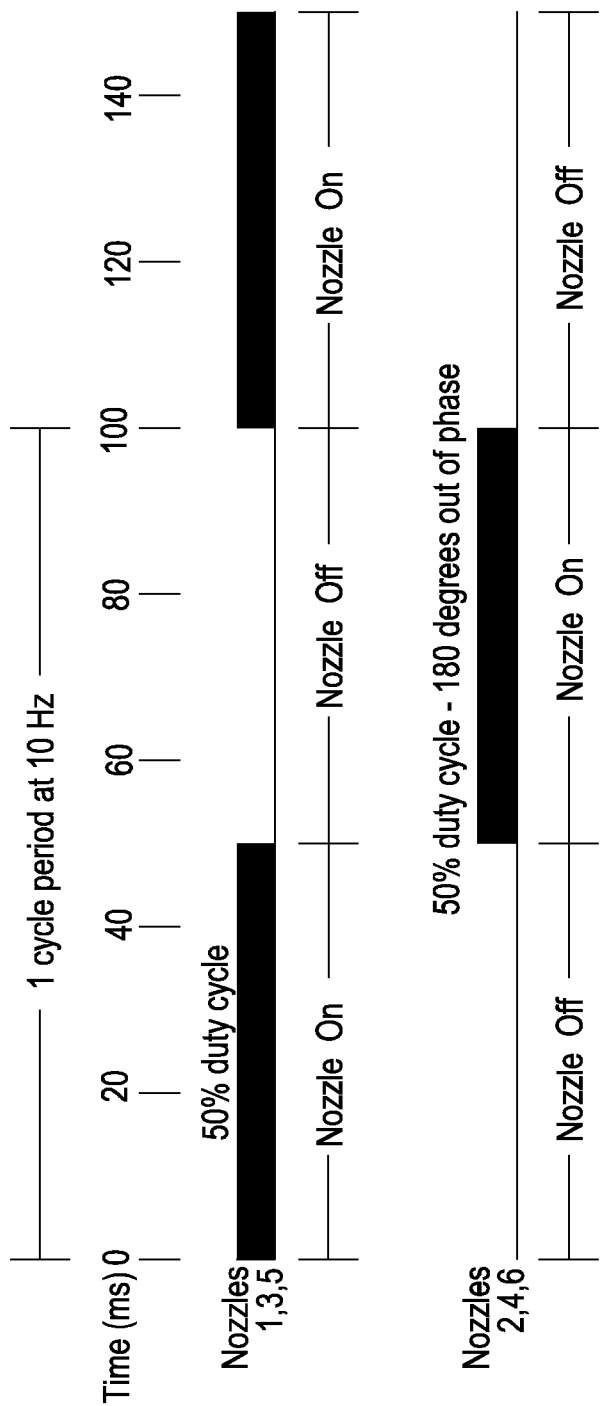
FIG. 24A depicts an example timing diagram for six adjacent nozzles.
Figure 24B:
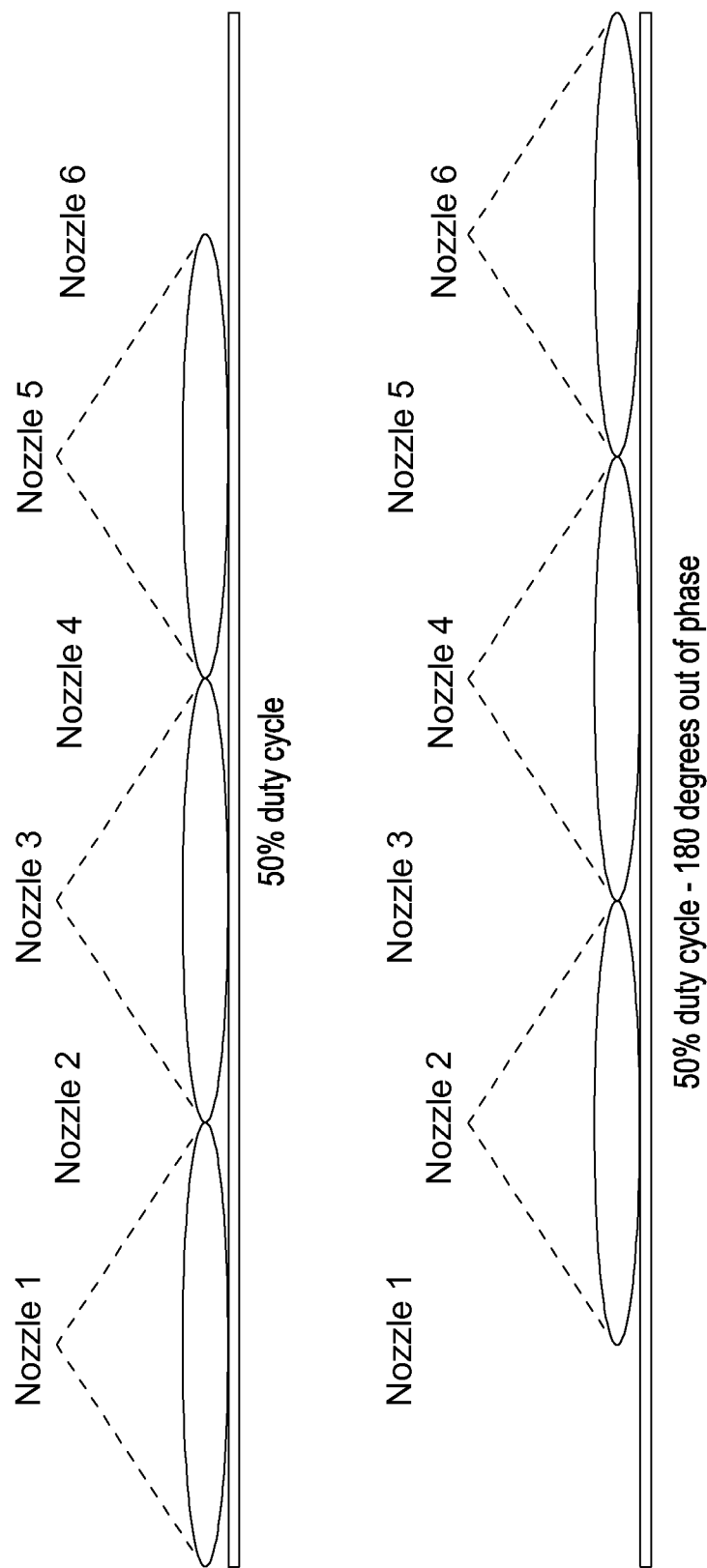
FIG. 24B depicts example spray pattern related to the method that produced the timing diagram of FIG. 24A.

In some embodiments, FIG. 23A and corresponding FIG. 23B depict a spray scenario having six example nozzles and spray cone or spray pattern overlaps twice over (e.g. neighboring even numbered nozzle bodies). Nozzles 1, 3, and 5 are out of phase with nozzles 2, 4, and 6, respectively. The polarity of the signals are selected such that nozzles 1, 3, 5 are ON for 10 ms, then from 10 to 50 ms, all nozzles are OFF. From 50 ms to 60 ms, nozzles 2, 4, 6 are ON. From 60 ms to 100 ms all the nozzles are OFF again. At 100 ms, the cycle starts over again. FIGS. 24A and 24B depict how this (FIG. 23A, 23B) works at 50% duty cycle where there is at least one set of the nozzles ON throughout the cycle.

Figure 25B:
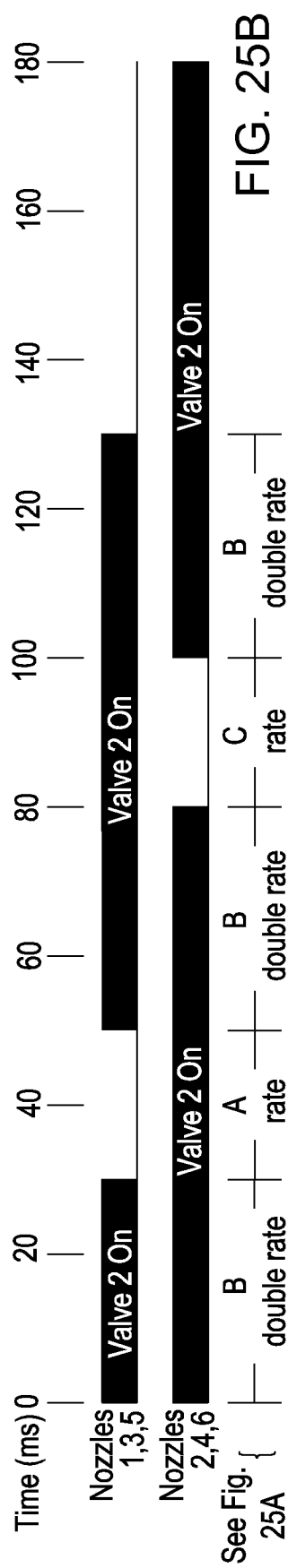
FIG. 25B depicts an example timing diagram for six adjacent nozzles.

FIGS. 25A and 25B are the timing diagrams and corresponding spray pattern that addresses another scenario when the PWM duty cycle is from 50% to 100%. There is a period of time when the spray may be over-applying as the vehicle travels forward. In this case, the cycle would start with nozzles 1, 3, and 5 spraying as shown in case A in FIG. 25A, followed by nozzles 1, 2, 3, 4, 5, and 6 all spraying as shown in case B in FIG. 25A, followed by nozzles 2, 4, and 6 spraying as shown in case C in FIG. 25A. If all the six nozzles in this configuration have the same orifice size (i.e. same flow rate), the result is twice the flow when all nozzles are on as shown in case B. The timing diagram of FIG. 25B illustrates this. The time where case B has all the nozzles on, the rate is doubled. So, although there is substantially constant coverage, there is a cyclical rate change as a function of time while the vehicle is travelling. In this scenario, an operator can alternatively set the spray in either of two other modes: the duty cycle being 100% (ON all the time) or the duty cycle being 50% with adjacent nozzles 180 degrees out of phase.

The scenarios of FIGS. 23-25 can be set up to adjust themselves using automated pre-sets having pre-programmed variable frequency control of the nozzles depending on primary factors including travel speed and PWM duty cycle. Alternatively, it is also possible to vary the pulse width or frequency depending on secondary factors including boom height, wind speed, nozzle type, nozzle angle, and spray overlap amount.

Figure 26:
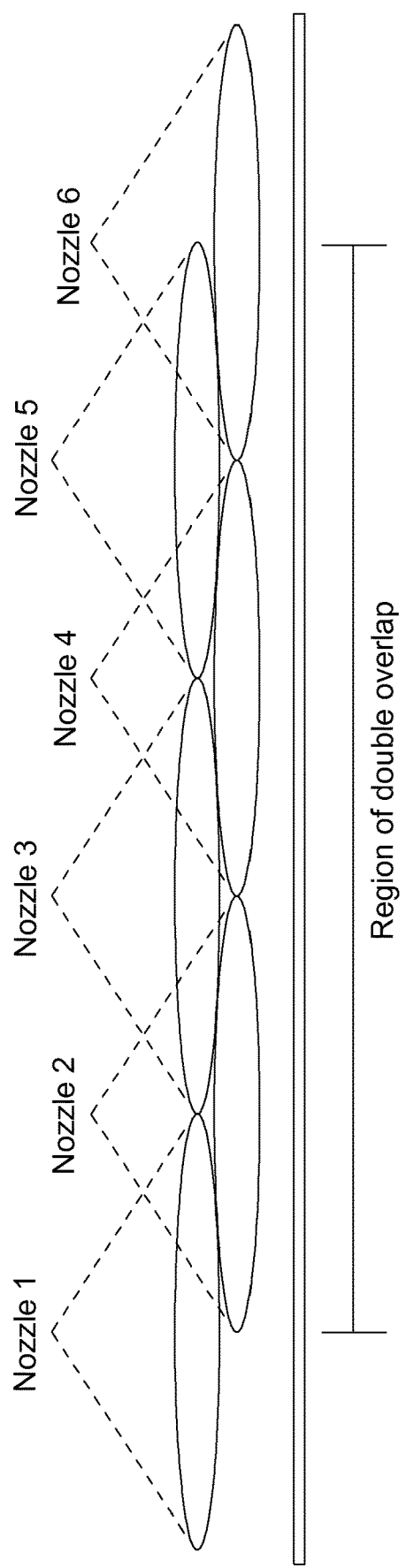
FIG. 26 depicts an example spray output pattern for six adjacent nozzles.

Turning now to the overlap of spray patterns from adjacent nozzles and nozzles beyond the adjacent ones. The overlap between spray patterns is primarily a result of the nozzle spray tip angle size (e.g. angle of 80 to 140 degrees), the spacing between the nozzles (typical 15 inches to 60 inches), and the height of the boom away from the target area. There are other factors that are smaller including spray pressure and how the nozzle is designed. Double overlap refers to two adjacent nozzles on each side completely cover the pattern of the nozzle between them. FIG. 26 shows a double spray overlap setting. FIG. 27 depicts a triple spray overlap, where a target area is being sprayed by three nozzles.

Figure 28:
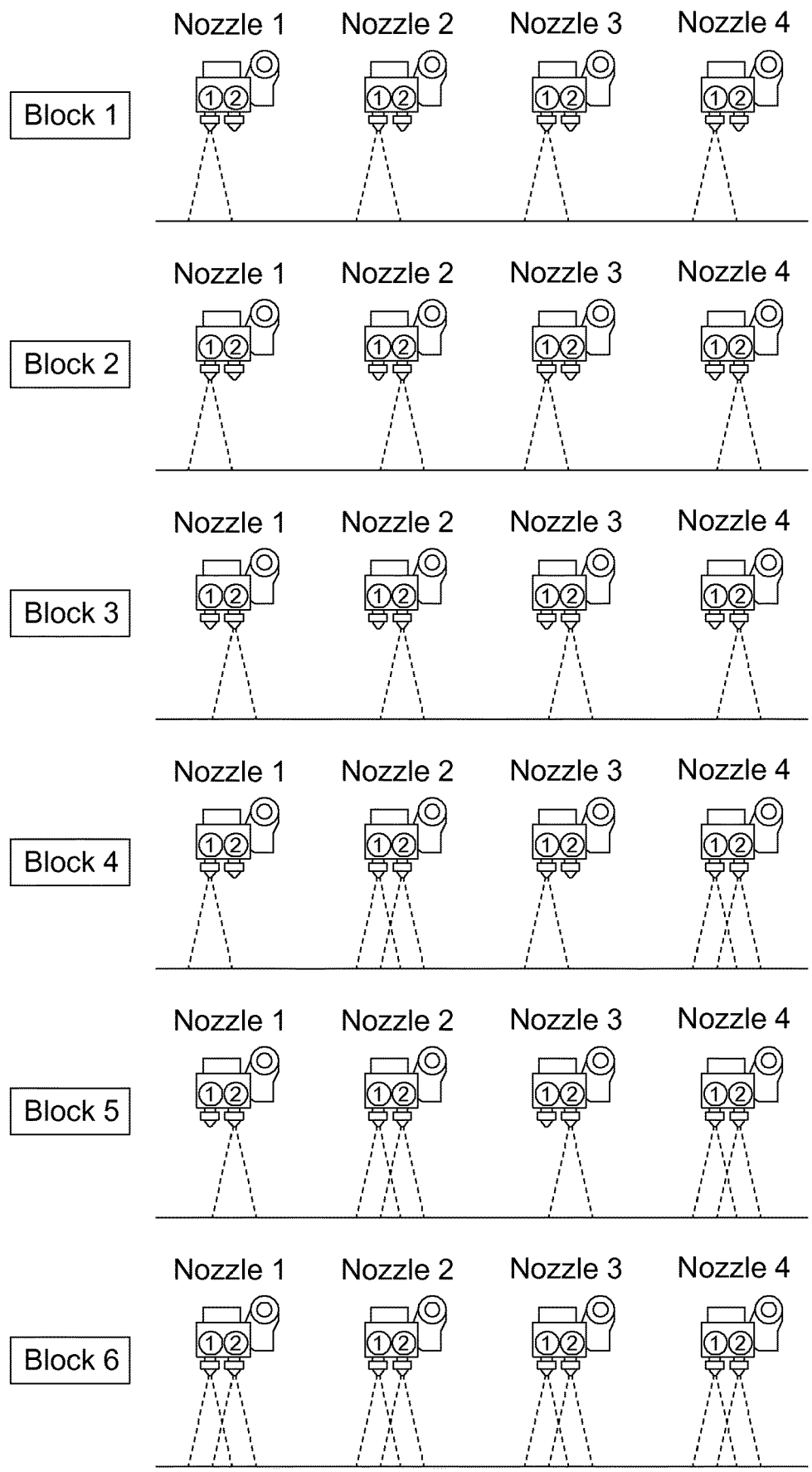
FIG. 28 depicts an example timing sequence of spray output for four adjacent nozzles.

As an example under a double overlap, not every adjacent nozzle body desires to have the same nozzle outlet activated. By activating different nozzle outlets, an operator can create a new average output flow rate from the boom and a new average flow rate to the target. The example in FIG. 28 (and accompanying FIG. 29) depicts a spray method as to how an operator can increase a three instruction resolution method to six instructions by using this principle. In the example of FIG. 28, an operator has increased the resolution of each instruction and also greatly improved the pressure range for each instruction. No one instruction allows the pressure to be more than 70 psi. By using the overlapping nozzles principle, providing different flow to an adjacent nozzle, and increasing the number of instructions to six, an operator is able to move through the 3:1 turndown ratio without much change to the pressure, as indicated in the table of FIG. 29.

The following four tables refer to example situations with each nozzle body on the spray boom while the vehicle (sprayer) speed changes. One embodiment involves switching between two outlets under PWM control as the vehicle speed increases. For example, the spray system starts with one outlet turned ON, usually at one of the lower pulsing frequencies. As the vehicle speed is increased, the nozzle duty cycle is increased until it is saturated at 100%. At this point, a second outlet turns on at a low duty cycle while the first outlet remains at 100% duty cycle. The table below shows an example of how this embodiment is implemented using the 03 nozzle tip (outlet 1) and 04 nozzle tip (outlet 2).

| Vehicle Speed MPH | Nozzle flow GPM | Nozzle Press psi | Nozzle Size | 0.3 DC | 0.4 DC |
|---|---|---|---|---|---|
| 3 | 0.13 | 44 | 0.30 | 42 | 0 |
| 4 | 0.15 | 44 | 0.30 | 49 | 0 |
| 5. | 0.18 | 44 | 0.30 | 56 | 0 |
| 5.5 | 0.20 | 44 | 0.30 | 63 | 0 |

-continued

| Vehicle Speed MPH | Nozzle flow GPM | Nozzle Press psi | Nozzle Size | 0.3 DC | 0.4 DC |
|---|---|---|---|---|---|
| 6 | 0.22 | 44 | 0.30 | 70 | 0 |
| 6.5 | 0.24 | 44 | 0.30 | 78 | 0 |
| 7 | 0.26 | 44 | 0.30 | 85 | 0 |
| 7.5 | 0.29 | 44 | 0.30 | 92 | 0 |
| 8 | 0.31 | 44 | 0.30 | 99 | 0 |
| 8.5 | 0.33 | 44 | 0.3 + 0.4 | 100 | 4 |
| 9 | 0.35 | 44 | 0.3 + 0.4 | 100 | 10 |
| 9.5 | 0.37 | 44 | 0.3 + 0.4 | 100 | 15 |
| 10 | 0.40 | 44 | 0.3 + 0.4 | 100 | 20 |
| 10.5 | 0.42 | 44 | 0.3 + 0.4 | 100 | 25 |
| 11 | 0.44 | 44 | 0.3 + 0.4 | 100 | 31 |
| 11.5 | 0.46 | 44 | 0.3 + 0.4 | 100 | 36 |
| 12 | 0.49 | 44 | 0.3 + 0.4 | 100 | 41 |
| 12.5 | 0.51 | 44 | 0.3 + 0.4 | 100 | 47 |
| 13 | 0.53 | 44 | 0.3 + 0.4 | 100 | 52 |
| 13.5 | 0.55 | 44 | 0.3 + 0.4 | 100 | 57 |
| 14 | 0.57 | 44 | 0.3 + 0.4 | 100 | 62 |
| 14.5 | 0.60 | 44 | 0.3 + 0.4 | 100 | 68 |
| 15 | 0.62 | 44 | 0.3 + 0.4 | 100 | 73 |
| 15.5 | 0.64 | 44 | 0.3 + 0.4 | 100 | 78 |
| 16 | 0.66 | 44 | 0.3 + 0.4 | 100 | 84 |
| 16.5 | 0.68 | 44 | 0.3 + 0.4 | 100 | 89 |
| 17 | 0.71 | 44 | 0.3 + 0.4 | 100 | 94 |

In this example embodiment, two nozzle tips of the same type and size are used to achieve comparable spray quality while increasing the dynamic range as shown in the table below.

| Vehicle Speed MPH | Nozzle flow GPM | Nozzle Press psi | Nozzle Size | 0.3 DC | 0.3 DC |
|---|---|---|---|---|---|
| 3 | 0.13 | 44 | 0.30 | 42 | 0 |
| 4 | 0.15 | 44 | 0.30 | 49 | 0 |
| 5. | 0.18 | 44 | 0.30 | 56 | 0 |
| 5.5 | 0.20 | 44 | 0.30 | 63 | 0 |
| 6 | 0.22 | 44 | 0.30 | 70 | 0 |
| 6.5 | 0.24 | 44 | 0.30 | 78 | 0 |
| 7 | 0.26 | 44 | 0.30 | 85 | 0 |
| 7.5 | 0.29 | 44 | 0.30 | 92 | 0 |
| 8 | 0.31 | 44 | 0.30 | 99 | 0 |
| 8.5 | 0.33 | 44 | 0.3 + 0.3 | 100 | 6 |
| 9 | 0.35 | 44 | 0.3 + 0.3 | 100 | 13 |
| 9.5 | 0.37 | 44 | 0.3 + 0.3 | 100 | 20 |
| 10 | 0.40 | 44 | 0.3 + 0.3 | 100 | 27 |
| 10.5 | 0.42 | 44 | 0.3 + 0.3 | 100 | 34 |
| 11 | 0.44 | 44 | 0.3 + 0.3 | 100 | 41 |
| 11.5 | 0.46 | 44 | 0.3 + 0.3 | 100 | 48 |
| 12 | 0.49 | 44 | 0.3 + 0.3 | 100 | 55 |
| 12.5 | 0.51 | 44 | 0.3 + 0.3 | 100 | 62 |
| 13 | 0.53 | 44 | 0.3 + 0.3 | 100 | 69 |
| 13.5 | 0.55 | 44 | 0.3 + 0.3 | 100 | 76 |
| 14 | 0.57 | 44 | 0.3 + 0.3 | 100 | 83 |
| 14.5 | 0.60 | 44 | 0.3 + 0.3 | 100 | 90 |
| 15 | 0.62 | 44 | 0.3 + 0.3 | 100 | 97 |
| 15.5 | 0.64 | 45 | 0.3 + 0.3 | 100 | 100 |
| 16 | 0.66 | 49 | 0.3 + 0.3 | 100 | 100 |
| 16.5 | 0.68 | 52 | 0.3 + 0.3 | 100 | 100 |
| 17 | 0.71 | 55 | 0.3 + 0.3 | 100 | 100 |

In the previous example embodiment, the logic of when to switch may be configured depending on user need. The previous example showed that when the first outlet was saturated at 100% duty cycle due to the vehicle speed increase, then a second outlet is turned ON at a low duty cycle while the first outlet remained at 100%. But in another embodiment, the logic may also be configured to switch the first outlet OFF and switch the larger second outlet to ON. After the second outlets (tip) duty cycle is saturated to 100%, then both outlets are turned ON and both pulse at the same duty cycle and the frequency may continue to increase together, as shown in the table below.

| Vehicle Speed MPH | Nozzle flow GPM | Nozzle Press psi | Nozzle Size | 0.3 DC | 0.4 DC |
|---|---|---|---|---|---|
| 3 | 0.13 | 44 | 0.30 | 42 | 0 |
| 4 | 0.15 | 44 | 0.30 | 49 | 0 |
| 5. | 0.18 | 44 | 0.30 | 56 | 0 |
| 5.5 | 0.20 | 44 | 0.30 | 63 | 0 |
| 6 | 0.22 | 44 | 0.30 | 70 | 0 |
| 6.5 | 0.24 | 44 | 0.30 | 78 | 0 |
| 7 | 0.26 | 44 | 0.30 | 85 | 0 |
| 7.5 | 0.29 | 44 | 0.30 | 92 | 0 |
| 8 | 0.31 | 44 | 0.30 | 99 | 0 |
| 8.5 | 0.33 | 44 | 0.40 | 0 | 82 |
| 9 | 0.35 | 44 | 0.40 | 0 | 88 |
| 9.5 | 0.37 | 44 | 0.40 | 0 | 94 |
| 10 | 0.40 | 44 | 0.3 + 0.4 | 0 | 100 |
| 10.5 | 0.42 | 44 | 0.3 + 0.4 | 57 | 57 |
| 11 | 0.44 | 44 | 0.3 + 0.4 | 60 | 60 |
| 11.5 | 0.46 | 44 | 0.3 + 0.4 | 63 | 63 |
| 12 | 0.49 | 44 | 0.3 + 0.4 | 66 | 66 |
| 12.5 | 0.51 | 44 | 0.3 + 0.4 | 69 | 69 |
| 13 | 0.53 | 44 | 0.3 + 0.4 | 72 | 72 |
| 13.5 | 0.55 | 44 | 0.3 + 0.4 | 75 | 75 |
| 14 | 0.57 | 44 | 0.3 + 0.4 | 78 | 78 |
| 14.5 | 0.60 | 44 | 0.3 + 0.4 | 81 | 81 |
| 15 | 0.62 | 44 | 0.3 + 0.4 | 84 | 84 |
| 15.5 | 0.64 | 44 | 0.3 + 0.4 | 89 | 89 |
| 16 | 0.66 | 44 | 0.3 + 0.4 | 93 | 93 |
| 16.5 | 0.68 | 44 | 0.3 + 0.4 | 96 | 96 |
| 17 | 0.71 | 44 | 0.3 + 0.4 | 100 | 100 |

In yet another embodiment, both outlets on a nozzle body are turned ON after the first outlet is saturated at 100% duty cycle and both outlets continue to pulse at the same duty cycle until they both reach saturation, as shown in the table below.

| Vehicle Speed MPH | Nozzle flow GPM | Nozzle Press psi | Nozzle Size | 0.3 DC | 0.4 DC |
|---|---|---|---|---|---|
| 3 | 0.13 | 44 | 0.30 | 42 | 0 |
| 4 | 0.15 | 44 | 0.30 | 49 | 0 |
| 5. | 0.18 | 44 | 0.30 | 56 | 0 |
| 5.5 | 0.20 | 44 | 0.30 | 63 | 0 |
| 6 | 0.22 | 44 | 0.30 | 70 | 0 |
| 6.5 | 0.24 | 44 | 0.30 | 78 | 0 |
| 7 | 0.26 | 44 | 0.30 | 85 | 0 |
| 7.5 | 0.29 | 44 | 0.30 | 92 | 0 |
| 8 | 0.31 | 44 | 0.30 | 99 | 0 |
| 8.5 | 0.33 | 44 | 0.3 + 0.4 | 44 | 44 |
| 9 | 0.35 | 44 | 0.3 + 0.4 | 47 | 47 |
| 9.5 | 0.37 | 44 | 0.3 + 0.4 | 50 | 50 |
| 10 | 0.40 | 44 | 0.3 + 0.4 | 54 | 54 |
| 10.5 | 0.42 | 44 | 0.3 + 0.4 | 57 | 57 |
| 11 | 0.44 | 44 | 0.3 + 0.4 | 60 | 60 |
| 11.5 | 0.46 | 44 | 0.3 + 0.4 | 63 | 63 |
| 12 | 0.49 | 44 | 0.3 + 0.4 | 66 | 66 |
| 12.5 | 0.51 | 44 | 0.3 + 0.4 | 69 | 69 |
| 13 | 0.53 | 44 | 0.3 + 0.4 | 72 | 72 |
| 13.5 | 0.55 | 44 | 0.3 + 0.4 | 75 | 75 |
| 14 | 0.57 | 44 | 0.3 + 0.4 | 78 | 78 |
| 14.5 | 0.60 | 44 | 0.3 + 0.4 | 81 | 81 |
| 15 | 0.62 | 44 | 0.3 + 0.4 | 84 | 84 |
| 15.5 | 0.64 | 44 | 0.3 + 0.4 | 89 | 89 |
| 16 | 0.66 | 44 | 0.3 + 0.4 | 93 | 93 |
| 16.5 | 0.68 | 44 | 0.3 + 0.4 | 96 | 96 |
| 17 | 0.71 | 44 | 0.3 + 0.4 | 100 | 100 |

System

Figure 30:
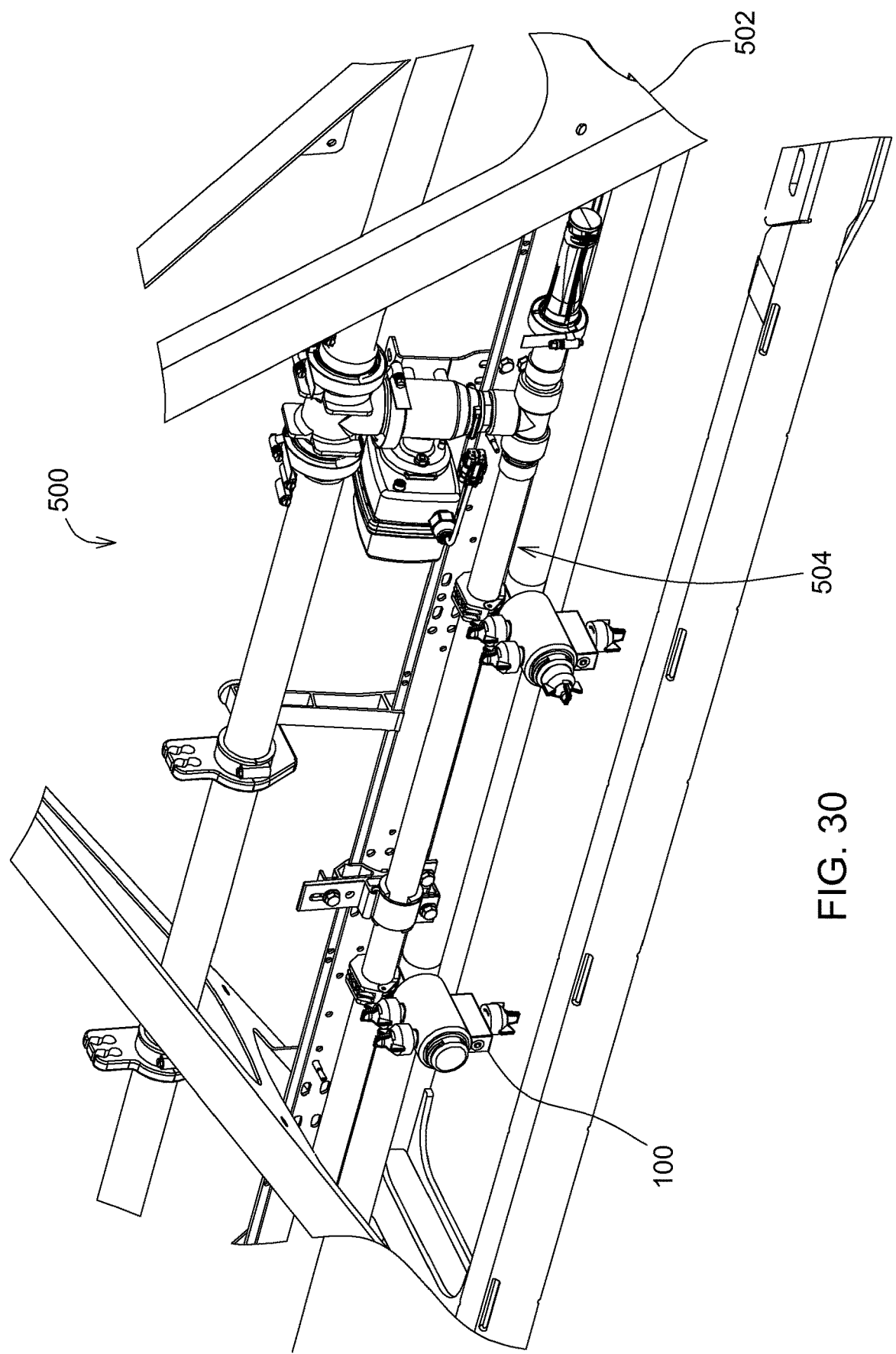
FIG. 30 depicts an example nozzles mounted on a sprayer boom.

FIGS. 1 and 30 depict nozzles 100 or 300 mounted on or clamped to a boom assembly 500 that is in turn mounted on a dolly platform, or a vehicle including a tractor or self propelled sprayer. The fluid distribution pipe 504 that carries the fluid are mounted externally to or located internally to the boom assembly 500. Alternatively, the vehicle includes an aircraft for aerial spraying or hand-operated or lever-operated knapsack sprayers. Tractor type spraying include low-pressure (e.g. 20-50 psi) sprayers that apply about 5-50 gallons per acre. Other tractors include tractor-mounted spray machinery (e.g. tank, pump or flow regulator driven by a hydraulic motor or compressor. Boom assemblies 500 are mounted in the front, rear or one-or-both sides of the tractor. In alternative embodiments, tractor mounted sprayer units are combined with other equipment including planters, cultivators or tillage implements. Nozzles 100 can be mounted to the ends of a row crop drop that would enable the nozzles 100 to spray lower, nearer to the crops, especially after the crops have just emerged. By contrast, there are high-clearance sprayers tall enough to clear the height of taller crops including corn. Mounted on either the front or the back of a vehicle, the spray boom assembly 500 is lowered or raised, depending on crop height and application conditions. Alternatively, a trailer-mounted sprayer attached to a wheeled liquid tank and towed through the field by a tractor or a truck or other utility vehicle. Tank capacity ranges up to 1000 to 1500 gallons; a spray fluid pump is mounted on a tractor and driven by a tractor PTO shaft or other hydraulic motor. For industrial applications, nozzles 100 are mounted to a boom or to individualized fluid pump holder so that there may be only one nozzle. Nozzle 100 can be used for boomless broadcast spraying for either agricultural or industrial spraying, or even for manually operated or handheld spray systems.

In FIG. 30, the boom assemblies 500 have a "wet" boom or spray line 504 to which a plurality of nozzles 100 (or 100) are attached; the spray line 504 supplies fluids to each of the nozzles 100 that are spaced apart by 5-100 inches distance, depending mostly on the distance between crop rows. Depending on the length of the boom and fluid pipes, the number of nozzles range from 20 to about 120. In other embodiments, nozzles 100 (or 300) are attached to a "dry" boom, where hose carry fluids to each nozzle. Like the nozzles, the boom assemblies 500 or their elements including the spray line are made in a variety of styles (with or without trusses and different folding mechanisms) and comprise materials including steel, aluminum, alloys, a composite, carbon fiber, flax fiber, rubber, fiberglass, polymers, plastic, combination of these materials and so on. Rivets and connectors that hold together the boom 502 segments, struts, channels, are often metallic but may also be of man-made materials. Rivets and connectors or channels made of heavier material including alloys and metals are sometimes added also to act as weights to stabilize boom assemblies 500 made of lighter material. After much testing it was found that by including two or more closing (open and close movement) valves to direct the fluid flow from one chamber of a nozzle to another chamber, along with the use of PWM or continuous flow control (e.g. to increase frequency), the example nozzles 100 then have enough flexibility of operation so as to be compatible with a multitude of boom designs, and either lightweight or heavier boom designs. Examples of booms include a truss structure; a suspension segmented tube, which is suspended from a sprayer center frame boom mount, like a suspension bridge with cables emanating from the main (primary) post to the deck beams. Tubular booms without sufficient braces or trusses may flex more so that faster spray release including from nozzle 100 compensate for any increase in vibration from the boom. Alternatively, since nozzle 100 can release spray faster or slower and is tunable (modulation), its performance can be optimized (tuned) to be more compatible with the motion of the boom. By modulating and having multiple options for the outlets, the dynamic performance of nozzle 100 covers a wider range of possible performance (e.g. to accommodate a wider range of pressure, flow rate, angle and spray area). For embodiments with lighter weight booms (e.g. aluminum or composite fiber), a sprayer can instead carry more weight in other ways including through more application material or fluids. For example, a larger tank can be used or a second spray tank is optionally mounted or docked on the spray vehicle to accommodate more spray material. The additional amount of fluids/chemicals sustains a faster spray rate or higher flow rate. As another example, light weight booms 502 can be made longer than heavier booms (e.g. metallic booms) because they weigh less and the vehicle suspension or the center frame mount can still support the weight of the longer booms 502. Longer booms 502 generally need more nozzles 100 to span the extra length of the boom 502. Approximately 100-200 nozzles 100 are mounted to the longer light weight booms 502, which entails additional management and coordination than a situation with fewer nozzles. In addition, the weight savings from lighter booms may also be used towards having additional fluid-distribution pipes.

FIG. 30 depicts an example design for fluid distribution pipes 504 that are rigid enough even when expanded to enable uniform spraying and response to a spray controller. In order to adjust the direction of spray, fluid distribution pipe 504 is rotatable about one of its longitudinal axis and is mounted on a step rotator or something similar to rotate fluid distribution pipe 504 so that nozzles 100 (or 300) are pointing in different directions relative to the targeted spray objects. Further, the master spray controller can cantilever sections of the fluid distribution pipe 504 in order to adjust for slopes in the terrain or for uneven soil. Fluid distribution pipe 504 may be strapped or riveted to long metallic beams inside boom 500. The nozzles 100 are located at intervals along the metallic beam. For a tubular, suspension boom 500, the fluid distribution pipe 504 is mounted behind the boom. The fluid distribution pipe 504 is attached to the joints of the boom as well as being strapped to sections of the boom 500; the rigid sections of the fluid distribution pipe 504 are attached by bolts and hinges; at the joint where the boom 500 folds, the fluid distribution pipe 504 is a flexible tube. The nozzles 100 are mounted to the fluid distribution pipe 504 at a location ranging from below the center line of the boom 500 to the top of the boom 500. The suspension type booms 500 generally have a diameter that is larger than the size of the nozzles (i.e. larger than the 115-135 mm size of the nozzle) so that the boom 500 should touch the ground before a nozzle 100 would. At the end of the boom 500, where the breakaway section has tapered boom sections and the diameter of the boom becomes comparable to the size of a nozzle 100, the fluid distribution pipe 504 is mounted above the centerline of the breakaway section.

Alternatively, the fluid distribution pipe 504 is mounted to the joint sections and below the boom 500. The spray 504 is strapped to the boom 500, along sections of the boom 500. To avoid possible damage to the nozzles 100 (or 300) when the boom 500 gets close to the ground, sections of the boom 500 including the breakaway has a prop or protrusion at right angles from the boom so that the extension would touch the ground before a nozzle 100 would. The prop/protrusion folds when the boom folds because there is a tension wire running along the end of the extension that automatically pulls in the protruded piece. Alternatively, the boom 500 is U-shaped in cross section, a shell, where one side of the boom wall is an open space. The U-shaped boom 500 is hollowed out and exposed. The fluid distribution pipe 504 is mounted inside the U-shaped boom 500 and nozzle 100 is hanging underneath the fluid distribution pipe 504 so that nozzle 100 is located at the opening of the boom 500 (at the open part of the U). The boom joint sections occupy the space between two nozzles so that there are nozzles 100 all along the entire length of the boom 500. By placing the nozzles 100 in the hollow of the boom, the nozzles 100 are protected. As another alternative, the boom 500 has circular openings along the length of the boom and nozzles 100 are seated in the sockets.

The collective system operation of many nozzles takes advantage of features of the new nozzles including interleaving the operation of valves 30 and 32 within a nozzle, or interleaving the operation of different outputs on a single nozzle, or interleaving the operation of adjacent nozzles. One main advantage is improved spray coverage quality and reduced skips in the spray pattern. Additional advantages include finer resolution when changing the spray operation or reduced nozzle wear.

Although this disclosure focuses on macroscopic and large sprayers including those used in an outdoor field, smaller sprayers and nozzles for industrial manufacturing or even microelectro-mechanical (MEMS) sized sprayers also benefit from these ideas. For instance, industrial uses also include a relative motion between a sprayer and the target object that may be irregular in shape or have sharp edges, thus may also desire rapid changes in the pattern or amount of spray released. Further, the PWM spray method refers to turning the fluid release ON or OFF based on an amplitude of the square wave pulses that actuate the valves (e.g. solenoid valves). The frequency and duty cycle for controlling the flow are adjustable through software and/or electromechanical methods. Although pulse or square waves signals are discussed as an example in this disclosure, the pulse signals includes square waves, sine waves, triangle waves or some other periodic signals may be substituted in some end-use applications (e.g. to create smooth transitions from spray and non-spray periods).

Finally, the orientation and directions stated and illustrated in this disclosure should not be taken as limiting. Many of the orientations stated in this disclosure and claims are with reference to the direction of travel of the equipment. But, the directions, e.g. "behind" are merely illustrative and do not orient the embodiments absolutely in space. That is, a structure manufactured on its "side" or "bottom" is merely an arbitrary orientation in space that has no absolute direction. Also, in actual usage, for example, the nozzles and boom equipment may be operated or positioned at an angle because the implements may move in many directions on a hill; and then, "top" is pointing to the "side." Thus, the stated directions in this application may be arbitrary designations.

The description of the present disclosure has been presented for purposes of illustration and description, but is not intended to be exhaustive or limited to the disclosure in the form disclosed. Explicitly referenced embodiments herein were chosen and described in order to explain the principles of the disclosure and their practical application. Accordingly, various implementations other than those explicitly described are within the scope of the claims.

What is claimed is:

1. A spray nozzle system for a fluid, comprising:
nozzle bodies mounted on a boom, wherein each of the nozzle bodies includes:
  a rotatable turret, a fluid inlet, a first valve, a second valve, a first outlet, a second outlet, wherein the first outlet and the second outlet join together to form a combined outlet; wherein the fluid inlet is coupled to the first outlet via a first valve; and the fluid inlet is also coupled to the second outlet via a second valve, and the fluid inlet is coupled to the combined outlet via the first valve and the second valve, and wherein fluid received at the fluid inlet is separated into at least two flow paths via the first valve and the second valve before recombining into a single flow path at the combined outlet; and
a controller in electrical communication with the first valve and the second valve; wherein the controller is programmed to move the first valve and the second valve according to any one of a following control modes:
  a first mode wherein the fluid is released from both the first outlet and the second outlet based on a first pulse-width-modulated (PWM) signal coupled to the first valve, and a second PWM signal coupled to the valve, respectively;
  a second mode wherein the fluid is released from only the first outlet or only the second outlet based on the first pulse-width-modulated (PWM) signal coupled to the first valve or the second PWM signal coupled to the valve, respectively; and
  a third mode wherein:
    the fluid is released from the combined outlet based on the first pulse-width-modulated (PWM) signal coupled to the first and the second PWM signal coupled to the second value,
    the first PWM signal and the second PWM signal are each of a predetermined time-duration and are in a predetermined phase relation to one another to operate the first and second value in a first position and a second position such that fluid is released at a greater frequency from the combined outlet than from either the first valve or the second value, separately,
    in a first sub-mode, the first PWM signal and the second PWM signal have the same phase relationship and frequency, and
    in a second sub-mode, the first PWM signal and the second PWM signal have a different phase relationship and the same frequency.

2. A spray nozzle system for a fluid, comprising:
a spray boom having a fluid distribution pipe;
at least one spray nozzle body mounted along the fluid distribution pipe, the spray nozzle body including a rotatable turret, a fluid inlet, a first valve, a second valve, and a combined outlet arranged on the rotatable turret, wherein the fluid inlet is coupled to the combined outlet via the first valve and the second valve, and wherein fluid received at the fluid inlet is separated into at least two flow paths via the first valve and the second valve before recombining into a single flow path at the combined outlet;
an electronic controller;
a first actuator communicatively coupled to the electronic controller that is responsive to a first pulse-width-modulated (PWM) signal; and
a second actuator communicatively coupled to the electronic controller that is responsive to a second pulse-width-modulated (PWM) signal,
wherein:

the first PWM signal and the second PWM signal are each of a predetermined time-duration and are in a predetermined phase relation to one another to operate the first and second actuators in a first position and a second position such that fluid is released at a greater frequency from the combined outlet than from either the first valve or the second value, separately, in a first sub-mode, the first PWM signal and the second PWM signal have the same phase relationship and frequency, and in a second sub-mode, the first PWM signal and the second PWM signal have a different phase relationship and the same frequency.

3. The spray nozzle system of claim 2, further comprising a first outlet and a second outlet arranged on the rotatable turret and oriented to both point substantially in the same direction.

4. The spray nozzle system of claim 2, wherein the combined outlet has a nozzle tip.

5. The spray nozzle system of claim 2, wherein the first actuator and the second actuator both have a solenoid to electrically effect pulse width modulation.

6. The spray nozzle system of claim 2, wherein the electronic controller is programmed to periodically release the fluid from a first outlet out of phase with releasing the fluid from a second outlet.

7. The spray nozzle system of claim 2, wherein the electronic controller is programmed to periodically release the fluid from a first outlet in phase with releasing the fluid from a second outlet.

8. The spray nozzle system of claim 2, wherein the electronic controller is programmed to periodically release the fluid from a first outlet while continuously releasing the fluid from a second outlet.

9. The spray nozzle system of claim 2, wherein fluid released from the combined outlet is provided to a spray nozzle tip.

10. The spray nozzle system of claim 2, further comprising a sensor communicatively coupled to the electronic controller that indicates a speed of travel of the spray nozzle body, and wherein the electronic controller is configured to generate a control signal to control the first actuator and the second actuator based on the speed of travel.

11. The spray nozzle system of claim 2, further comprising a sensor communicatively coupled to the electronic controller that indicates a flow rate of the fluid out of the spray nozzle body, and wherein the electronic controller is configured to generate a control signal to control the first actuator and the second actuator based on the flow rate.

12. The spray nozzle system of claim 2, further comprising a sensor communicatively coupled to the electronic controller that indicates a pressure of the fluid into the spray nozzle body, and wherein the electronic controller is configured to generate a control signal to control the first actuator and the second actuator based on the pressure.

13. The spray nozzle system of claim 2, wherein the at least one spray nozzle body comprises a plurality of adjacently arranged nozzle bodies; and wherein the adjacently arranged nozzle bodies release the fluid in phase.

14. The spray nozzle system of claim 2, wherein the at least one spray nozzle body comprises a plurality of adjacently arranged nozzle bodies, and wherein in a fourth mode fluid is released out of phase from each of the adjacently arranged nozzle bodies.

15. A spray nozzle system for a fluid, comprising:

an agricultural vehicle having a boom; adjacent nozzle bodies that are mounted along a length of the boom; wherein the adjacent nozzle bodies each includes:

a rotatable turret, a fluid inlet, a first valve, a second valve, and a combined outlet arranged on the rotatable turret, wherein the fluid inlet is coupled to the combined outlet via the first valve and the second valve, and wherein fluid received at the fluid inlet is separated into at least two flow streams via the first valve and the second valve before recombining into a single flow stream at the combined outlet, wherein the fluid inlet is coupled to (i) a first outlet via a first value and (ii) a second outlet via a second valve;

a circuit in each of the adjacent nozzle bodies, wherein the circuit is in electrical communication with the first valve and the second valve in each of the adjacent nozzle bodies, and wherein each of the first outlet and the second outlet is arranged on the rotatable turret relative to a position of the combined outlet;

wherein the circuit in each of the adjacent nozzle bodies is in electrical communication with a controller programmed with pre-set instructions;

wherein the circuit is configured to actuate the first valve in response to a first pulse-width-modulated (PWM) signal and the second valve in response to a second pulse-width-modulated (PWM) signal;

wherein the first PWM signal and the second PWM signal are each of a predetermined time-duration and are in a predetermined phase relation to one another to operate the first and second actuators in a first position and a second position such that fluid is released at a greater frequency from the combined outlet than from either the first valve or the second valve, separately;

wherein in a first sub-mode, the first PWM signal and the second PWM signal have the same phase relationship and frequency; and wherein in a second sub-mode, the first PWM signal and the second PWM signal have a different phase relationship and the same frequency.

16. The spray nozzle system of claim 15, further comprising a sensor communicatively coupled to the electronic controller that indicates a speed of travel of the spray nozzle body, and wherein the electronic controller is configured to generate a control signal to control the first actuator and the second actuator based on the speed of travel.

17. The spray nozzle system of claim 15, further comprising a sensor communicatively coupled to the electronic controller that indicates a flow rate of the fluid out of the spray nozzle body, and wherein the electronic controller is configured to generate a control signal to control the first actuator and the second actuator based on the flow rate.

18. The spray nozzle system of claim 15, further comprising a sensor communicatively coupled to the electronic controller that indicates a pressure of the fluid into the spray nozzle body, and wherein the electronic controller is configured to generate a control signal to control the first actuator and the second actuator based on the pressure.

* * * * *